United States Patent
Chan et al.

(10) Patent No.: US 11,736,452 B1
(45) Date of Patent: Aug. 22, 2023

(54) SECURE UPDATE OF DASHBOARD PROPERTIES

(71) Applicant: SPLUNK INC., San Francisco, CA (US)

(72) Inventors: Christopher Chan, Santa Clara, CA (US); Ryan O'Connor, Mystic, CT (US); Philippe Tang, Repentigny (CA); Simon Tam, San Mateo, CA (US); Sterling Trafford, Lake Charles, LA (US)

(73) Assignee: SPLUNK INC., San Francisco, CA (US)

( * ) Notice: Subject to any disclaimer, the term of this patent is extended or adjusted under 35 U.S.C. 154(b) by 76 days.

(21) Appl. No.: 17/246,536

(22) Filed: Apr. 30, 2021

(51) Int. Cl.
*H04L 9/40* (2022.01)

(52) U.S. Cl.
CPC ...... *H04L 63/0428* (2013.01); *H04L 63/0272* (2013.01); *H04L 63/0869* (2013.01)

(58) Field of Classification Search
CPC ............. H04L 63/0428; H04L 63/0272; H04L 63/0869
See application file for complete search history.

(56) References Cited

U.S. PATENT DOCUMENTS

| | | | |
|---|---|---|---|
| 7,937,344 B2 | 5/2011 | Baum et al. | |
| 8,112,425 B2 | 2/2012 | Baum et al. | |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 10,127,258 B2 | 11/2018 | Lamas et al. | |
| 11,415,125 B2* | 8/2022 | Yeung | G01L 3/00 |
| 2016/0255050 A1* | 9/2016 | Grayson | H04L 63/1433 726/1 |
| 2016/0380981 A1* | 12/2016 | Arora | H04L 63/166 713/168 |
| 2018/0081935 A1* | 3/2018 | Papale | G06F 16/248 |
| 2019/0098106 A1* | 3/2019 | Mungel | H04L 67/02 |
| 2020/0045016 A1* | 2/2020 | Chor | H04L 63/0442 |
| 2022/0255900 A1* | 8/2022 | Gupta | H04L 63/102 |

OTHER PUBLICATIONS

Carraso, David, "Exploring Splunk," published by CITO Research, New York, NY, Apr. 2012.
Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

* cited by examiner

*Primary Examiner* — Chau Le
(74) *Attorney, Agent, or Firm* — Artegis Law Group, LLP

(57) ABSTRACT

In various embodiments, a computer-implemented method comprises determining that a first property associated with a dashboard is modified at a first device, determining that the dashboard is accessible at a second device, where the first device and the second device are coupled via a trusted tunnel bridge, and in a real-time response to determining that the first property was modified, transmitting, to the second device via the trusted tunnel bridge, an update that causes the second device modify the dashboard based on the modified first property.

20 Claims, 19 Drawing Sheets

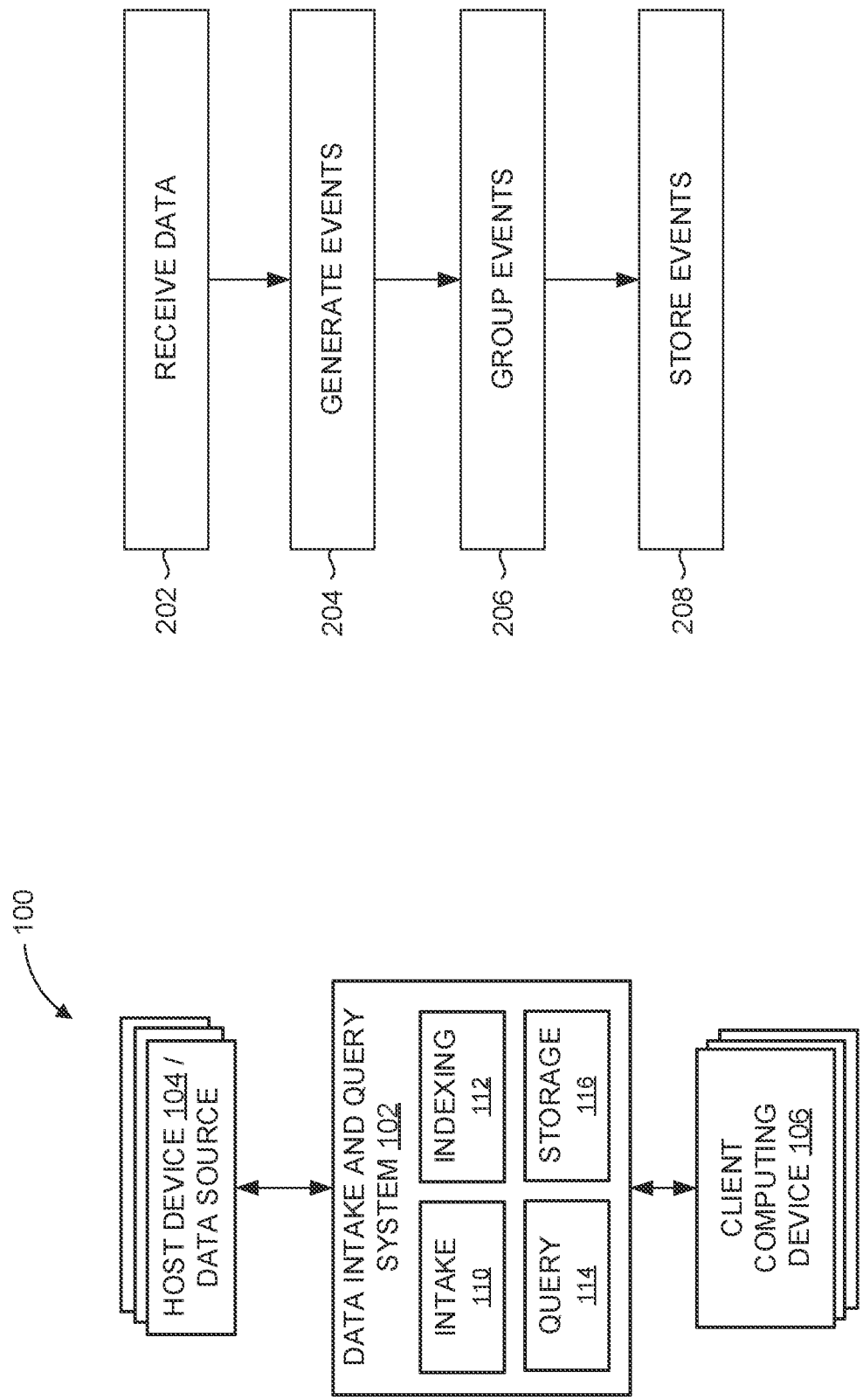

— 302

— 302A 127.0.0.1 – eva [10/Oct/2000:13:55:36-0700] "GET/apache.gif HTTP/1.0" 200 2326 0.0947
127.0.0.1 – emerson [10/Oct/2000:13:56:36-0700] "GET/eastwood.gif HTTP/1.0" 200 2980
0.0899                         — 302C    — 302B
127.0.0.3 – eliza [10/Oct/2000:13:57:36-0700] "GET/ezra.gif HTTP/1.0" 200 2900 0.0857
[Sunday Oct 10 1:58:33 2010] [error] [client 127.10.1.1.015] File does not exist: /home/emmeline/
pub_html/images/alisia.gif      — 302E                              — 302D
91.205.189.15 - - [28/Apr/2014:18:22:16] *GET /oldlink?itemId=EST-
14&JSESSIONID=SD6SL7FF7ADFF53113 HTTP 1.1" 200 1665 "http://
www.buttercupgames.com/oldlink?itemId=EST-14" "Mozilla/5.0 (Windwos NT 6.1; WOW 64)
AppleWebKit/536.5 (KHTML, like Gecko) Chrome/19.0.1084.46 Safari/536.5" 159

— 304 docker: {
    container_id: f7360a148a670c4c257f4ee024be81284b6017d72ae41ea8ee5d
}
                                        — 304A
kubernetes: {
    container_name: kube-apiserver
    host: ip-172-20-43-173.ec2.internal
    labels: {
        k8s-app: kube-apiserver
    }
master_url: https://100.64.0.1:443/api
namespace_id: e5af26aa-4ef9-11e8-a4e1-0a2bf2ab4bba
namespace_name: kube-system
pod_id: 0a73017b-4efa-11e8-a4e1-0a2bf2ab4bba
pod_name: kube-apiserver-ip-172-20-43-173.ec2.internal         — 304B
}
log: I0503 23:04:12.595203    1 wrap.go:42] GET /apis/admissionregistrations.k8s.io/v1beta1/
validatingwebhookconfiguration 200 [[kube-apiserver/v1.9.3 (linux/amd64) kubernetes/d283541]
127.0.0.1:55026 stream: stdout
time: 2018-05-03T23:04:12.619948395Z
}

— 306

| time | ID | CPU | memory |
| --- | --- | --- | --- |
| 10/10/00 12:01:00.013 | eliza | 14% | 80% |
| 10/10/00 12:01:05.153 | eva | 26% | 70% |

FIG. 3A

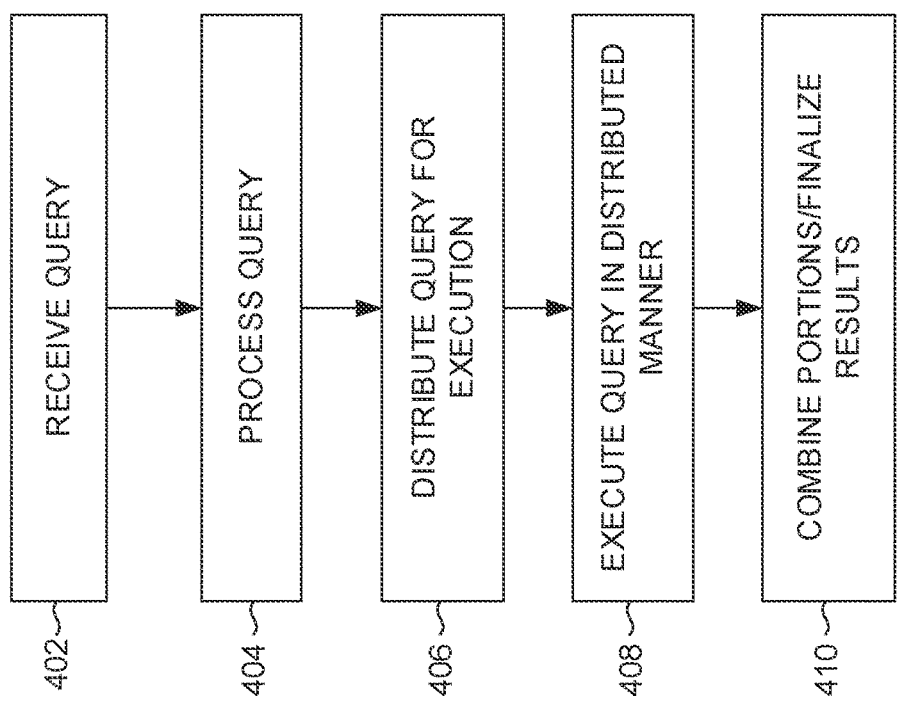

SECURE UPDATE OF DASHBOARD PROPERTIES

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include log data, performance data, diagnostic data, metrics, tracing data, or any other data that can be analyzed to diagnose equipment performance problems, monitor user interactions, and to derive other insights.

The large amount and diversity of data systems containing large amounts of structured, semi-structured, and unstructured data relevant to any search query can be massive, and continues to grow rapidly. This technological evolution can give rise to various challenges in relation to managing, understanding and effectively utilizing the data. To reduce the potentially vast amount of data that may be generated, some data systems pre-process data based on anticipated data analysis needs. In particular, specified data items may be extracted from the generated data and stored in a data system to facilitate efficient retrieval and analysis of those data items at a later time. At least some of the remainder of the generated data is typically discarded during pre-processing.

However, storing massive quantities of minimally processed or unprocessed data (collectively and individually referred to as "raw data") for later retrieval and analysis is becoming increasingly more feasible as storage capacity becomes more inexpensive and plentiful. In general, storing raw data and performing analysis on that data later can provide greater flexibility because it enables an analyst to analyze all of the generated data instead of only a fraction of it. Although the availability of vastly greater amounts of diverse data on diverse data systems provides opportunities to derive new insights, it also gives rise to technical challenges to search and analyze the data in a performant way.

BRIEF DESCRIPTION OF THE DRAWINGS

Illustrative examples are described in detail below with reference to the following figures:

FIG. 1 is a block diagram of an embodiment of a data processing environment.

FIG. 2 is a flow diagram illustrating an embodiment of a routine implemented by the data intake and query system to process, index, and store data.

FIG. 3A is a block diagram illustrating an embodiment of machine data received by the data intake and query system.

FIG. 4A is a flow diagram illustrating an embodiment of a routine implemented by the query system to execute a query.

DETAILED DESCRIPTION

Figure 3B:
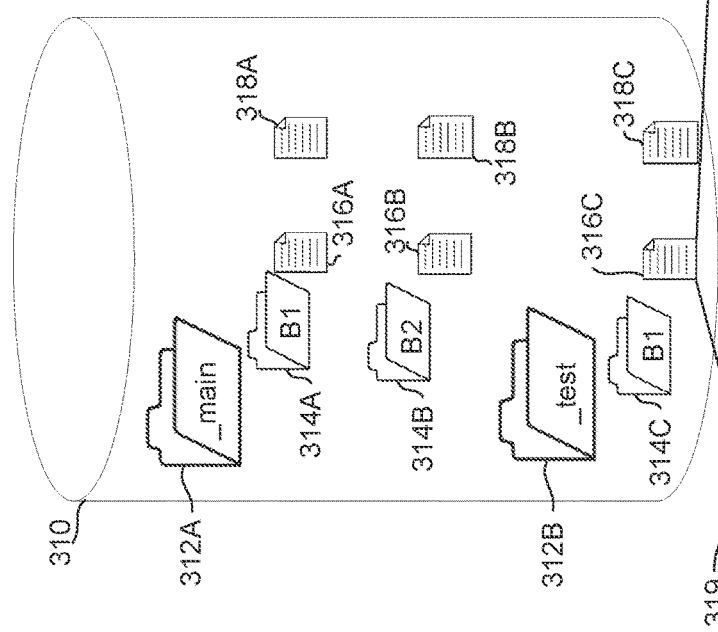
FIGS. 3B and 3C are block diagrams illustrating embodiments of various data structures for storing data processed by the data intake and query system.

Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment and that reflects activity in the IT environment. For example, machine data can be raw machine data that is generated by various components in IT environments, such as servers, sensors, routers, mobile devices, Internet of Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of tools are available to analyze machine data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that concurrently report these types of information.

These challenges can be addressed by using an event-based data intake and query system, such as the SPLUNK® ENTERPRISE, SPLUNK® CLOUD, or SPLUNK® CLOUD SERVICE system developed by Splunk Inc. of San Francisco, Calif. These systems represent the leading platform for providing real-time operational intelligence that enables organizations to collect, index, and search machine data from various websites, applications, servers, networks, and mobile devices that power their businesses. The data intake and query system is particularly useful for analyzing data which is commonly found in system log files, network data, metrics data, tracing data, and other data input sources.

In the data intake and query system, machine data is collected and stored as "events." An event comprises a portion of machine data and is associated with a specific point in time. The portion of machine data may reflect activity in an IT environment and may be produced by a component of that IT environment, where the events may be searched to provide insight into the IT environment, thereby improving the performance of components in the IT environment. Events may be derived from "time series data," where the time series data comprises a sequence of data points (e.g., performance measurements from a computer system, etc.) that are associated with successive points in time. In general, each event has a portion of machine data that is associated with a timestamp. The time stamp may be derived from the portion of machine data in the event, determined through interpolation between temporally proximate events having known timestamps, and/or may be determined based on other configurable rules for associating timestamps with events.

In some instances, machine data can have a predefined structure, where data items with specific data formats are stored at predefined locations in the data. For example, the machine data may include data associated with fields in a database table. In other instances, machine data may not have a predefined structure (e.g., may not be at fixed, predefined locations), but may have repeatable (e.g., non-random) patterns. This means that some machine data can comprise various data items of different data types that may be stored at different locations within the data. For example, when the data source is an operating system log, an event can include one or more lines from the operating system log containing machine data that includes different types of performance and diagnostic information associated with a specific point in time (e.g., a timestamp).

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The machine data generated by such data sources can include, for example and without limitation, server log files, activity log files, configuration files, messages, network packet data, performance measurements, sensor measurements, etc.

The data intake and query system can use flexible schema to specify how to extract information from events. A flexible schema may be developed and redefined as needed. The flexible schema can be applied to events "on the fly," when it is needed (e.g., at search time, index time, ingestion time, etc.). When the schema is not applied to events until search time, the schema may be referred to as a "late-binding schema."

During operation, the data intake and query system receives machine data from any type and number of sources (e.g., one or more system logs, streams of network packet data, sensor data, application program data, error logs, stack traces, system performance data, etc.). The system parses the machine data to produce events each having a portion of machine data associated with a timestamp, and stores the events. The system enables users to run queries against the stored events to, for example, retrieve events that meet filter criteria specified in a query, such as criteria indicating certain keywords or having specific values in defined fields. Additional query terms can further process the event data, such as, by transforming the data, etc.

As used herein, the term "field" can refer to a location in the machine data of an event containing one or more values for a specific data item. A field may be referenced by a field name associated with the field. As will be described in more detail herein, in some cases, a field is defined by an extraction rule (e.g., a regular expression) that derives one or more values or a sub-portion of text from the portion of machine data in each event to produce a value for the field for that event. The set of values produced are semantically-related (such as IP address), even though the machine data in each event may be in different formats (e.g., semantically-related values may be in different positions in the events derived from different sources).

As described above, the system stores the events in a data store. The events stored in the data store are field-searchable, where field-searchable herein refers to the ability to search the machine data (e.g., the raw machine data) of an event based on a field specified in search criteria. For example, a search having criteria that specifies a field name "UserID" may cause the system to field-search the machine data of events to identify events that have the field name "UserID." In another example, a search having criteria that specifies a field name "UserID" with a corresponding field value "12345" may cause the system to field-search the machine data of events to identify events having that field-value pair (e.g., field name "UserID" with a corresponding field value of "12345"). Events are field-searchable using one or more configuration files associated with the events. Each configuration file can include one or more field names, where each field name is associated with a corresponding extraction rule and a set of events to which that extraction rule applies. The set of events to which an extraction rule applies may be identified by metadata associated with the set of events. For example, an extraction rule may apply to a set of events that are each associated with a particular host, source, or source-type. When events are to be searched based on a particular field name specified in a search, the system can use one or more configuration files to determine whether there is an extraction rule for that particular field name that applies to each event that falls within the criteria of the search. If so, the event is considered as part of the search results (and additional processing may be performed on that event based on criteria specified in the search). If not, the next event is similarly analyzed, and so on.

As noted above, the data intake and query system can utilize a late-binding schema while performing queries on events. One aspect of a late-binding schema is applying extraction rules to events to extract values for specific fields during search time. More specifically, the extraction rule for a field can include one or more instructions that specify how to extract a value for the field from an event. An extraction rule can generally include any type of instruction for extracting values from machine data or events. In some cases, an extraction rule comprises a regular expression, where a sequence of characters form a search pattern. An extraction rule comprising a regular expression is referred to herein as a regex rule. The system applies a regex rule to machine data or an event to extract values for a field associated with the regex rule, where the values are extracted by searching the machine data/event for the sequence of characters defined in the regex rule.

In the data intake and query system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields specified in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the data intake and query system maintains the underlying machine data and uses a late-binding schema for searching the machine data, it enables a user to continue investigating and learn valuable insights about the machine data.

In some embodiments, a common field name may be used to reference two or more fields containing equivalent and/or similar data items, even though the fields may be associated with different types of events that possibly have different data formats and different extraction rules. By enabling a common field name to be used to identify equivalent and/or similar fields from different types of events generated by disparate data sources, the system facilitates use of a "common information model" (CIM) across the disparate data sources.

In some embodiments, the configuration files and/or extraction rules described above can be stored in a catalog, such as a metadata catalog. In certain embodiments, the content of the extraction rules can be stored as rules or actions in the metadata catalog. For example, the identification of the data to which the extraction rule applies can be referred to a rule and the processing of the data can be referred to as an action.

1.0. Operating Environment

FIG. 1 is a block diagram of an embodiment of a data processing environment 100. In the illustrated embodiment, the environment 100 includes a data intake and query system 102, one or more host devices 104, and one or more client computing devices 106 (generically referred to as client device(s) 106).

The data intake and query system 102, host devices 104, and client devices 106 can communicate with each other via one or more networks, such as a local area network (LAN), wide area network (WAN), private or personal network, cellular networks, intranetworks, and/or internetworks using any of wired, wireless, terrestrial microwave, satellite links, etc., and may include the Internet. Although not explicitly shown in FIG. 1, it will be understood that a client computing device 106 can communicate with a host device 104 via one or more networks. For example, if the host device 104 is configured as a web server and the client computing device 106 is a laptop, the laptop can communicate with the web server to view a website.

A client device 106 can correspond to a distinct computing device that can configure, manage, or sends queries to the system 102. Examples of client devices 106 may include, without limitation, smart phones, tablet computers, handheld computers, wearable devices, laptop computers, desktop computers, servers, portable media players, gaming devices, or other device that includes computer hardware (e.g., processors, non-transitory, computer-readable media, etc.) and so forth. In certain cases, a client device 106 can include a hosted, virtualized, or containerized device, such as an isolated execution environment, that shares computing resources (e.g., processor, memory, etc.) of a particular machine with other isolated execution environments.

The client devices 106 can interact with the system 102 (or a host device 104) in a variety of ways. For example, the client devices 106 can communicate with the system 102 (or a host device 104) over an Internet (Web) protocol, via a gateway, via a command line interface, via a software developer kit (SDK), a standalone application, etc. As another example, the client devices 106 can use one or more executable applications or programs to interface with the system 102.

A host device 104 can correspond to a distinct computing device or system that includes or has access to data that can be ingested, indexed, and/or searched by the system 102. Accordingly, in some cases, a client device 106 may also be a host device 104 (e.g., it can include data that is ingested by the system 102 and it can submit queries to the system 102). The host devices 104 can include, but are not limited to, servers, sensors, routers, personal computers, mobile devices, internet of things (IOT) devices, or hosting devices, such as computing devices in a shared computing resource environment on which multiple isolated execution environment (e.g., virtual machines, containers, etc.) can be instantiated, or other computing devices in an IT environment (e.g., device that includes computer hardware, e.g., processors, non-transitory, computer-readable media, etc.). In certain cases, a host device 104 can include a hosted, virtualized, or containerized device, such as an isolated execution environment, that shares computing resources (e.g., processor, memory, etc.) of a particular machine (e.g., a hosting device or hosting machine) with other isolated execution environments.

As mentioned host devices 104 can include or have access to data sources for the system 102. The data sources can include machine data found in log files, data files, distributed file systems, streaming data, publication-subscribe (pub/sub) buffers, directories of files, data sent over a network, event logs, registries, streaming data services (examples of which can include, by way of non-limiting example, Amazon's Simple Queue Service ("SQS") or Kinesis™ services, devices executing Apache Kafka™ software, or devices implementing the Message Queue Telemetry Transport (MQTT) protocol, Microsoft Azure EventHub, Google Cloud PubSub, devices implementing the Java Message Service (JMS) protocol, devices implementing the Advanced Message Queuing Protocol (AMQP)), cloud-based services (e.g., AWS, Microsoft Azure, Google Cloud, etc.), operating-system-level virtualization environments (e.g., Docker), container orchestration systems (e.g., Kubernetes), virtual machines using full virtualization or paravirtualization, or other virtualization technique or isolated execution environments.

In some cases, one or more applications executing on a host device may generate various types of machine data during operation. For example, a web server application executing on a host device 104 may generate one or more web server logs detailing interactions between the web server and any number of client devices 106 or other devices. As another example, a host device 104 implemented as a router may generate one or more router logs that record information related to network traffic managed by the router. As yet another example, a database server application executing on a host device 104 may generate one or more logs that record information related to requests sent from other devices (e.g., web servers, application servers, client devices, etc.) for data managed by the database server. Similarly, a host device 104 may generate and/or store computing resource utilization metrics, such as, but not limited to, CPU utilization, memory utilization, number of processes being executed, etc. Any one or any combination of the files or data generated in such cases can be used as a data source for the system 102.

In some embodiments, an application may include a monitoring component that facilitates generating performance data related to host device's operating state, including monitoring network traffic sent and received from the host device and collecting other device and/or application-specific information. A monitoring component may be an integrated component of the application, a plug-in, an extension, or any other type of add-on component, or a stand-alone process.

Such monitored information may include, but is not limited to, network performance data (e.g., a URL requested, a connection type (e.g., HTTP, HTTPS, etc.), a connection start time, a connection end time, an HTTP status code, request length, response length, request headers, response headers, connection status (e.g., completion, response time(s), failure, etc.)) or device performance information (e.g., current wireless signal strength of the device, a current connection type and network carrier, current memory performance information, processor utilization, memory utilization, a geographic location of the device, a device orientation, and any other information related to the operational state of the host device, etc.), device profile information (e.g., a type of client device, a manufacturer, and model of the device, versions of various software applications installed on the device, etc.) In some cases, the monitoring component can collect device performance information by monitoring one or more host device operations, or by making calls to an operating system and/or one or more other applications executing on a host device for performance information. The monitored information may be stored in one or more files and/or streamed to the system 102.

In general, a monitoring component may be configured to generate performance data in response to a monitor trigger in the code of a client application or other triggering application event, as described above, and to store the performance data in one or more data records. Each data record, for example, may include a collection of field-value pairs, each field-value pair storing a particular item of performance data in association with a field for the item. For example, a data record generated by a monitoring component may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

In some embodiments, such as in a shared computing resource environment (or hosted environment), a host device 104 may include logs or machine data generated by an application executing within an isolated execution environment (e.g., web server log file if the isolated execution environment is configured as a web server or database server log files if the isolated execution environment is configured as database server, etc.), machine data associated with the computing resources assigned to the isolated execution environment (e.g., CPU utilization of the portion of the CPU allocated to the isolated execution environment, memory utilization of the portion of the memory allocated to the isolated execution environment, etc.), logs or machine data generated by an application that enables the isolated execution environment to share resources with other isolated execution environments (e.g., logs generated by a Docker manager or Kubernetes manager executing on the host device 104), and/or machine data generated by monitoring the computing resources of the host device 104 (e.g., CPU utilization, memory utilization, etc.) that are shared between the isolated execution environments. Given the separation (and isolation) between isolated execution environments executing on a common computing device, in certain embodiments, each isolated execution environment may be treated as a separate host device 104 even if they are, in fact, executing on the same computing device or hosting device.

Accordingly, as used herein, obtaining data from a data source may refer to communicating with a host device 104 to obtain data from the host device 104 (e.g., from one or more data source files, data streams, directories on the host device 104, etc.). For example, obtaining data from a data source may refer to requesting data from a host device 104 and/or receiving data from a host device 104. In some such cases, the host device 104 can retrieve and return the requested data from a particular data source and/or the system 102 can retrieve the data from a particular data source of the host device 104 (e.g., from a particular file stored on a host device 104).

The data intake and query system 102 can ingest, index, and/or store data from heterogeneous data sources and/or host devices 104. For example, the system 102 can ingest, index, and/or store any type of machine data, regardless of the form of the machine data or whether the machine data matches or is similar to other machine data ingested, indexed, and/or stored by the system 102. In some cases, the system 102 can generate events from the received data, group the events, and store the events in buckets. The system 102 can also search heterogeneous data that it has stored or search data stored by other systems (e.g., other system 102 systems or other non-system 102 systems). For example, in response to received queries, the system 102 can assign one or more components to search events stored in the storage system or search data stored elsewhere.

As will be described herein in greater detail below, the system 102 can use one or more components to ingest, index, store, and/or search data. In some embodiments, the system 102 is implemented as a distributed system that uses multiple components to perform its various functions. For example, the system 102 can include any one or any combination of an intake system 110 (including one or more components) to ingest data, an indexing system 112 (including one or more components) to index the data, a storage system 116 (including one or more components) to store the data, and/or a query system 114 (including one or more components) to search the data, etc.

In the illustrated embodiment, the system 102 is shown having four subsystems 110, 112, 114, 116. However, it will be understood that the system 102 may include any one or any combination of the intake system 110, indexing system 112, query system 114, or storage system 116. Further, in certain embodiments, one or more of the intake system 110, indexing system 112, query system 114, or storage system 116 may be used alone or apart from the system 102. For example, the intake system 110 may be used alone to glean information from streaming data that is not indexed or stored by the system 102, or the query system 114 may be used to search data that is unaffiliated with the system 102.

In certain embodiments, the components of the different systems may be distinct from each other or there may be some overlap. For example, one component of the system 102 may include some indexing functionality and some searching functionality and thus be used as part of the indexing system 112 and query system 114, while another computing device of the system 102 may only have ingesting or search functionality and only be used as part of those respective systems. Similarly, the components of the storage system 116 may include data stores of individual components of the indexing system and/or may be a separate shared data storage system, like Amazon S3, that is accessible to distinct components of the intake system 110, indexing system 112, and query system 114.

In some cases, the components of the system 102 are implemented as distinct computing devices having their own computer hardware (e.g., processors, non-transitory, computer-readable media, etc.) and/or as distinct hosted devices (e.g., isolated execution environments) that share computing resources or hardware in a shared computing resource environment.

For simplicity, references made herein to the intake system 110, indexing system 112, storage system 116, and query system 114 can refer to those components used for ingesting, indexing, storing, and searching, respectively. However, it will be understood that although reference is made to two separate systems, the same underlying component may be performing the functions for the two different systems. For example, reference to the indexing system indexing data and storing the data in the storage system 116 or the query system searching the data may refer to the same component (e.g., same computing device or hosted device) indexing the data, storing the data, and then searching the data that it stored.

As will be described in greater detail herein, the intake system 110 can receive data from the host devices 104 or data sources, perform one or more preliminary processing operations on the data, and communicate the data to the indexing system 112, query system 114, storage system 116, or to other systems (which may include, for example, data processing systems, telemetry systems, real-time analytics systems, data stores, databases, etc., any of which may be operated by an operator of the system 102 or a third party). Given the amount of data that can be ingested by the intake system 110, in some embodiments, the intake system can include multiple distributed computing devices or components working concurrently to ingest the data.

The intake system 110 can receive data from the host devices 104 in a variety of formats or structures. In some embodiments, the received data corresponds to raw machine data, structured or unstructured data, correlation data, data files, directories of files, data sent over a network, event logs, registries, messages published to streaming data sources, performance metrics, sensor data, image and video data, etc.

The preliminary processing operations performed by the intake system 110 can include, but is not limited to, associating metadata with the data received from a host device 104, extracting a timestamp from the data, identifying individual events within the data, extracting a subset of machine data for transmittal to the indexing system 112, enriching the data, etc. As part of communicating the data to the indexing system, the intake system 110 can route the data to a particular component of the intake system 110 or dynamically route the data based on load-balancing, etc. In certain cases, one or more components of the intake system 110 can be installed on a host device 104.

1.1. Indexing System Overview

As will be described in greater detail herein, the indexing system 112 can include one or more components (e.g., indexing nodes) to process the data and store it, for example, in the storage system 116. As part of processing the data, the indexing system can identify distinct events within the data, timestamps associated with the data, organize the data into buckets or time series buckets, convert editable buckets to non-editable buckets, store copies of the buckets in the storage system 116, merge buckets, generate indexes of the data, etc. In addition, the indexing system 112 can update various catalogs or databases with information related to the buckets (pre-merged or merged) or data that is stored in the storage system 116, and can communicate with the intake system 110 about the status of the data storage.

As will be described in greater detail herein, the query system 114 can include one or more components to receive, process, and execute queries. In some cases, the query system 114 can use the same component to process and execute the query or use one or more components to receive and process the query (e.g., a search head) and use one or more other components to execute at least a portion of the query (e.g., search nodes). In some cases, a search node and an indexing node may refer to the same computing device or hosted device performing different functions. In certain cases, a search node can be a separate computing device or hosted device from an indexing node.

Queries received by the query system 114 can be relatively complex and identify a set of data to be processed and a manner of processing the set of data from one or more client devices 106. In certain cases, the query can be implemented using a pipelined command language or other query language. As described herein, in some cases, the query system 114 can execute parts of the query in a distributed fashion (e.g., one or more mapping phases or parts associated with identifying and gathering the set of data identified in the query) and execute other parts of the query on a single component (e.g., one or more reduction phases). However, it will be understood that in some cases multiple components can be used in the map and/or reduce functions of the query execution.

In some cases, as part of executing the query, the query system 114 can use one or more catalogs or databases to identify the set of data to be processed or its location in the storage system 116 and/or can retrieve data from the storage system 116. In addition, in some embodiments, the query system 114 can store some or all of the query results in the storage system 116.

In some cases, the storage system 116 may include one or more data stores associated with or coupled to the components of the indexing system 112 that are accessible via a system bus or local area network. In certain embodiments, the storage system 116 may be a shared storage system 116, like Amazon S3 or Google Cloud Storage, that are accessible via a wide area network.

As mentioned and as will be described in greater detail below, the storage system 116 can be made up of one or more data stores storing data that has been processed by the indexing system 112. In some cases, the storage system includes data stores of the components of the indexing system 112 and/or query system 114. In certain embodiments, the storage system 116 can be implemented as a shared storage system 116. The shared storage system 116 can be configured to provide high availability, highly resilient, low loss data storage. In some cases, to provide the high availability, highly resilient, low loss data storage, the shared storage system 116 can store multiple copies of the data in the same and different geographic locations and across different types of data stores (e.g., solid state, hard drive, tape, etc.). Further, as data is received at the shared storage system 116 it can be automatically replicated multiple times according to a replication factor to different data stores across the same and/or different geographic locations. In some embodiments, the shared storage system 116 can correspond to cloud storage, such as Amazon Simple Storage Service (S3) or Elastic Block Storage (EBS), Google Cloud Storage, Microsoft Azure Storage, etc.

In some embodiments, indexing system 112 can read to and write from the shared storage system 116. For example, the indexing system 112 can copy buckets of data from its local or shared data stores to the shared storage system 116. In certain embodiments, the query system 114 can read from, but cannot write to, the shared storage system 116. For example, the query system 114 can read the buckets of data stored in shared storage system 116 by the indexing system 112, but may not be able to copy buckets or other data to the shared storage system 116. In some embodiments, the intake system 110 does not have access to the shared storage system 116. However, in some embodiments, one or more components of the intake system 110 can write data to the shared storage system 116 that can be read by the indexing system 112.

As described herein, in some embodiments, data in the system 102 (e.g., in the data stores of the components of the indexing system 112, shared storage system 116, or search nodes of the query system 114) can be stored in one or more time series buckets. Each bucket can include raw machine data associated with a timestamp and additional information about the data or bucket, such as, but not limited to, one or more filters, indexes (e.g., TSIDX, inverted indexes, keyword indexes, etc.), bucket summaries, etc. In some embodiments, the bucket data and information about the bucket data is stored in one or more files. For example, the raw machine data, filters, indexes, bucket summaries, etc. can be stored in respective files in or associated with a bucket. In certain cases, the group of files can be associated together to form the bucket.

The system 102 can include additional components that interact with any one or any combination of the intake system 110, indexing system 112, query system 114, and/or storage system 116. Such components may include, but are not limited to an authentication system, orchestration system, one or more catalogs or databases, a gateway, etc.

An authentication system can include one or more components to authenticate users to access, use, and/or configure the system 102. Similarly, the authentication system can be used to restrict what a particular user can do on the system 102 and/or what components or data a user can access, etc.

An orchestration system can include one or more components to manage and/or monitor the various components of the system 102. In some embodiments, the orchestration system can monitor the components of the system 102 to detect when one or more components has failed or is unavailable and enable the system 102 to recover from the failure (e.g., by adding additional components, fixing the failed component, or having other components complete the tasks assigned to the failed component). In certain cases, the orchestration system can determine when to add components to or remove components from a particular system 110, 112, 114, 116 (e.g., based on usage, user/tenant requests, etc.). In embodiments where the system 102 is implemented in a shared computing resource environment, the orchestration system can facilitate the creation and/or destruction of isolated execution environments or instances of the components of the system 102, etc.

In certain embodiments, the system 102 can include various components that enable it to provide stateless services or enable it to recover from an unavailable or unresponsive component without data loss in a time efficient manner. For example, the system 102 can store contextual information about its various components in a distributed way such that if one of the components becomes unresponsive or unavailable, the system 102 can replace the unavailable component with a different component and provide the replacement component with the contextual information. In this way, the system 102 can quickly recover from an unresponsive or unavailable component while reducing or eliminating the loss of data that was being processed by the unavailable component.

In some embodiments, the system 102 can store the contextual information in a catalog, as described herein. In certain embodiments, the contextual information can correspond to information that the system 102 has determined or learned based on use. In some cases, the contextual information can be stored as annotations (manual annotations and/or system annotations), as described herein.

In certain embodiments, the system 102 can include an additional catalog that monitors the location and storage of data in the storage system 116 to facilitate efficient access of the data during search time. In certain embodiments, such a catalog may form part of the storage system 116.

In some embodiments, the system 102 can include a gateway or other mechanism to interact with external devices or to facilitate communications between components of the system 102. In some embodiments, the gateway can be implemented using an application programming interface (API). In certain embodiments, the gateway can be implemented using a representational state transfer API (REST API).

In some environments, a user of a system 102 may install and configure, on computing devices owned and operated by the user, one or more software applications that implement some or all of the components of the system 102. For example, with reference to FIG. 1, a user may install a software application on server computers owned by the user and configure each server to operate as one or more components of the intake system 110, indexing system 112, query system 114, shared storage system 116, or other components of the system 102. This arrangement generally may be referred to as an "on-premises" solution. That is, the system 102 is installed and operates on computing devices directly controlled by the user of the system 102. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 102 operate.

In certain embodiments, one or more of the components of the system 102 can be implemented in a shared computing resource environment. In this context, a shared computing resource environment or cloud-based service can refer to a service hosted by one more computing resources that are accessible to end users over a network, for example, by using a web browser or other application on a client device to interface with the remote computing resources. For example, a service provider may provide a system 102 by managing computing resources configured to implement various aspects of the system (e.g., intake system 110, indexing system 112, query system 114, shared storage system 116, other components, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

When implemented in a shared computing resource environment, the underlying hardware (non-limiting examples: processors, hard drives, solid-state memory, RAM, etc.) on which the components of the system 102 execute can be shared by multiple customers or tenants as part of the shared computing resource environment. In addition, when implemented in a shared computing resource environment as a cloud-based service, various components of the system 102 can be implemented using containerization or operating-system-level virtualization, or other virtualization technique. For example, one or more components of the intake system 110, indexing system 112, or query system 114 can be implemented as separate software containers or container instances. Each container instance can have certain computing resources (e.g., memory, processor, etc.) of an underlying hosting computing system (e.g., server, microprocessor, etc.) assigned to it, but may share the same operating system and may use the operating system's system call interface. Each container may provide an isolated execution environment on the host system, such as by providing a memory space of the hosting system that is logically isolated from memory space of other containers. Further, each container may run the same or different computer applications concurrently or separately, and may interact with each other. Although reference is made herein to containerization and container instances, it will be understood that other virtualization techniques can be used. For example, the components can be implemented using virtual machines using full virtualization or paravirtualization, etc. Thus, where reference is made to "containerized" components, it should be understood that such components may additionally or alternatively be implemented in other isolated execution environments, such as a virtual machine environment.

Implementing the system 102 in a shared computing resource environment can provide a number of benefits. In some cases, implementing the system 102 in a shared computing resource environment can make it easier to install, maintain, and update the components of the system 102. For example, rather than accessing designated hardware at a particular location to install or provide a component of the system 102, a component can be remotely instantiated or updated as desired. Similarly, implementing the system 102 in a shared computing resource environment or as a cloud-based service can make it easier to meet dynamic demand. For example, if the system 102 experiences significant load at indexing or search, additional compute resources can be deployed to process the additional data or queries. In an "on-premises" environment, this type of flexibility and scalability may not be possible or feasible.

In addition, by implementing the system 102 in a shared computing resource environment or as a cloud-based service can improve compute resource utilization. For example, in an on-premises environment if the designated compute resources are not being used by, they may sit idle and unused. In a shared computing resource environment, if the compute resources for a particular component are not being used, they can be re-allocated to other tasks within the system 102 and/or to other systems unrelated to the system 102.

As mentioned, in an on-premises environment, data from one instance of a system 102 is logically and physically separated from the data of another instance of a system 102 by virtue of each instance having its own designated hardware. As such, data from different customers of the system 102 is logically and physically separated from each other. In a shared computing resource environment, components of a system 102 can be configured to process the data from one customer or tenant or from multiple customers or tenants. Even in cases where a separate component of a system 102 is used for each customer, the underlying hardware on which the components of the system 102 are instantiated may still process data from different tenants. Accordingly, in a shared computing resource environment, the data from different tenants may not be physically separated on distinct hardware devices. For example, data from one tenant may reside on the same hard drive as data from another tenant or be processed by the same processor. In such cases, the system 102 can maintain logical separation between tenant data. For example, the system 102 can include separate directories for different tenants and apply different permissions and access controls to access the different directories or to process the data, etc.

In certain cases, the tenant data from different tenants is mutually exclusive and/or independent from each other. For example, in certain cases, Tenant A and Tenant B do not share the same data, similar to the way in which data from a local hard drive of Customer A is mutually exclusive and independent of the data (and not considered part) of a local hard drive of Customer B. While Tenant A and Tenant B may have matching or identical data, each tenant would have a separate copy of the data. For example, with reference again to the local hard drive of Customer A and Customer B example, each hard drive could include the same file. However, each instance of the file would be considered part of the separate hard drive and would be independent of the other file. Thus, one copy of the file would be part of Customer's A hard drive and a separate copy of the file would be part of Customer B's hard drive. In a similar manner, to the extent Tenant A has a file that is identical to a file of Tenant B, each tenant would have a distinct and independent copy of the file stored in different locations on a data store or on different data stores.

Further, in certain cases, the system 102 can maintain the mutual exclusivity and/or independence between tenant data even as the tenant data is being processed, stored, and searched by the same underlying hardware. In certain cases, to maintain the mutual exclusivity and/or independence between the data of different tenants, the system 102 can use tenant identifiers to uniquely identify data associated with different tenants.

In a shared computing resource environment, some components of the system 102 can be instantiated and designated for individual tenants and other components can be shared by multiple tenants. In certain embodiments, a separate intake system 110, indexing system 112, and query system 114 can be instantiated for each tenant, whereas the shared storage system 116 or other components (e.g., data store, metadata catalog, and/or acceleration data store, described below) can be shared by multiple tenants. In some such embodiments where components are shared by multiple tenants, the components can maintain separate directories for the different tenants to ensure their mutual exclusivity and/or independence from each other. Similarly, in some such embodiments, the system 102 can use different hosting computing systems or different isolated execution environments to process the data from the different tenants as part of the intake system 110, indexing system 112, and/or query system 114.

In some embodiments, individual components of the intake system 110, indexing system 112, and/or query system 114 may be instantiated for each tenant or shared by multiple tenants. For example, some individual intake system components (e.g., forwarders, output ingestion buffer) may be instantiated and designated for individual tenants, while other intake system components (e.g., a data retrieval subsystem, intake ingestion buffer, and/or streaming data processor), may be shared by multiple tenants.

In certain embodiments, an indexing system 112 (or certain components thereof) can be instantiated and designated for a particular tenant or shared by multiple tenants. In some embodiments where a separate indexing system 112 is instantiated and designated for each tenant, different resources can be reserved for different tenants. For example, Tenant A can be consistently allocated a minimum of four indexing nodes and Tenant B can be consistently allocated a minimum of two indexing nodes. In some such embodiments, the four indexing nodes can be reserved for Tenant A and the two indexing nodes can be reserved for Tenant B, even if Tenant A and Tenant B are not using the reserved indexing nodes.

In embodiments where an indexing system 112 is shared by multiple tenants, components of the indexing system 112 can be dynamically assigned to different tenants. For example, if Tenant A has greater indexing demands, additional indexing nodes can be instantiated or assigned to Tenant A's data. However, as the demand decreases, the indexing nodes can be reassigned to a different tenant, or terminated. Further, in some embodiments, a component of the indexing system 112 can concurrently process data from the different tenants.

In some embodiments, one instance of query system 114 may be shared by multiple tenants. In some such cases, the same search head can be used to process/execute queries for different tenants and/or the same search nodes can be used to execute query for different tenants. Further, in some such cases, different tenants can be allocated different amounts of compute resources. For example, Tenant A may be assigned more search heads or search nodes based on demand or based on a service level arrangement than another tenant. However, once a search is completed the search head and/or nodes assigned to Tenant A may be assigned to Tenant B, deactivated, or their resource may be re-allocated to other components of the system 102, etc.

In some cases, by sharing more components with different tenants, the functioning of the system 102 can be improved. For example, by sharing components across tenants, the system 102 can improve resource utilization thereby reducing the amount of resources allocated as a whole. For example, if four indexing nodes, two search heads, and four search nodes are reserved for each tenant then those compute resources are unavailable for use by other processes or tenants, even if they go unused. In contrast, by sharing the indexing nodes, search heads, and search nodes with different tenants and instantiating additional compute resources, the system 102 can use fewer resources overall while providing improved processing time for the tenants that are using the compute resources. For example, if tenant A is not using any search nodes 506 and tenant B has many searches running, the system 102 can use search nodes that would have been reserved for tenant A to service tenant B. In this way, the system 102 can decrease the number of compute resources used/reserved, while improving the search time for tenant B and improving compute resource utilization.

2.0. Data Ingestion, Indexing, and Storage

FIG. 2 is a flow diagram illustrating an embodiment of a routine implemented by the system 102 to process, index, and store data received from host devices 104. The data flow illustrated in FIG. 2 is provided for illustrative purposes only. It will be understood that one or more of the steps of the processes illustrated in FIG. 2 may be removed or that the ordering of the steps may be changed. Furthermore, for the purposes of illustrating a clear example, one or more particular system components are described in the context of performing various operations during each of the data flow stages. For example, the intake system 110 is described as receiving machine data and the indexing system 112 is described as generating events, grouping events, and storing events. However, other system arrangements and distributions of the processing steps across system components may be used. For example, in some cases, the intake system 110 may generate events.

At block 202, the intake system 110 receives data from a host device 104. The intake system 110 initially may receive the data as a raw data stream generated by the host device 104. For example, the intake system 110 may receive a data stream from a log file generated by an application server, from a stream of network data from a network device, or from any other source of data. Non-limiting examples of machine data that can be received by the intake system 110 is described herein with reference to FIG. 3A.

In some embodiments, the intake system 110 receives the raw data and may segment the data stream into messages, possibly of a uniform data size, to facilitate subsequent processing steps. The intake system 110 may thereafter process the messages in accordance with one or more rules to conduct preliminary processing of the data. In one embodiment, the processing conducted by the intake system 110 may be used to indicate one or more metadata fields applicable to each message. For example, the intake system 110 may include metadata fields within the messages, or publish the messages to topics indicative of a metadata field. These metadata fields may, for example, provide information related to a message as a whole and may apply to each event that is subsequently derived from the data in the message. For example, the metadata fields may include separate fields specifying each of a host, a source, and a sourcetype related to the message. A host field may contain a value identifying a host name or IP address of a device that generated the data. A source field may contain a value identifying a source of the data, such as a pathname of a file or a protocol and port related to received network data. A sourcetype field may contain a value specifying a particular sourcetype label for the data. Additional metadata fields may also be included, such as a character encoding of the data, if known, and possibly other values that provide information relevant to later processing steps. In certain embodiments, the intake system 110 may perform additional operations, such as, but not limited to, identifying individual events within the data, determining timestamps for the data, further enriching the data, etc.

At block 204, the indexing system 112 generates events from the data. In some cases, as part of generating the events, the indexing system 112 can parse the data of the message. In some embodiments, the indexing system 112 can determine a sourcetype associated with each message (e.g., by extracting a sourcetype label from the metadata fields associated with the message, etc.) and refer to a sourcetype configuration corresponding to the identified sourcetype to parse the data of the message. The sourcetype definition may include one or more properties that indicate to the indexing system 112 to automatically determine the boundaries within the received data that indicate the portions of machine data for events. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a sourcetype for the data is unknown to the indexing system 112, the indexing system 112 may infer a sourcetype for the data by examining the structure of the data. Then, the indexing system 112 can apply an inferred sourcetype definition to the data to create the events.

In addition, as part of generating events from the data, the indexing system 112 can determine a timestamp for each event. Similar to the process for parsing machine data, the indexing system 112 may again refer to a sourcetype definition associated with the data to locate one or more properties that indicate instructions for determining a timestamp for each event. The properties may, for example, instruct the indexing system 112 to extract a time value from a portion of data for the event (e.g., using a regex rule), to interpolate time values based on timestamps associated with temporally proximate events, to create a timestamp based on a time the portion of machine data was received or generated, to use the timestamp of a previous event, or use any other rules for determining timestamps, etc.

The indexing system 112 can also associate events with one or more metadata fields. In some embodiments, a timestamp may be included in the metadata fields. These metadata fields may include any number of "default fields" that are associated with all events, and may also include one more custom fields as defined by a user. In certain embodiments, the default metadata fields associated with each event may include a host, source, and sourcetype field including or in addition to a field storing the timestamp.

In certain embodiments, the indexing system 112 can also apply one or more transformations to event data that is to be included in an event. For example, such transformations can include removing a portion of the event data (e.g., a portion used to define event boundaries, extraneous characters from the event, other extraneous text, etc.), masking a portion of event data (e.g., masking a credit card number), removing redundant portions of event data, etc. The transformations applied to event data may, for example, be specified in one or more configuration files and referenced by one or more sourcetype definitions.

At block 206, the indexing system 112 can group events. In some embodiments, the indexing system 112 can group events based on time. For example, events generated within a particular time period or events that have a time stamp within a particular time period can be grouped together to form a bucket. A non-limiting example of a bucket is described herein with reference to FIG. 3B.

In certain embodiments, multiple components of the indexing system, such as an indexing node, can concurrently generate events and buckets. Furthermore, each indexing node that generates and groups events can concurrently generate multiple buckets. For example, multiple processors of an indexing node can concurrently process data, generate events, and generate buckets. Further, multiple indexing nodes can concurrently generate events and buckets. As such, ingested data can be processed in a highly distributed manner.

In some embodiments, as part of grouping events together, the indexing system 112 can generate one or more inverted indexes for a particular group of events. A non-limiting example of an inverted index is described herein with reference to FIG. 3C. In certain embodiments, the inverted indexes can include location information for events of a bucket. For example, the events of a bucket may be compressed into one or more files to reduce their size. The inverted index can include location information indicating the particular file and/or location within a particular file of a particular event.

In certain embodiments, the inverted indexes may include keyword entries or entries for field values or field name-value pairs found in events. In some cases, a field name-value pair can include a pair of words connected by a symbol, such as an equals sign or colon. The entries can also include location information for events that include the keyword, field value, or field value pair. In this way, relevant events can be quickly located. In some embodiments, fields can automatically be generated for some or all of the field names of the field name-value pairs at the time of indexing. For example, if the string "dest=10.0.1.2" is found in an event, a field named "dest" may be created for the event, and assigned a value of "10.0.1.2." In certain embodiments, the indexing system can populate entries in the inverted index with field name-value pairs by parsing events using one or more regex rules to determine a field value associated with a field defined by the regex rule. For example, the regex rule may indicate how to find a field value for a userID field in certain events. In some cases, the indexing system 112 can use the sourcetype of the event to determine which regex to use for identifying field values.

Figure 3C:
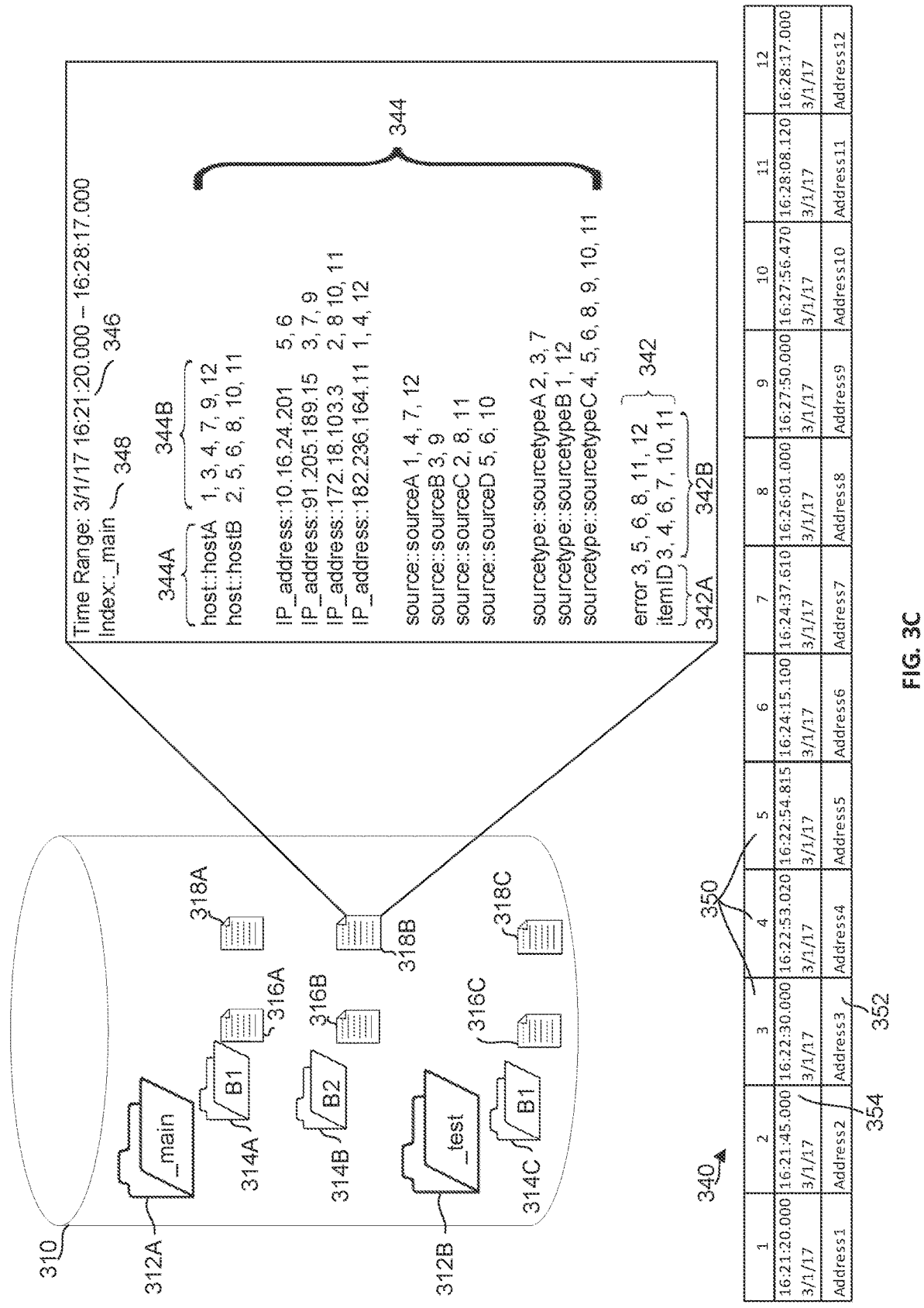

At block 208, the indexing system 112 stores the events with an associated timestamp in the storage system 116, which may be in a local data store and/or in a shared storage system. Timestamps enable a user to search for events based on a time range. In some embodiments, the stored events are organized into "buckets," where each bucket stores events associated with a specific time range based on the timestamps associated with each event. As mentioned, FIGS. 3B and 3C illustrate an example of a bucket. This improves time-based searching, as well as allows for events with recent timestamps, which may have a higher likelihood of being accessed, to be stored in a faster memory to facilitate faster retrieval. For example, buckets containing the most recent events can be stored in flash memory rather than on a hard disk. In some embodiments, each bucket may be associated with an identifier, a time range, and a size constraint.

The indexing system 112 may be responsible for storing the events in the storage system 116. As mentioned, the events or buckets can be stored locally on a component of the indexing system 112 or in a shared storage system 116. In certain embodiments, the component that generates the events and/or stores the events (indexing node) can also be assigned to search the events. In some embodiments separate components can be used for generating and storing events (indexing node) and for searching the events (search node).

By storing events in a distributed manner (either by storing the events at different components or in a shared storage system 116), the query system 114 can analyze events for a query in parallel. For example, using map-reduce techniques, multiple components of the query system (e.g., indexing or search nodes) can concurrently search and provide partial responses for a subset of events to another component (e.g., search head) that combines the results to produce an answer for the query. By storing events in buckets for specific time ranges, the indexing system 112 may further optimize the data retrieval process by the query system 114 to search buckets corresponding to time ranges that are relevant to a query. In some embodiments, each bucket may be associated with an identifier, a time range, and a size constraint. In certain embodiments, a bucket can correspond to a file system directory and the machine data, or events, of a bucket can be stored in one or more files of the file system directory. The file system directory can include additional files, such as one or more inverted indexes, high performance indexes, permissions files, configuration files, etc.

In embodiments where components of the indexing system 112 store buckets locally, the components can include a home directory and a cold directory. The home directory can store hot buckets and warm buckets, and the cold directory stores cold buckets. A hot bucket can refer to a bucket that is capable of receiving and storing additional events. A warm bucket can refer to a bucket that can no longer receive events for storage, but has not yet been moved to the cold directory. A cold bucket can refer to a bucket that can no longer receive events and may be a bucket that was previously stored in the home directory. The home directory may be stored in faster memory, such as flash memory, as events may be actively written to the home directory, and the home directory may typically store events that are more frequently searched and thus are accessed more frequently. The cold directory may be stored in slower and/or larger memory, such as a hard disk, as events are no longer being written to the cold directory, and the cold directory may typically store events that are not as frequently searched and thus are accessed less frequently. In some embodiments, components of the indexing system 112 may also have a quarantine bucket that contains events having potentially inaccurate information, such as an incorrect timestamp associated with the event or a timestamp that appears to be an unreasonable timestamp for the corresponding event. The quarantine bucket may have events from any time range, as such, the quarantine bucket may always be searched at search time. Additionally, components of the indexing system may store old, archived data in a frozen bucket that is not capable of being searched at search time. In some embodiments, a frozen bucket may be stored in slower and/or larger memory, such as a hard disk, and may be stored in offline and/or remote storage.

In some embodiments, components of the indexing system 112 may not include a cold directory and/or cold or frozen buckets. For example, in embodiments where buckets are copied to a shared storage system 116 and searched by separate components of the query system 114, buckets can be deleted from components of the indexing system as they are stored to the storage system 116. In certain embodiments, the shared storage system 116 may include a home directory that includes warm buckets copied from the indexing system 112 and a cold directory of cold or frozen buckets as described above.

FIG. 3A is a block diagram illustrating an embodiment of machine data received by the system 102. The machine data can correspond to data from one or more host devices 104 or data sources. As mentioned, the data source can correspond to a log file, data stream or other data structure that is accessible by a host device 104. In the illustrated embodiment of FIG. 3A, the machine data has different forms. For example, the machine data 302 may be log data that is unstructured or that does not have any clear structure or fields, and include different portions 302A-302E that correspond to different entries of the log and that separated by boundaries. Such data may also be referred to as raw machine data.

The machine data 304 may be referred to as structured or semi-structured machine data as it does include some data in a JSON structure defining certain field and field values (e.g., machine data 304A showing field name:field values container_name:kube-apiserver, host:ip 172 20 43 173.ec2.internal, pod_id:0a73017b-4efa-11e8-a4e1-0a2bf2ab4bba, etc.), but other parts of the machine data 304 is unstructured or raw machine data (e.g., machine data 304B). The machine data 306 may be referred to as structured data as it includes particular rows and columns of data with field names and field values.

In some embodiments, the machine data 302 can correspond to log data generated by a host device 104 configured as an Apache server, the machine data 304 can correspond to log data generated by a host device 104 in a shared computing resource environment, and the machine data 306 can correspond to metrics data. Given the differences between host devices 104 that generated the log data 302, 304, the form of the log data 302, 304 is different. In addition, as the log data 304 is from a host device 104 in a shared computing resource environment, it can include log data generated by an application being executed within an isolated execution environment (304B, excluding the field name "log:") and log data generated by an application that enables the sharing of computing resources between isolated execution environments (all other data in 304). Although shown together in FIG. 3A, it will be understood that machine data with different hosts, sources, or sourcetypes can be received separately and/or found in different data sources and/or host devices 104.

As described herein, the system 102 can process the machine data based on the form in which it is received. In some cases, the intake system 110 can utilize one or more rules to process the data. In certain embodiments, the intake system 110 can enrich the received data. For example, the intake system may add one or more fields to the data received from the host devices 104, such as fields denoting the host, source, sourcetype, index, or tenant associated with the incoming data. In certain embodiments, the intake system 110 can perform additional processing on the incoming data, such as transforming structured data into unstructured data (or vice versa), identifying timestamps associated with the data, removing extraneous data, parsing data, indexing data, separating data, categorizing data, routing data based on criteria relating to the data being routed, and/or performing other data transformations, etc.

In some cases, the data processed by the intake system 110 can be communicated or made available to the indexing system 112, the query system 114, and/or to other systems. In some embodiments, the intake system 110 communicates or makes available streams of data using one or more shards. For example, the indexing system 112 may read or receive data from one shard and another system may receive data from another shard. As another example, multiple systems may receive data from the same shard.

As used herein, a partition can refer to a logical division of data. In some cases, the logical division of data may refer to a portion of a data stream, such as a shard from the intake system 110. In certain cases, the logical division of data can refer to an index or other portion of data stored in the storage system 116, such as different directories or file structures used to store data or buckets. Accordingly, it will be understood that the logical division of data referenced by the term partition will be understood based on the context of its use.

FIGS. 3B and 3C are block diagrams illustrating embodiments of various data structures for storing data processed by the system 102. FIG. 3B includes an expanded view illustrating an example of machine data stored in a data store 310 of the data storage system 116. It will be understood that the depiction of machine data and associated metadata as rows and columns in the table 319 of FIG. 3B is merely illustrative and is not intended to limit the data format in which the machine data and metadata is stored in various embodiments described herein. In one particular embodiment, machine data can be stored in a compressed or encrypted format. In such embodiments, the machine data can be stored with or be associated with data that describes the compression or encryption scheme with which the machine data is stored. The information about the compression or encryption scheme can be used to decompress or decrypt the machine data, and any metadata with which it is stored, at search time.

In the illustrated embodiment of FIG. 3B the data store 310 includes a directory 312 (individually referred to as 312A, 312B) for each index (or partition) that contains a portion of data stored in the data store 310 and a sub-directory 314 (individually referred to as 314A, 314B, 314C) for one or more buckets of the index. In the illustrated embodiment of FIG. 3B, each sub-directory 314 corresponds to a bucket and includes an event data file 316 (individually referred to as 316A, 316B, 316C) and an inverted index 318 (individually referred to as 318A, 318B, 318C). However, it will be understood that each bucket can be associated with fewer or more files and each sub-directory 314 can store fewer or more files.

In the illustrated embodiment, the data store 310 includes a _main directory 312A associated with an index "_main" and a _test directory 312B associated with an index "_test." However, the data store 310 can include fewer or more directories. In some embodiments, multiple indexes can share a single directory or all indexes can share a common directory. Additionally, although illustrated as a single data store 310, it will be understood that the data store 310 can be implemented as multiple data stores storing different portions of the information shown in FIG. 3C. For example, a single index can span multiple directories or multiple data stores.

Furthermore, although not illustrated in FIG. 3B, it will be understood that, in some embodiments, the data store 310 can include directories for each tenant and sub-directories for each index of each tenant, or vice versa. Accordingly, the directories 312A and 312B can, in certain embodiments, correspond to sub-directories of a tenant or include sub-directories for different tenants.

In the illustrated embodiment of FIG. 3B, two sub-directories 314A, 314B of the _main directory 312A and one sub-directory 312C of the _test directory 312B are shown. The sub-directories 314A, 314B, 314C can correspond to buckets of the indexes associated with the directories 312A, 312B. For example, the sub-directories 314A and 314B can correspond to buckets "B1" and "B2," respectively, of the index "_main" and the sub-directory 314C can correspond to bucket "B1" of the index "_test." Accordingly, even though there are two "B1" buckets shown, as each "B1" bucket is associated with a different index (and corresponding directory 312), the system 102 can uniquely identify them.

Although illustrated as buckets "B1" and "B2," it will be understood that the buckets (and/or corresponding sub-directories 314) can be named in a variety of ways. In certain embodiments, the bucket (or sub-directory) names can include information about the bucket. For example, the bucket name can include the name of the index with which the bucket is associated, a time range of the bucket, etc.

As described herein, each bucket can have one or more files associated with it, including, but not limited to one or more raw machine data files, bucket summary files, filter files, inverted indexes (also referred to herein as high performance indexes or keyword indexes), permissions files, configuration files, etc. In the illustrated embodiment of FIG. 3B, the files associated with a particular bucket can be stored in the sub-directory corresponding to the particular bucket. Accordingly, the files stored in the sub-directory 314A can correspond to or be associated with bucket "B1," of index "_main," the files stored in the sub-directory 314B can correspond to or be associated with bucket "B2" of index "_main," and the files stored in the sub-directory 314C can correspond to or be associated with bucket "B1" of index "_test."

FIG. 3B further illustrates an expanded event data file 316C showing an example of data that can be stored therein. In the illustrated embodiment, four events 320, 322, 324, 326 of the machine data file 316C are shown in four rows. Each event 320-326 includes machine data 330 and a timestamp 332. The machine data 330 can correspond to the machine data received by the system 102. For example, in the illustrated embodiment, the machine data 330 of events 320, 322, 324, 326 corresponds to portions 302A, 302B, 302C, 302D, respectively, of the machine data 302 after it was processed by the indexing system 112.

Metadata 334-338 associated with the events 320-326 is also shown in the table 319. In the illustrated embodiment, the metadata 334-338 includes information about a host 334, source 336, and sourcetype 338 associated with the events 320-326. Any of the metadata can be extracted from the corresponding machine data, or supplied or defined by an entity, such as a user or computer system. The metadata fields 334-338 can become part of, stored with, or otherwise associated with the events 320-326. In certain embodiments, the metadata 334-338 can be stored in a separate file of the sub-directory 314C and associated with the machine data file 316C. In some cases, while the timestamp 332 can be extracted from the raw data of each event, the values for the other metadata fields may be determined by the indexing system 112 based on information it receives pertaining to the host device 104 or data source of the data separate from the machine data.

While certain default or user-defined metadata fields can be extracted from the machine data for indexing purposes, the machine data within an event can be maintained in its original condition. As such, in embodiments in which the portion of machine data included in an event is unprocessed or otherwise unaltered, it is referred to herein as a portion of raw machine data. For example, in the illustrated embodiment, the machine data of events 320-326 is identical to the portions of the machine data 302A-302D, respectively, used to generate a particular event. Similarly, the entirety of the machine data 302 may be found across multiple events. As such, unless certain information needs to be removed for some reasons (e.g. extraneous information, confidential information), all the raw machine data contained in an event can be preserved and saved in its original form. Accordingly, the data store in which the event records are stored is sometimes referred to as a "raw record data store." The raw record data store contains a record of the raw event data tagged with the various fields.

In other embodiments, the portion of machine data in an event can be processed or otherwise altered relative to the machine data used to create the event. With reference to the machine data 304, the machine data of a corresponding event (or events) may be modified such that only a portion of the machine data 304 is stored as one or more events. For example, in some cases, only machine data 304B of the machine data 304 may be retained as one or more events or the machine data 304 may be altered to remove duplicate data, confidential information, etc.

In FIG. 3B, the first three rows of the table 319 present events 320, 322, and 324 and are related to a server access log that records requests from multiple clients processed by a server, as indicated by entry of "access.log" in the source column 336. In the example shown in FIG. 3B, each of the events 320-324 is associated with a discrete request made to the server by a client. The raw machine data generated by the server and extracted from a server access log can include the IP address 1140 of the client, the user id 1141 of the person requesting the document, the time 1142 the server finished processing the request, the request line 1143 from the client, the status code 1144 returned by the server to the client, the size of the object 1145 returned to the client (in this case, the gif file requested by the client) and the time spent 1146 to serve the request in microseconds. In the illustrated embodiments of FIGS. 3A, 3B, all the raw machine data retrieved from the server access log is retained and stored as part of the corresponding events 320-324 in the file 316C.

Event 326 is associated with an entry in a server error log, as indicated by "error.log" in the source column 336 that records errors that the server encountered when processing a client request. Similar to the events related to the server access log, all the raw machine data in the error log file pertaining to event 326 can be preserved and stored as part of the event 326.

Saving minimally processed or unprocessed machine data in a data store associated with metadata fields in the manner similar to that shown in FIG. 3B is advantageous because it allows search of all the machine data at search time instead of searching only previously specified and identified fields or field-value pairs. As mentioned above, because data structures used by various embodiments of the present disclosure maintain the underlying raw machine data and use a late-binding schema for searching the raw machines data, it enables a user to continue investigating and learn valuable insights about the raw data. In other words, the user is not compelled to know about all the fields of information that will be needed at data ingestion time. As a user learns more about the data in the events, the user can continue to refine the late-binding schema by defining new extraction rules, or modifying or deleting existing extraction rules used by the system.

FIG. 3C illustrates an embodiment of another file that can be included in one or more subdirectories 314 or buckets. Specifically, FIG. 3C illustrates an exploded view of an embodiments of an inverted index 318B in the sub-directory 314B, associated with bucket "B2" of the index "_main," as well as an event reference array 340 associated with the inverted index 318B.

In some embodiments, the inverted indexes 318 can correspond to distinct time-series buckets. As such, each inverted index 318 can correspond to a particular range of time for an index. In the illustrated embodiment of FIG. 3C, the inverted indexes 318A, 318B correspond to the buckets "B1" and "B2," respectively, of the index "_main," and the inverted index 318C corresponds to the bucket "B1" of the index "_test." In some embodiments, an inverted index 318 can correspond to multiple time-series buckets (e.g., include information related to multiple buckets) or inverted indexes 318 can correspond to a single time-series bucket.

Each inverted index 318 can include one or more entries, such as keyword (or token) entries 342 or field-value pair entries 344. Furthermore, in certain embodiments, the inverted indexes 318 can include additional information, such as a time range 346 associated with the inverted index or an index identifier 348 identifying the index associated with the inverted index 318. It will be understood that each inverted index 318 can include less or more information than depicted. For example, in some cases, the inverted indexes 318 may omit a time range 346 and/or index identifier 348. In some such embodiments, the index associated with the inverted index 318 can be determined based on the location (e.g., directory 312) of the inverted index 318 and/or the time range of the inverted index 318 can be determined based on the name of the sub-directory 314.

Token entries, such as token entries 342 illustrated in inverted index 318B, can include a token 342A (e.g., "error,". "itemID," etc.) and event references 342B indicative of events that include the token. For example, for the token "error," the corresponding token entry includes the token "error" and an event reference, or unique identifier, for each event stored in the corresponding time-series bucket that includes the token "error." In the illustrated embodiment of FIG. 3C, the error token entry includes the identifiers 3, 5, 6, 8, 11, and 12 corresponding to events located in the bucket "B2" of the index "_main."

In some cases, some token entries can be default entries, automatically determined entries, or user specified entries. In some embodiments, the indexing system 112 can identify each word or string in an event as a distinct token and generate a token entry for the identified word or string. In some cases, the indexing system 112 can identify the beginning and ending of tokens based on punctuation, spaces, etc. In certain cases, the indexing system 112 can rely on user input or a configuration file to identify tokens for token entries 342, etc. It will be understood that any combination of token entries can be included as a default, automatically determined, or included based on user-specified criteria.

Similarly, field-value pair entries, such as field-value pair entries 344 shown in inverted index 318B, can include a field-value pair 344A and event references 344B indicative of events that include a field value that corresponds to the field-value pair (or the field-value pair). For example, for a field-value pair sourcetype::sendmail, a field-value pair entry 344 can include the field-value pair "sourcetype::sendmail" and a unique identifier, or event reference, for each event stored in the corresponding time-series bucket that includes a sourcetype "sendmail."

In some cases, the field-value pair entries 344 can be default entries, automatically determined entries, or user specified entries. As a non-limiting example, the field-value pair entries for the fields "host," "source," and "sourcetype" can be included in the inverted indexes 318 as a default. As such, all of the inverted indexes 318 can include field-value pair entries for the fields "host," "source," and "sourcetype." As yet another non-limiting example, the field-value pair entries for the field "IP_address" can be user specified and may only appear in the inverted index 318B or the inverted indexes 318A, 318B of the index "_main" based on user-specified criteria. As another non-limiting example, as the indexing system 112 indexes the events, it can automatically identify field-value pairs and create field-value pair entries 344. For example, based on the indexing system's 212 review of events, it can identify IP_address as a field in each event and add the IP_address field-value pair entries to the inverted index 318B (e.g., based on punctuation, like two keywords separated by an '=' or ':' etc.). It will be understood that any combination of field-value pair entries can be included as a default, automatically determined, or included based on user-specified criteria.

With reference to the event reference array 340, each unique identifier 350, or event reference, can correspond to a unique event located in the time series bucket or machine data file 316B. The same event reference can be located in multiple entries of an inverted index 318. For example if an event has a sourcetype "splunkd," host "www1" and token "warning," then the unique identifier for the event can appear in the field-value pair entries 344 "sourcetype:: splunkd" and "host::www1," as well as the token entry "warning." With reference to the illustrated embodiment of FIG. 3C and the event that corresponds to the event reference 3, the event reference 3 is found in the field-value pair entries 344 "host::hostA," "source::sourceB," "sourcetype:: sourcetypeA," and "IP_address::91.205.189.15" indicating that the event corresponding to the event references is from hostA, sourceB, of sourcetypeA, and includes "91.205.189.15" in the event data.

For some fields, the unique identifier is located in only one field-value pair entry for a particular field. For example, the inverted index 318 may include four sourcetype field-value pair entries 344 corresponding to four different sourcetypes of the events stored in a bucket (e.g., sourcetypes: sendmail, splunkd, web_access, and web_service). Within those four sourcetype field-value pair entries, an identifier for a particular event may appear in only one of the field-value pair entries. With continued reference to the example illustrated embodiment of FIG. 3C, since the event reference 7 appears in the field-value pair entry "sourcetype::sourcetypeA," then it does not appear in the other field-value pair entries for the sourcetype field, including "sourcetype::sourcetypeB," "sourcetype::sourcetypeC," and "sourcetype::sourcetypeD."

The event references 350 can be used to locate the events in the corresponding bucket or machine data file 316. For example, the inverted index 318B can include, or be associated with, an event reference array 340. The event reference array 340 can include an array entry 350 for each event reference in the inverted index 318B. Each array entry 350 can include location information 352 of the event corresponding to the unique identifier (non-limiting example: seek address of the event, physical address, slice ID, etc.), a timestamp 354 associated with the event, or additional information regarding the event associated with the event reference, etc.

For each token entry 342 or field-value pair entry 344, the event reference 342B, 344B, respectively, or unique identifiers can be listed in chronological order or the value of the event reference can be assigned based on chronological data, such as a timestamp associated with the event referenced by the event reference. For example, the event reference 1 in the illustrated embodiment of FIG. 3C can correspond to the first-in-time event for the bucket, and the event reference 12 can correspond to the last-in-time event for the bucket. However, the event references can be listed in any order, such as reverse chronological order, ascending order, descending order, or some other order (e.g., based on time received or added to the machine data file), etc. Further, the entries can be sorted. For example, the entries can be sorted alphabetically (collectively or within a particular group), by entry origin (e.g., default, automatically generated, user-specified, etc.), by entry type (e.g., field-value pair entry, token entry, etc.), or chronologically by when added to the inverted index, etc. In the illustrated embodiment of FIG. 3C, the entries are sorted first by entry type and then alphabetically.

In some cases, inverted indexes 318 can decrease the search time of a query. For example, for a statistical query, by using the inverted index, the system 102 can avoid the computational overhead of parsing individual events in a machine data file 316. Instead, the system 102 can use the inverted index 318 separate from the raw record data store to generate responses to the received queries.

3.0. Query Processing and Execution

FIG. 4A is a flow diagram illustrating an embodiment of a routine implemented by the query system 114 for executing a query. At block 402, the query system 114 receives a search query. As described herein, the query can be in the form of a pipelined command language or other query language and include filter criteria used to identify a set of data and processing criteria used to process the set of data.

At block 404, the query system 114 processes the query. As part of processing the query, the query system 114 can determine whether the query was submitted by an authenticated user and/or review the query to determine that it is in a proper format for the data intake and query system 102, has correct semantics and syntax, etc. In addition, the query system 114 can determine what, if any, configuration files or other configurations to use as part of the query.

In addition as part of processing the query, the query system 114 can determine what portion(s) of the query to execute in a distributed manner (e.g., what to delegate to search nodes) and what portions of the query to execute in a non-distributed manner (e.g., what to execute on the search head). For the parts of the query that are to be executed in a distributed manner, the query system 114 can generate specific commands, for the components that are to execute the query. This may include generating subqueries, partial queries or different phases of the query for execution by different components of the query system 114. In some cases, the query system 114 can use map-reduce techniques to determine how to map the data for the search and then reduce the data. Based on the map-reduce phases, the query system 114 can generate query commands for different components of the query system 114.

As part of processing the query, the query system 114 can determine where to obtain the data. For example, in some cases, the data may reside on one or more indexing nodes or search nodes, as part of the storage system 116 or may reside in a shared storage system or a system external to the system 102. In some cases, the query system 114 can determine what components to use to obtain and process the data. For example, the query system 114 can identify search nodes that are available for the query, etc.

At block 406, the query system 1206 distributes the determined portions or phases of the query to the appropriate components (e.g., search nodes). In some cases, the query system 1206 can use a catalog to determine which components to use to execute the query (e.g., which components include relevant data and/or are available, etc.).

At block 408, the components assigned to execute the query, execute the query. As mentioned, different components may execute different portions of the query. In some cases, multiple components (e.g., multiple search nodes) may execute respective portions of the query concurrently and communicate results of their portion of the query to another component (e.g., search head). As part of the identifying the set of data or applying the filter criteria, the components of the query system 114 can search for events that match the criteria specified in the query. These criteria can include matching keywords or specific values for certain fields. The searching operations at block 408 may use the late-binding schema to extract values for specified fields from events at the time the query is processed. In some embodiments, one or more rules for extracting field values may be specified as part of a sourcetype definition in a configuration file or in the query itself. In certain embodiments where search nodes are used to obtain the set of data, the search nodes can send the relevant events back to the search head, or use the events to determine a partial result, and send the partial result back to the search head.

At block 410, the query system 114 combines the partial results and/or events to produce a final result for the query.

As mentioned, in some cases, combining the partial results and/or finalizing the results can include further processing the data according to the query. Such processing may entail joining different set of data, transforming the data, and/or performing one or more mathematical operations on the data, preparing the results for display, etc.

In some examples, the results of the query are indicative of performance or security of the IT environment and may help improve the performance of components in the IT environment. This final result may comprise different types of data depending on what the query requested. For example, the results can include a listing of matching events returned by the query, or some type of visualization of the data from the returned events. In another example, the final result can include one or more calculated values derived from the matching events.

The results generated by the query system 114 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring to the search jobs.

The query system 114 can also perform various operations to make the search more efficient. For example, before the query system 114 begins execution of a query, it can determine a time range for the query and a set of common keywords that all matching events include. The query system 114 may then use these parameters to obtain a superset of the eventual results. Then, during a filtering stage, the query system 114 can perform field-extraction operations on the superset to produce a reduced set of search results. This speeds up queries, which may be particularly helpful for queries that are performed on a periodic basis. In some cases, to make the search more efficient, the query system 114 can use information known about certain data sets that are part of the query to filter other data sets. For example, if an early part of the query includes instructions to obtain data with a particular field, but later commands of the query do not rely on the data with that particular field, the query system 114 can omit the superfluous part of the query from execution.

Various embodiments of the present disclosure can be implemented using, or in conjunction with, a pipelined command language. A pipelined command language is a language in which a set of inputs or data is operated on by a first command in a sequence of commands, and then subsequent commands in the order they are arranged in the sequence. Such commands can include any type of functionality for operating on data, such as retrieving, searching, filtering, aggregating, processing, transmitting, and the like. As described herein, a query can thus be formulated in a pipelined command language and include any number of ordered or unordered commands for operating on data.

Splunk Processing Language (SPL) is an example of a pipelined command language in which a set of inputs or data is operated on by any number of commands in a particular sequence. A sequence of commands, or command sequence, can be formulated such that the order in which the commands are arranged defines the order in which the commands are applied to a set of data or the results of an earlier executed command. For example, a first command in a command sequence can include filter criteria used to search or filter for specific data. The results of the first command can then be passed to another command listed later in the command sequence for further processing.

In various embodiments, a query can be formulated as a command sequence defined in a command line of a search UI. In some embodiments, a query can be formulated as a sequence of SPL commands. Some or all of the SPL commands in the sequence of SPL commands can be separated from one another by a pipe symbol "|." In such embodiments, a set of data, such as a set of events, can be operated on by a first SPL command in the sequence, and then a subsequent SPL command following a pipe symbol "|" after the first SPL command operates on the results produced by the first SPL command or other set of data, and so on for any additional SPL commands in the sequence. As such, a query formulated using SPL comprises a series of consecutive commands that are delimited by pipe "|" characters. The pipe character indicates to the system that the output or result of one command (to the left of the pipe) should be used as the input for one of the subsequent commands (to the right of the pipe). This enables formulation of queries defined by a pipeline of sequenced commands that refines or enhances the data at each step along the pipeline until the desired results are attained. Accordingly, various embodiments described herein can be implemented with Splunk Processing Language (SPL) used in conjunction with the SPLUNK® ENTERPRISE system.

While a query can be formulated in many ways, a query can start with a search command and one or more corresponding search terms or filter criteria at the beginning of the pipeline. Such search terms or filter criteria can include any combination of keywords, phrases, times, dates, Boolean expressions, fieldname-field value pairs, etc. that specify which results should be obtained from different locations. The results can then be passed as inputs into subsequent commands in a sequence of commands by using, for example, a pipe character. The subsequent commands in a sequence can include directives for additional processing of the results once it has been obtained from one or more indexes. For example, commands may be used to filter unwanted information out of the results, extract more information, evaluate field values, calculate statistics, reorder the results, create an alert, create summary of the results, or perform some type of aggregation function. In some embodiments, the summary can include a graph, chart, metric, or other visualization of the data. An aggregation function can include analysis or calculations to return an aggregate value, such as an average value, a sum, a maximum value, a root mean square, statistical values, and the like.

Due to its flexible nature, use of a pipelined command language in various embodiments is advantageous because it can perform "filtering" as well as "processing" functions. In other words, a single query can include a search command and search term expressions, as well as data-analysis expressions. For example, a command at the beginning of a query can perform a "filtering" step by retrieving a set of data based on a condition (e.g., records associated with server response times of less than 1 microsecond). The results of the filtering step can then be passed to a subsequent command in the pipeline that performs a "processing" step (e.g. calculation of an aggregate value related to the filtered events such as the average response time of servers with response times of less than 1 microsecond). Furthermore, the search command can allow events to be filtered by keyword as well as field criteria. For example, a search command can filter events based on the word "warning" or filter events based on a field value "10.0.1.2" associated with a field "clientip."

The results obtained or generated in response to a command in a query can be considered a set of results data. The set of results data can be passed from one command to another in any data format. In one embodiment, the set of result data can be in the form of a dynamically created table. Each command in a particular query can redefine the shape of the table. In some implementations, an event retrieved from an index in response to a query can be considered a row with a column for each field value. Columns can contain basic information about the data and/or data that has been dynamically extracted at search time.

Figure 4B:
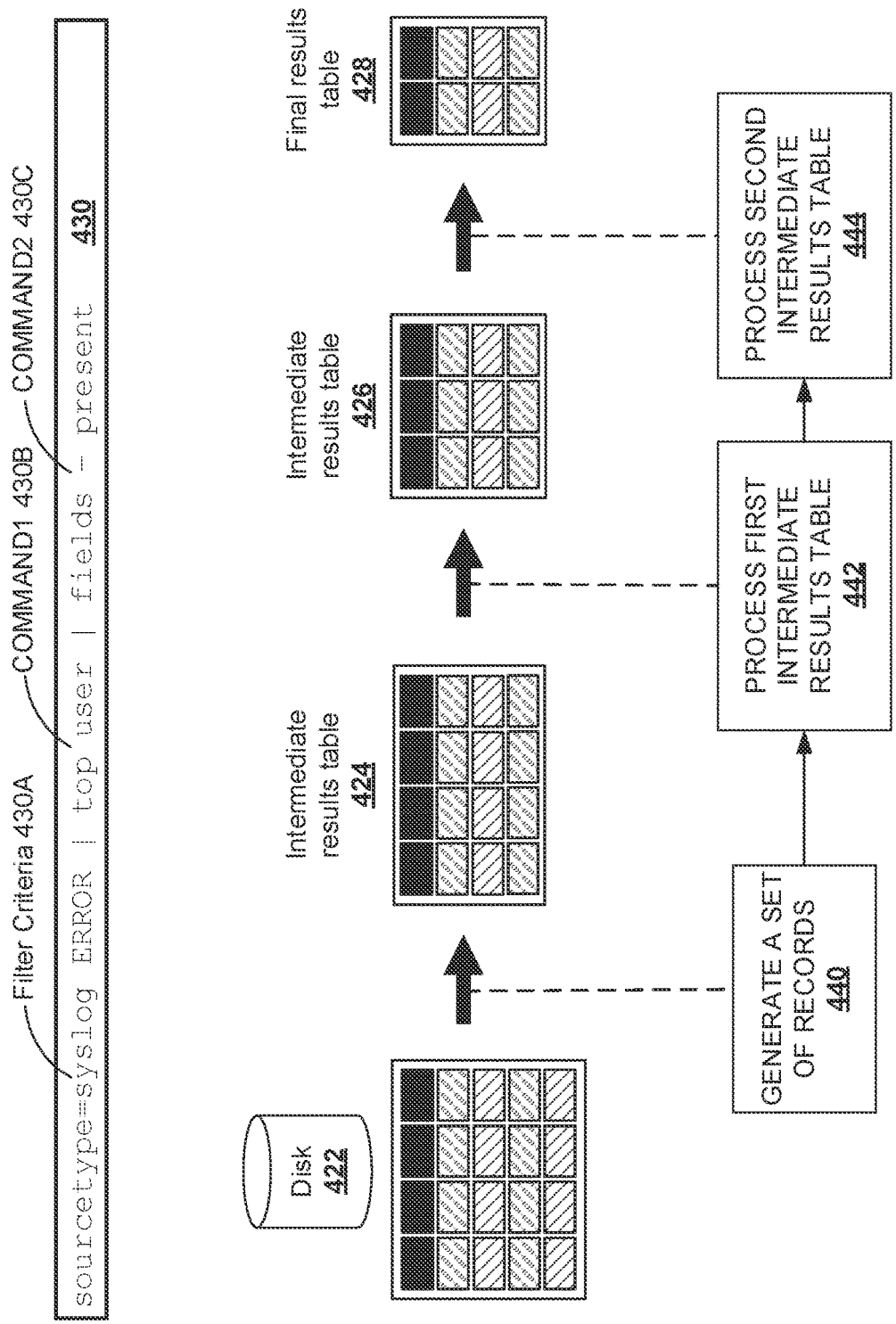
FIG. 4B provides a visual representation of the manner in which a pipelined command language or query can operate.

FIG. 4B provides a visual representation of the manner in which a pipelined command language or query can operate in accordance with the disclosed embodiments. The query 430 can be input by the user and submitted to the query system 114. In the illustrated embodiment, the query 430 comprises filter criteria 430A, followed by two commands 430B, 430C (namely, Command1 and Command2). Disk 422 represents data as it is stored in a data store to be searched. For example, disk 422 can represent a portion of the storage system 116 or some other data store that can be searched by the query system 114. Individual rows of can represent different events and columns can represent different fields for the different events. In some cases, these fields can include raw machine data, host, source, and sourcetype.

At block 440, the query system 114 uses the filter criteria 430A (e.g., "sourcetype=syslog ERROR") to filter events stored on the disk 422 to generate an intermediate results table 424. Given the semantics of the query 430 and order of the commands, the query system 114 can execute the filter criteria 430A portion of the query 430 before executing Command1 or Command2.

Rows in the table 424 may represent individual records, where each record corresponds to an event in the disk 422 that satisfied the filter criteria. Columns in the table 424 may correspond to different fields of an event or record, such as "user," "count," percentage," "timestamp," or the raw machine data of an event, etc. Notably, the fields in the intermediate results table 424 may differ from the fields of the events on the disk 422. In some cases, this may be due to the late binding schema described herein that can be used to extract field values at search time. Thus, some of the fields in table 424 may not have existed in the events on disk 422.

Illustratively, the intermediate results table 424 has fewer rows than what is shown in the disk 422 because only a subset of events retrieved from the disk 422 matched the filter criteria 430A "sourcetype=syslog ERROR" In some embodiments, instead of searching individual events or raw machine data, the set of events in the intermediate results table 424 may be generated by a call to a pre-existing inverted index.

At block 442, the query system 114 processes the events of the first intermediate results table 424 to generate the second intermediate results table 426. With reference to the query 430, the query system 114 processes the events of the first intermediate results table 424 to identify the top users according to Command1. This processing may include determining a field value for the field "user" for each record in the intermediate results table 424, counting the number of unique instances of each "user" field value (e.g., number of users with the name David, John, Julie, etc.) within the intermediate results table 424, ordering the results from largest to smallest based on the count, and then keeping only the top 10 results (e.g., keep an identification of the top 10 most common users). Accordingly, each row of table 426 can represent a record that includes a unique field value for the field "user," and each column can represent a field for that record, such as fields "user," "count," and "percentage."

At block 444, the query system 114 processes the second intermediate results table 426 to generate the final results table 428. With reference to query 430, the query system 114 applies the command "fields—present" to the second intermediate results table 426 to generate the final results table 428. As shown, the command "fields—present" of the query 430 results in one less column, which may represent that a field was removed during processing. For example, the query system 114 may have determined that the field "percentage" was unnecessary for displaying the results based on the Command2. In such a scenario, each record of the final results table 428 would include a field "user," and "count." Further, the records in the table 428 would be ordered from largest count to smallest count based on the query commands.

It will be understood that the final results table 428 can be a third intermediate results table, which can be pipelined to another stage where further filtering or processing of the data can be performed, e.g., preparing the data for display purposes, filtering the data based on a condition, performing a mathematical calculation with the data, etc. In different embodiments, other query languages, such as the Structured Query Language ("SQL"), can be used to create a query.

As described herein, extraction rules can be used to extract field-value pairs or field values from data. An extraction rule can comprise one or more regex rules that specify how to extract values for the field corresponding to the extraction rule. In addition to specifying how to extract field values, the extraction rules may also include instructions for deriving a field value by performing a function on a character string or value retrieved by the extraction rule. For example, an extraction rule may truncate a character string or convert the character string into a different data format. Extraction rules can be used to extract one or more values for a field from events by parsing the portions of machine data in the events and examining the data for one or more patterns of characters, numbers, delimiters, etc., that indicate where the field begins and, optionally, ends. In certain embodiments, extraction rules can be stored in one or more configuration files. In some cases, a query itself can specify one or more extraction rules.

In some cases, extraction rules can be applied at data ingest by the intake system 110 and/or indexing system 112. For example, the intake system 110 and indexing system 112 can apply extraction rules to ingested data and/or events generated from the ingested data and store results in an inverted index.

The system 102 advantageously allows for search time field extraction. In other words, fields can be extracted from the event data at search time using late-binding schema as opposed to at data ingestion time, which was a major limitation of the prior art systems. Accordingly, extraction rules can be applied at search time by the query system 114. The query system can apply extraction rules to events retrieved from the storage system 116 or data received from sources external to the system 102. Extraction rules can be applied to all the events in the storage system 116 or to a subset of the events that have been filtered based on some filter criteria (e.g., event timestamp values, etc.).

Figure 4C:
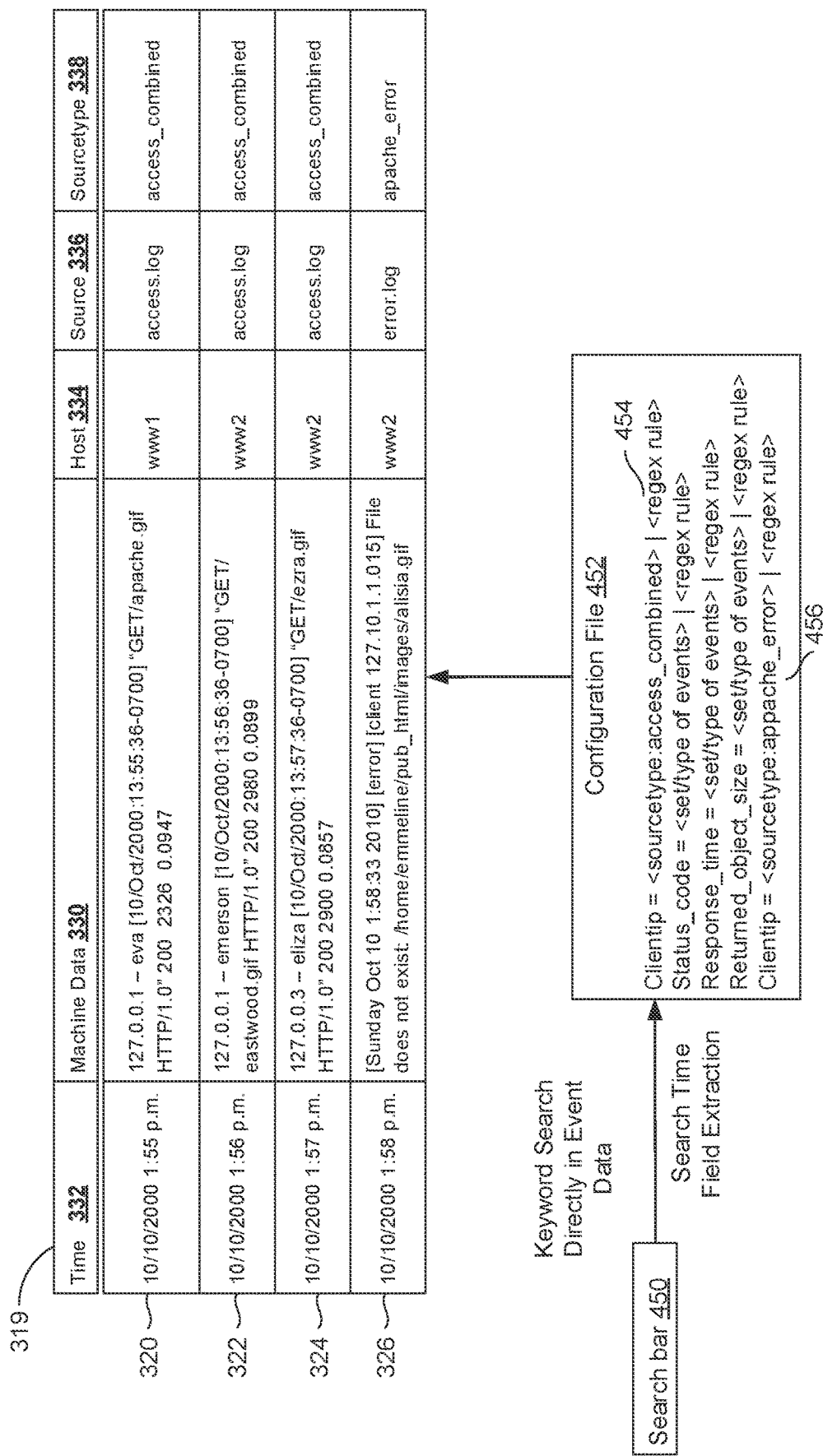
FIG. 4C is a block diagram illustrating an embodiment of a configuration file that includes various extraction rules that can be applied to events.

FIG. 4C is a block diagram illustrating an embodiment of the table 319 showing events 320-326, described previously with reference to FIG. 3B. As described herein, the table 319 is for illustrative purposes, and the events 320-326 may be stored in a variety of formats in an event data file 316 or raw record data store. Further, it will be understood that the event data file 316 or raw record data store can store millions of events. FIG. 4C also illustrates an embodiment of a search bar 450 for entering a query and a configuration file 452 that includes various extraction rules that can be applied to the events 320-326.

As a non-limiting example, if a user inputs a query into search bar 450 that includes only keywords (also known as "tokens"), e.g., the keyword "error" or "warning," the query system 114 can search for those keywords directly in the events 320-326 stored in the raw record data store.

As described herein, the indexing system 112 can optionally generate and use an inverted index with keyword entries to facilitate fast keyword searching for event data. If a user searches for a keyword that is not included in the inverted index, the query system 114 may nevertheless be able to retrieve the events by searching the event data for the keyword in the event data file 316 or raw record data store directly. For example, if a user searches for the keyword "eva," and the name "eva" has not been indexed at search time, the query system 114 can search the events 320-326 directly and return the first event 320. In the case where the keyword has been indexed, the inverted index can include a reference pointer that will allow for a more efficient retrieval of the event data from the data store. If the keyword has not been indexed, the query system 114 can search through the events in the event data file to service the search.

[In many cases, a query include fields. The term "field" refers to a location in the event data containing one or more values for a specific data item. Often, a field is a value with a fixed, delimited position on a line, or a name and value pair, where there is a single value to each field name. A field can also be multivalued, that is, it can appear more than once in an event and have a different value for each appearance, e.g., email address fields. Fields are searchable by the field name or field name-value pairs. Some examples of fields are "clientip" for IP addresses accessing a web server, or the "From" and "To" fields in email addresses.

[By way of further example, consider the query, "status=404." This search query finds events with "status" fields that have a value of "404." When the search is run, the query system 114 does not look for events with any other "status" value. It also does not look for events containing other fields that share "404" as a value. As a result, the search returns a set of results that are more focused than if "404" had been used in the search string as part of a keyword search. Note also that fields can appear in events as "key=value" pairs such as "user_name=Bob." But in most cases, field values appear in fixed, delimited positions without identifying keys. For example, the data store may contain events where the "user_name" value always appears by itself after the timestamp as illustrated by the following string: "Nov 15 09:33:22 evaemerson."

FIG. 4C illustrates the manner in which configuration files may be used to configure custom fields at search time in accordance with the disclosed embodiments. In response to receiving a query, the query system 114 determines if the query references a "field." For example, a query may request a list of events where the "clientip" field equals "127.0.0.1." If the query itself does not specify an extraction rule and if the field is not an indexed metadata field, e.g., time, host, source, sourcetype, etc., then in order to determine an extraction rule, the query system 114 may, in one or more embodiments, locate configuration file 452 during the execution of the query.

Configuration file 452 may contain extraction rules for various fields, e.g., the "clientip" field. The extraction rules may be inserted into the configuration file 452 in a variety of ways. In some embodiments, the extraction rules can comprise regular expression rules that are manually entered in by the user.

In one or more embodiments, as noted above, a field extractor may be configured to automatically generate extraction rules for certain field values in the events when the events are being created, indexed, or stored, or possibly at a later time. In one embodiment, a user may be able to dynamically create custom fields by highlighting portions of a sample event that should be extracted as fields using a graphical user interface. The system can then generate a regular expression that extracts those fields from similar events and store the regular expression as an extraction rule for the associated field in the configuration file 452.

In some embodiments, the indexing system 112 can automatically discover certain custom fields at index time and the regular expressions for those fields will be automatically generated at index time and stored as part of extraction rules in configuration file 452. For example, fields that appear in the event data as "key=value" pairs may be automatically extracted as part of an automatic field discovery process. Note that there may be several other ways of adding field definitions to configuration files in addition to the methods discussed herein.

Events from heterogeneous sources that are stored in the storage system 116 may contain the same fields in different locations due to discrepancies in the format of the data generated by the various sources. For example, event 326 also contains a "clientip" field, however, the "clientip" field is in a different format from events 320, 322, and 324. Furthermore, certain events may not contain a particular field at all. To address the discrepancies in the format and content of the different types of events, the configuration file 452 can specify the set of events to which an extraction rule applies. For example, extraction rule 454 specifies that it is to be used with events having a sourcetype "access_combined," and extraction rule 456 specifies that it is to be used with events having a sourcetype "apache_error." Other extraction rules shown in configuration file 452 specify a set or type of events to which they apply. In addition, the extraction rules shown in configuration file 452 include a regular expression for parsing the identified set of events to determine the corresponding field value. Accordingly, each extraction rule may pertain to only a particular type of event. Accordingly, if a particular field, e.g., "clientip" occurs in multiple types of events, each of those types of events can have its own corresponding extraction rule in the configuration file 452 and each of the extraction rules would comprise a different regular expression to parse out the associated field value. In some cases, the sets of events are grouped by sourcetype because events generated by a particular source can have the same format.

The field extraction rules stored in configuration file 452 can be used to perform search-time field extractions. For example, for a query that requests a list of events with sourcetype "access_combined" where the "clientip" field equals "127.0.0.1," the query system 114 can locate the configuration file 452 to retrieve extraction rule 454 that allows it to extract values associated with the "clientip" field from the events where the sourcetype is "access_combined" (e.g., events 320-324). After the "clientip" field has been extracted from the events 320, 322, 324, the query system 114 can then apply the field criteria by performing a compare operation to filter out events where the "clientip" field does not equal "127.0.0.1." In the example shown in FIG. 4C, the events 320 and 322 would be returned in response to the user query. In this manner, the query system 114 can service queries with filter criteria containing field criteria and/or keyword criteria.

It should also be noted that any events filtered by performing a search-time field extraction using a configuration file 452 can be further processed by directing the results of the filtering step to a processing step using a pipelined search language. Using the prior example, a user can pipeline the results of the compare step to an aggregate function by asking the query system 114 to count the number of events where the "clientip" field equals "127.0.0.1."

By providing the field definitions for the queried fields at search time, the configuration file 452 allows the event data file or raw record data store to be field searchable. In other words, the raw record data store can be searched using keywords as well as fields, wherein the fields are searchable name/value pairings that can distinguish one event from another event and can be defined in configuration file 452 using extraction rules. In comparison to a search containing field names, a keyword search may result in a search of the event data directly without the use of a configuration file.

Further, the ability to add schema to the configuration file 452 at search time results in increased efficiency and flexibility. A user can create new fields at search time and simply add field definitions to the configuration file 452. As a user learns more about the data in the events, the user can continue to refine the late-binding schema by adding new fields, deleting fields, or modifying the field extraction rules in the configuration file for use the next time the schema is used by the system 102. Because the system 102 maintains the underlying raw data and uses late-binding schema for searching the raw data, it enables a user to continue investigating and learn valuable insights about the raw data long after data ingestion time. Similarly, multiple field definitions can be added to the configuration file to capture the same field across events generated by different sources or sourcetypes. This allows the system 102 to search and correlate data across heterogeneous sources flexibly and efficiently.

The system 102 can use one or more data models to search and/or better understand data. A data model is a hierarchically structured search-time mapping of semantic knowledge about one or more datasets. It encodes the domain knowledge used to build a variety of specialized searches of those datasets. Those searches, in turn, can be used to generate reports.

The above-described system provides significant flexibility by enabling a user to analyze massive quantities of minimally-processed data "on the fly" at search time using a late-binding schema, instead of storing pre-specified portions of the data in a database at ingestion time. This flexibility enables a user to see valuable insights, correlate data, and perform subsequent queries to examine interesting aspects of the data that may not have been apparent at ingestion time.

Performing extraction and analysis operations at search time can involve a large amount of data and require a large number of computational operations, which can cause delays in processing the queries. In some embodiments, the system 102 can employ a number of unique acceleration techniques to speed up analysis operations performed at search time. These techniques include: performing search operations in parallel using multiple components of the query system 114, using an inverted index 118, and accelerating the process of generating reports.

To facilitate faster query processing, a query can be structured such that multiple components of the query system 114 (e.g., search nodes) perform the query in parallel, while aggregation of search results from the multiple components is performed at a particular component (e.g., search head). For example, consider a scenario in which a user enters the query "Search "error"|stats count BY host." The query system 114 can identify two phases for the query, including: (1) subtasks (e.g., data retrieval or simple filtering) that may be performed in parallel by multiple components, such as search nodes, and (2) a search results aggregation operation to be executed by one component, such as the search head, when the results are ultimately collected from the search nodes.

Based on this determination, the query system 114 can generate commands to be executed in parallel by the search nodes, with each search node applying the generated commands to a subset of the data to be searched. In this example, the query system 114 generates and then distributes the following commands to the individual search nodes: "Search "error" prestats count BY host." In this example, the "prestats" command can indicate that individual search nodes are processing a subset of the data and are responsible for producing partial results and sending them to the search head. After the search nodes return the results to the search head, the search head aggregates the received results to form a single search result set. By executing the query in this manner, the system effectively distributes the computational operations across the search nodes while reducing data transfers. It will be understood that the query system 114 can employ a variety of techniques to use distributed components to execute a query. In some embodiments, the query system 114 can use distributed components for only mapping functions of a query (e.g., gather data, applying filter criteria, etc.). In certain embodiments, the query system 114 can use distributed components for mapping and reducing functions (e.g., joining data, combining data, reducing data, etc.) of a query.

4.0. Example Use Cases

The system 102 provides various schemas, dashboards, and visualizations that simplify developers' tasks to create applications with additional capabilities, including but not limited to security, data center monitoring, IT service monitoring, and client/customer insights.

An embodiment of an enterprise security application is as SPLUNK® ENTERPRISE SECURITY, which performs monitoring and alerting operations and includes analytics to facilitate identifying both known and unknown security threats based on large volumes of data stored by the system 102. The enterprise security application provides the security practitioner with visibility into security-relevant threats found in the enterprise infrastructure by capturing, monitoring, and reporting on data from enterprise security devices, systems, and applications. Through the use of the system 102 searching and reporting capabilities, the enterprise security application provides a top-down and bottom-up view of an organization's security posture.

An embodiment of an IT monitoring application is SPLUNK® IT SERVICE INTELLIGENCE™, which performs monitoring and alerting operations. The IT monitoring application also includes analytics to help an analyst diagnose the root cause of performance problems based on large volumes of data stored by the system 102 as correlated to the various services an IT organization provides (a service-centric view). This differs significantly from conventional IT monitoring systems that lack the infrastructure to effectively store and analyze large volumes of service-related events. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, an IT monitoring application system stores large volumes of minimally-processed service-related data at ingestion time for later retrieval and analysis at search time, to perform regular monitoring, or to investigate a service issue. To facilitate this data retrieval process, the IT monitoring application enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the events that pertains to the entity, whether produced by the entity itself or by another machine, and considering the many various ways the entity may be identified in machine data (such as by a URL, an IP address, or machine name). The service and entity definitions can organize events around a service so that all of the events pertaining to that service can be easily identified. This capability provides a foundation for the implementation of Key Performance Indicators.

As described herein, the system 102 can receive heterogeneous data from disparate systems. In some cases, the data from the disparate systems may be related and correlating the data can result in insights into client or customer interactions with various systems of a vendor. To aid in the correlation of data across different systems, multiple field definitions can be added to one or more configuration files to capture the same field or data across events generated by different sources or sourcetypes. This can enable the system 102 to search and correlate data across heterogeneous sources flexibly and efficiently.

Figure 4D:
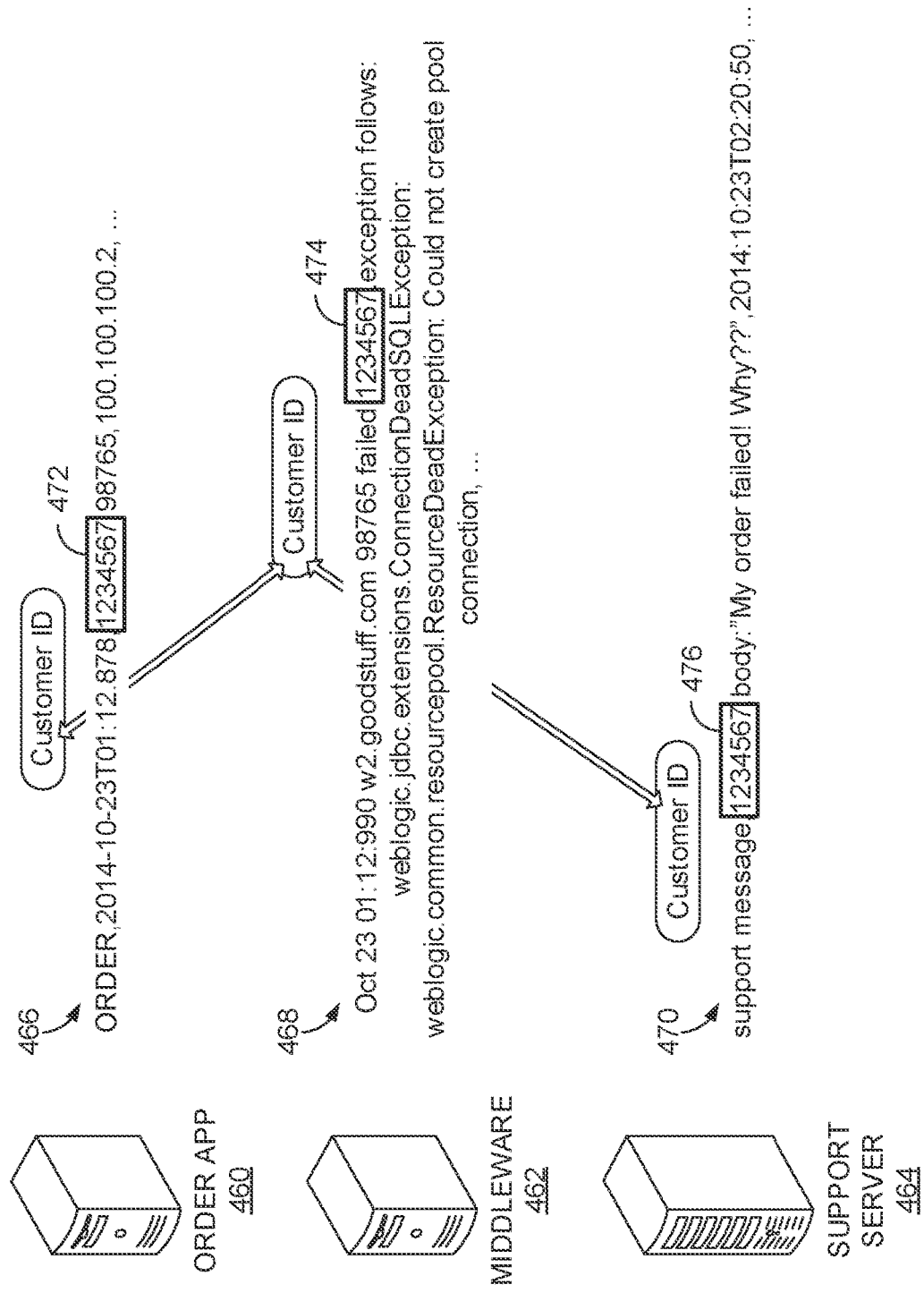
FIG. 4D is a block diagram illustrating an example scenario where a common customer identifier is found among log data received from disparate data sources.

As a non-limiting example and with reference to FIG. 4D, consider a scenario in which a common customer identifier is found among log data received from three disparate data sources. In this example, a user submits an order for merchandise using a vendor's shopping application program 460 running on the user's system. In this example, the order was not delivered to the vendor's server due to a resource exception at the destination server that is detected by the middleware code 462. The user then sends a message to the customer support server 464 to complain about the order failing to complete. The three systems 460, 462, 464 are disparate systems that do not have a common logging format. The shopping application program 460 sends log data 466 to the system 102 in one format, the middleware code 462 sends error log data 468 in a second format, and the support server 464 sends log data 470 in a third format.

Using the log data received at the system 102 from the three systems 460, 462, 464, the vendor can uniquely obtain an insight into user activity, user experience, and system behavior. The system 102 allows the vendor's administrator to search the log data from the three systems 460, 462, 464, thereby obtaining correlated information, such as the order number and corresponding customer ID number of the person placing the order. The system 102 also allows the administrator to see a visualization of related events via a user interface. The administrator can query the system 102 for customer ID field value matches across the log data from the three systems 460, 462, 464 that are stored in the storage system 116. While the customer ID field value exists in the data gathered from the three systems 460, 462, 464, it may be located in different areas of the data given differences in the architecture of the systems. The query system 114 obtains events from the storage system 116 related to the three systems 460, 462, 464. The query system 114 then applies extraction rules to the events in order to extract field values for the field "customer ID" that it can correlate. As described herein, the query system 114 may apply a different extraction rule to each set of events from each system when the event format differs among systems. In this example, a user interface can display to the administrator the events corresponding to the common customer ID field values 472, 474, and 476, thereby providing the administrator with insight into a customer's experience. The system 102 can provide additional user interfaces and reports to aid a user in analyzing the data associated with the customer.

5.0. Networked Data Processing System

Figure 5:
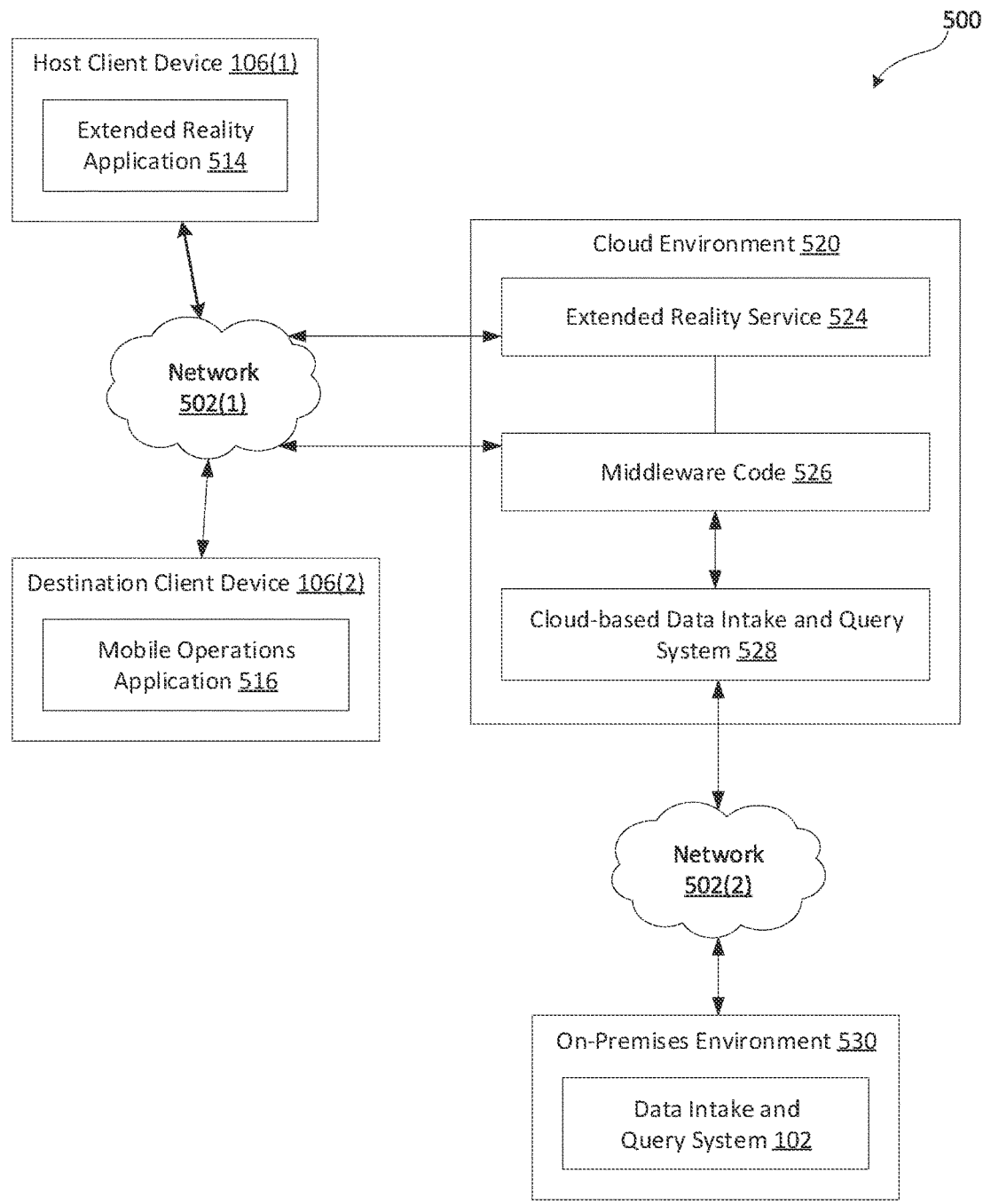
FIG. 5 illustrates a network architecture that enables secure communications via a network between client devices 106 and an on-premises environment for the data intake and query system of FIG. 1, in accordance with example implementations.

FIG. 5 illustrates a network architecture that enables secure communications via network 502 (e.g., 502(1), 502(2)) between client devices 106 (e. 106(1), 106(2), etc.) and an on-premises environment 530 for the data intake and query system 102, in accordance with example implementations.

As described above, a user may install and configure, on computing devices owned and operated by the user, one or more software applications that implement some or all of the data intake and query system 102. For example, a user may install a software application on server computers owned by the user and configure each server to operate as one or more of a forwarder, an indexer, a search head, etc. This arrangement generally may be referred to as an "on-premises" solution. An on-premises solution may provide a greater level of control over the configuration of certain aspects of the system (e.g., security, privacy, standards, controls, etc.).

In various implementations, the cloud-based data intake and query system 528, executing in the cloud environment 520, may serve as a secure bridge between an on-premises environment 1860 and an extended reality application 514 and/or a mobile operations application 516. In other implementations, the on-premises environment 1860 may be omitted and the entire computational process may be carried out in one or more aspects or components of the cloud environment 520. In various implementations, the cloud environment 520 may include a cloud-based data intake and query system 528, which communicates with the data intake and query system 102 via a network 502(2). The cloud environment 520 may further include middleware code 526 and/or a push notification service (not shown), which communicate with the extended reality application 514, the mobile operations application 516, the sensor data device 508, and/or the hub device 504 via a network 502(1). In various implementations, the network 502(1) and the network 502(2) may be portions of the same network or may include one or more shared network components that communicate with both the network 502(1) and the network 502(2). In various implementations, the data intake and query system 102 may communicate with a network interface of a given client device 106 through use of a mobile gateway that facilitates communication between devices behind a firewall, or set of firewalls, without requiring additional port openings.

In various implementations, the client device 106 retrieves data and displays the retrieved data via the extended reality application 514 and/or the mobile operations application 516. For example, the client device 106(1) could send a query to the data intake and query system 102 in order to receive a response that includes a set of field values. These field values, extracted from events, could be associated with data included in the query. In various implementations, the client device 106 and/or the data intake and query system 102 may generate content (e.g., schemas, dashboards, cards, and/or visualizations) based on the extracted field values.

In various implementations, an object may have a tag that encodes or otherwise includes data. The data in the tag includes a textual and/or numerical string that operates as a unique identifier (UID). The tag is provided by an entity that owns or operates the environment in which the object resides. In such instances, the client device 106 may scan tags associated with the object, decode data included in the tag, determine a unique identifier from the decoded data, and use the unique identifier to receive field values, extracted from events, which are associated with the object. In various implementations, the client device 106 and/or the data intake and query system 102 may generate content (e.g., schemas, dashboards, cards, and/or visualizations) based on the extracted field values.

The extended reality application 514 executing on the client device 106(1) and/or the mobile operations application 516 executing on the client device 106(2) may establish secure, bidirectional communications with the data intake and query system 102. For example, in some implementations, a persistent, always-open, asynchronous socket for bidirectional communications (e.g., a trusted tunnel bridge) through a firewall of the on-premises environment 530 could be established between the data intake and query system 102 and the cloud-based data intake and query system 528. The cloud-based data intake and query system 528 may then communicate with the extended reality application 514 and/or the mobile operations application 516 via the middleware code 526 executing in the cloud environment 520.

Additionally, in some implementations, the cloud-based data intake and query system 528 and/or the middleware code 526 may communicate with the extended reality application 514 and/or the mobile operations application 516 via a push notification service, such as Apple Push Notification service (APNs) or Google Cloud Messaging (GCM). For example, the data intake and query system 102 could output to the one or more client devices 106, based on the unique identifier, content that includes real-time data associated with a particular object. The content could then be displayed by the client device 106. For example, the mobile operations application 516 could display the content in a window provided by the client device 106. In some implementations, the extended reality application 514 may display the content in relation to the real-world object, in conjunction with an augmented reality workspace. Additionally or alternatively, various playbooks, insights, predictions, annotations, and/or runbooks that include set of commands and/or logic trees (e.g., if-then-else) associated with an object and possible actions (e.g., "if the operating temperature is above 100 degrees Celsius, then show options for activating fans") may be implemented and/or displayed to the user.

In some implementations, in order to authenticate an instance of the extended reality application 514 and/or the mobile operations application 516 associated with a particular user and/or client device 106, the extended reality application 514 and/or the mobile operations application 516 may cause a unique identifier associated with the user and/or the client device 106 to be displayed on a display device (e.g., on a display of the client device 106). The user may then register the unique identifier with the cloud-based data intake and query system 528 and/or the data intake and query system 102, such as by entering the unique identifier into a user interface (e.g., a web portal) associated with the cloud-based data intake and query system 528 or the data intake and query system 102. In response, the extended reality application 514 and/or the mobile operations application 516 may receive credentials that can be used to access real-time data outputted by the data intake and query system 102. Additional queries transmitted by the client device 106 to the data intake and query system 102 may then implement the credentials associated with the unique identifier. In this manner, secure, bidirectional communications may be established between the client device 106 and the data intake and query system 102.

Once the communications connection is established, a user may cause the client device 106 to acquire data based on a tag provided by, or otherwise associated with, a given object. For example, the client device 106 could scan a tag and may decode the tag to retrieve a unique object identifier (UOID) from the tag that corresponds to the particular object.

Once the client device 106 obtains the UOID, the client device 106 transmits queries to the data intake and query system 102, requesting one or more values associated with the object. For example, the client device 106 could send a request for specific field values for the object. The client device 106 could include the UOID in the request that is sent to the data intake and query system 102. In response, the data intake and query system 102 may retrieve events associated with the UOID and may use extraction rules to extract values for fields in the events being searched, where the extracted values include the requested field values. The data intake and query system 102 then transmits the field values associated with the UOID to the client device 106. In various implementations, the data intake and query system 102 may transmit the raw data retrieved from the field values included in the event data. Alternatively, the data intake and query system 102 may filter, aggregate, or otherwise process the raw data prior to transmitting the field values. For example, in some implementations, the data intake and query system 102 may generate a dashboard associated with the unique object ID. The dashboard may include a filtered subset of data values, where the subset of data values is filtered based on additional criteria, such as user role (e.g., a user role identifier value), location, type of device (e.g., whether client device 106-1 is a smart phone, tablet, AR headset, etc.), and/or time.

The extended reality application 514 receives the field values from the data intake and query system 102, where the field values represent the values of one or more metrics associated with the UOID. In an implementation, the field values are extracted from fields that are defined post-ingestion (e.g., at search time), as has been previously described (e.g., with a late-binding schema). The field values transmitted by the data intake and query system 102 may be in any technically-feasible format.

In various implementations, the data intake and query system 102 may generate a dashboard that includes one or more visualizations of the underlying textual and/or numerical information based on the retrieved field values. In various implementations, the mobile operations application 516 may display one or more visualizations that are included in the dashboard received from the data intake and query system 102. Additionally or alternatively, the extended reality application 514 may generate an AR workspace that includes one or more panels, where the one or more panels include the visualizations (included in the dashboard) as a portion of an AR workspace. In some implementations, the dashboard may also include a portion of the field values as a data set. In such instances, the extended reality application 514 and/or the mobile operations application 516 may generate visualizations based on the field values included in the data set.

Figure 6:
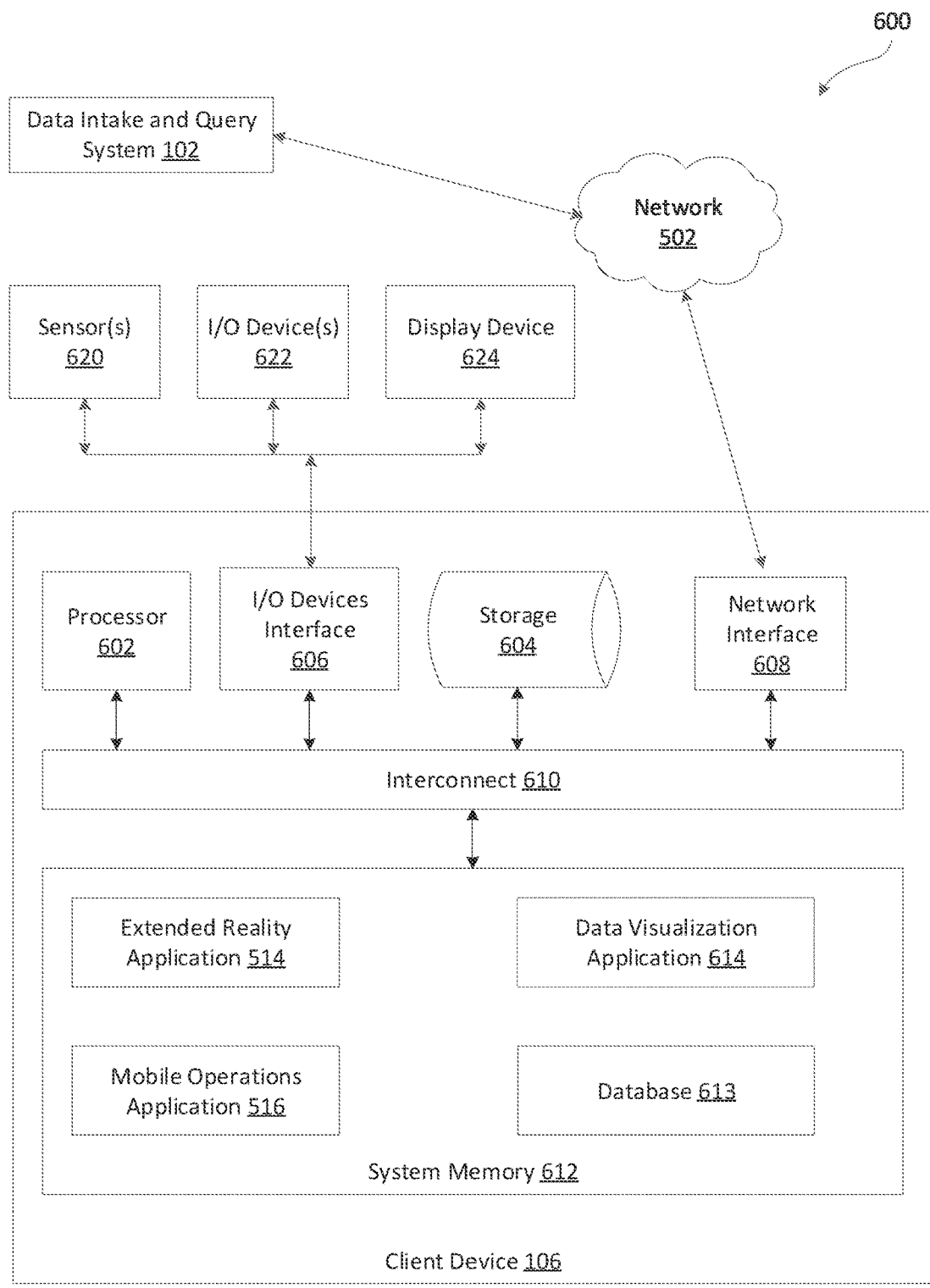
FIG. 6 illustrates a more detailed view of the example data processing environment of FIG. 1, in accordance with example implementations.

FIG. 6 illustrates a more detailed view of the example data processing environment 100 of FIG. 1, in accordance with example implementations. As shown, the data processing environment 600 may include, without limitation, the data intake and query system 102 and the client device 106 communicating with one another over the network 502. The data intake and query system 102 and the client device 106 function substantially the same as described in conjunction with FIGS. 1 and 5, except as further described herein. Examples of the client device 106 may include, without limitation, a mobile device (e.g., a smartphone, a tablet computer, a handheld computer, a wearable device, a portable media player, a virtual reality (VR) console, an augmented reality (AR) console, a laptop computer, a desktop computer, a server, a gaming device, a streaming device (e.g., an Apple TV® device, a Roku® device, etc.), and so forth. The client device 106 may include, without limitation, a processor 602, storage 604, an input/output (I/O) device interface 606, a network interface 608, an interconnect 610, and system memory 612. The system memory 612 includes the extended reality application 514, mobile operations application 516, data visualization application 614 and database 613.

In general, the processor 602 may retrieve and execute programming instructions stored in the system memory 612. The processor 602 may be any technically-feasible form of processing device configured to process data and execute program code. The processor 602 could be, for example, a central processing unit (CPU), a graphics processing unit (GPU), an application-specific integrated circuit (ASIC), a field-programmable gate array (FPGA), and so forth. The processor 602 stores and retrieves application data residing in the system memory 612. The processor 602 is included to be representative of a single CPU, multiple CPUs, a single CPU having multiple processing cores, and the like. In operation, the processor 602 is the manager processor of the client device 106, controlling and coordinating operations of other system components.

The system memory 612 stores software application programs and data for use by the processor 602. For example, the system memory 612 could include, without limitation, the extended reality application 514, the mobile operations application 516, and/or a database 613. The processor 602 executes software application programs stored within the system memory 612 and, optionally, an operating system. In particular, the processor 602 executes software and then performs one or more of the functions and operations set forth in the present application.

The data visualization application 614 is an application that displays, computes, and/or generates data based on data received from the data intake and query system 102. In some embodiments, the data visualization application 614 may use the an identifier for an object (object ID) and/or a dashboard (dashboard ID) to retrieve field values, extracted from events, which are associated with a specific object or environment. In various embodiments, the client device 106 and/or the data intake and query system 102 may generate content (e.g., schemas, dashboards, cards, and/or visualizations) based on the extracted field values.

In various embodiments, the data visualization application 614 retrieves data by querying a field-searchable data store included in the network. For example, the data visualization application 614 could be an instance of the SPLUNK® ENTERPRISE system, an application within the cloud-based environment, such as SPLUNK CLOUD™, an application for a self-service cloud, or another deployment of an application that implements the Splunk processing language (SPL).

For example, the data visualization application 614 could implement the data intake and query system 102 in order to extract one or more fields of data from a field-searchable data store. In such instances, the data visualization application 614 could retrieve the extracted fields as portions of a text string, such as: 2018-07-28 00:07:01,781 INFO [async_client] [async_client][async_post_request] [16574] POST headers={'Authorization': u'SplunkM4q2ROpGJCpng81 W i8JJsyV1yGIxrIhI__IUsIUxvVk3m 112q6Q83Drf7P68v8H68kvQ7RHgA2eJz5o-LSnw4dO0yw EsTodODOjdWDNGhj9zFGN-RuCiBWovEyXnO25X3_aNjSwyO_rE_ik7', Content-Type; app lication/json'}, uri=https://127.0.0.1:8089/servicesNS/nobody/spacebridge-app/storage/collections/data/alert_recipient_devices, params=None, data={"py/object": "spacebridge app.data.alert_data. RecipientDevice", "timestamp": "1532736421.201776", "alert_id": "5b5bb3a580db6133e603d33f", "device_id": "y+DJALQwOXERwVDBzUe340ya1MINAIdOIPzRB dtt91U="}host=ip-10-0-240-141 source=/opt/splunk/var/log/splunk/spacebridge-app.log sourcetype=spacebridge-app-too_small.

In some embodiments, the data intake and query system 102 may send messages to the data visualization application 614 in accordance with a push notification service (not shown), such as the APPLE® Push Notification service (APN), or GOOGLE® Cloud Messaging (GCM). For example, the data visualization application 614 could receive various schemas, dashboards, playbooks, runbooks, cards, and/or visualizations that include real-time data associated with a particular machine and/or set of field-searchable events.

The storage 604 may be a disk drive storage device. Although shown as a single unit, the storage 604 may be a combination of fixed and/or removable storage devices, such as fixed disc drives, floppy disc drives, tape drives, removable memory cards, or optical storage, network attached storage (NAS), or a storage area-network (SAN). The processor 602 communicates to other computing devices and systems via the network interface 608, where the network interface 608 is configured to transmit and receive data via one or more communications networks 502.

The interconnect 610 facilitates transmission, such as of programming instructions and application data, between the processor 602, the input/output (VO) device interface 606, the storage 604, the network interface 608, and the system memory 612. The I/O device interface 606 is configured to receive input data from user I/O devices. These I/O devices include, without limitation, sensor(s) 620 (e one or more cameras, location sensor(s), etc.), input device(s) 622 (e.g., a keyboard, stylus, microphone, etc.), and/or a display device 624. The display device 624 generally represents any technically-feasible means for generating an image for display. For example, the display device 1924 could be a liquid crystal display (LCD) display, an organic light-emitting diode (OLED) display, or a digital light processing (DLP) display. The sensor 620, such as camera, acquires images via a lens and converts the images into digital form. The images acquired by the camera may be stored in the storage 604 and/or the system memory 612. An acquired image may be displayed on the display device 624, either alone or in conjunction with one or more other acquired images, graphical overlays, and/or other data.

The sensor(s) 620 may include location sensors enable the client device 106 to determine the physical location and/or orientation of the client device 106. In some implementations, the location sensor(s) may include a network-based sensor that communicates with the data intake and query system 102 via the network 502, which may be part of a production-monitoring network. In some implementations, the location sensor(s) may include a network-based sensor that communicates with one or more data intake and query systems 102 via a local area network (LAN) and/or a wide area network (WAN). In various implementations, the production-monitoring environment may include multiple objects (e.g., sensor data devices 508) and/or multiple client devices 106. Each of the client devices 106 may communicate with a data intake and query system 102, and each of the client devices 106 is capable of identifying one or more objects based on identifier tags, geofences, and/or any other object-identification technique disclosed herein.

The I/O devices 622 may include a microphone that acquires audio signals for storage and analysis. Additional examples of user I/O devices 622 (not explicitly shown) may include one or more buttons, a keyboard, and a mouse or other pointing device. The I/O device interface 606 may also include an audio output unit configured to generate an electrical audio output signal, and the additional user I/O devices 622 may further include a speaker configured to generate an acoustic output in response to the electrical audio output signal.

6.0. Secure Update of Dashboard Properties

Accordingly, in various implementations disclosed herein, a data processing environment includes a host device and one or more destination devices that are connected via a tunnel bridge. In particular, the host device changes one or more properties of a host dashboard, where the host dashboard provides insights to various operations via retrieved data values. For example, the host device provides dashboard property modifications through the tunnel bridge to the one or more destination devices. A given destination device includes a destination dashboard that corresponds to the dashboard included in the host device. Upon receipt of the modifications, the destination device applies the modifications to the destination dashboard.

In another example, host device may transmit the dashboard property modification to a device simulator, where a given device simulator models the operation of software operating on a specific type of device. A given device simulator modifies a property of a dashboard that is included in the given device simulator. The given device simulator then provides the modified simulated dashboard to at least one of the host device or the destination device, where the receiving device displays the modified simulated dashboard. Further, the given device simulator generates a dashboard screenshot of the generated dashboard. In such instances, the given device simulator transmits the screenshot to remote storage, where the host device or the destination devices retrieves the dashboard screenshot for display. These techniques are described below in further detail in conjunction with FIGS. 7-15.

6.1. Secure Transmission of Update to Dashboard Properties

Figure 7:
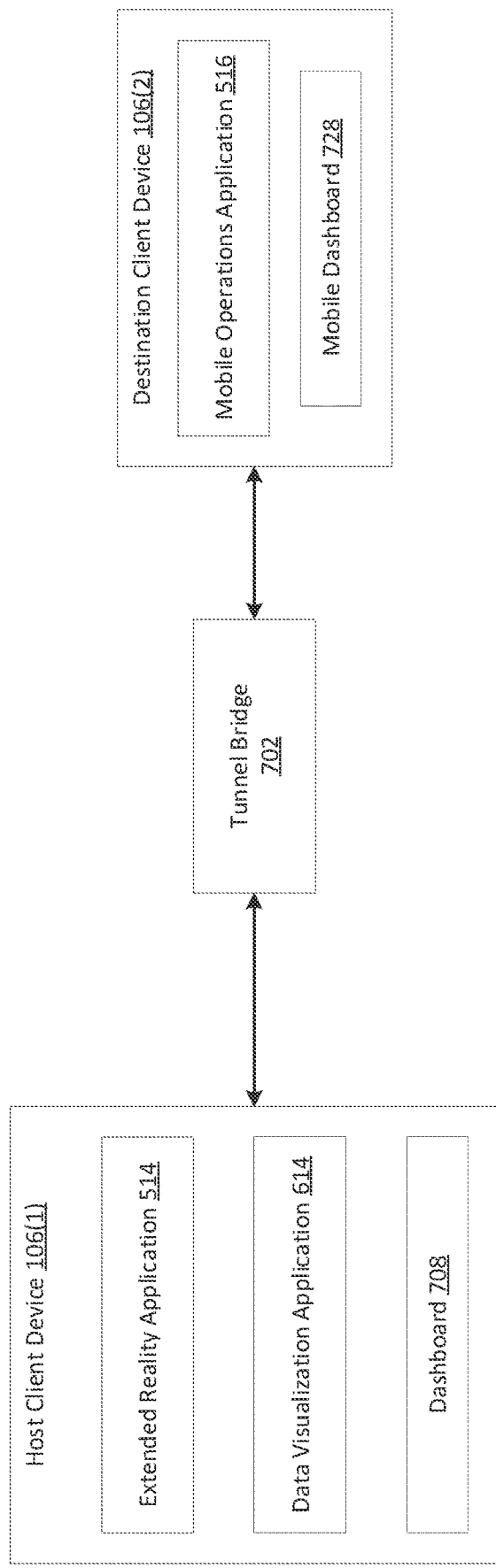
FIG. 7 illustrates a block diagram of an example data processing environment, in accordance with example implementations.

FIG. 7 illustrates a block diagram of an example data processing environment 700, in accordance with example implementations. As shown, one or more components of the data processing environment 700 may include, without limitation, a host client device 106(1), a destination client device 106(2), and a tunnel bridge 702. The host client device 106(1) includes the extended reality application 514, the data visualization application 614, and a dashboard 708. The destination client device 106(2) includes the mobile operations application 516 and a mobile dashboard 728.

In various embodiments, the host client device 106(1) functions substantially the same as the client computing device 106 described in conjunction with FIG. 1, except as further described herein. Examples of the host device 106(1) may include, without limitation, a laptop computer, a desktop computer, a server, a tablet computer, a handheld computer, a smartphone, a wearable device, an extended reality (XR) console, a portable media player, a gaming device, a streaming video device, an Apple TV® device, and so forth. In some embodiments, the host device 106(1) executes one or more applications that present, compute, or generate data based on data received from a data processing service that includes the data intake and query system 102.

For example, the host device 106(1) could execute an extended reality (e.g., augmented reality (AR), mixed reality (MR), and/or virtual reality (VR)) application, which presents a portion of a real-world environment, performance metrics associated with assets in the real-world environment, and/or other data as provided by data intake and query system 108 and/or data processing application. In various embodiments, the extended reality application 514 included in the host device 106(1) may an XR environment based on sensor data acquired from one or more sensor(s) 620. For example, the extended reality application 514 may include imaging data acquired by and imaging sensor.

In some embodiments, the data visualization application 614 may generate a dashboard 708 that includes include one or more visualization panels that are associated with portions of the a given environment. Dashboard 708 includes properties that may include visualization panels that display the content (e.g., schemas, cards, and/or visualizations generated from the extracted field values), full graphics overlay, a partial graphics overlay, text data (e.g., alerts, runbooks, playbooks, etc.), and/or numerical data. For example, one or more physical objects (e.g., sensors, physical machines, servers, etc.) may be registered with a data processing service and may stream data to the data processing service. The data processing service may ingest and store the data via the data intake and query system 102.

When generating the dashboard 708, the data visualization application 614 may send one or more queries to the data intake and query system 102 in order to receive data values, playbooks, and so forth, to present within via the dashboard 708. In various embodiments, the data intake and query system 102 may generate a dashboard 708 that includes one or more visualizations of the underlying textual and/or numerical information based on the retrieved field values. In various embodiments, the dashboard 708 may present, in one or more visualizations included in the dashboard, data values received from data intake and query system 102. In some embodiments, the dashboard 708 may also include a portion of the field values as a data set. In such instances, the extended reality application 514 and/or the mobile operations application 614 may generate visualizations based on the field values included in the data set.

Destination client device(s) 106(2) functions substantially the same as the client computing device 102 described in conjunction with FIG. 1, except as further described herein. Examples of the destination client device 106(2) may include, without limitation, a smartphone, a tablet computer, a handheld computer, a wearable device, a television, an XR console, a laptop computer, a desktop computer, a server, a portable media player, a gaming device, a streaming video device, Apple TV® device, and so forth. In some embodiments, the destination client device 106(2) executes one or more applications that present, compute, or generate data based on data received from the data processing service.

In various embodiments, the destination client device 106(2) may be remote to the host client device 106(1). Additionally or alternative, the destination client device 106(2) and the host client device 106(1) may be included in different networks. It is noted that "remote" in this context means located at a network address than the host device 106(1). For example, the destination client device 106(2) may be physically proximate to the host client device 106(1) and be included in different networks. In various embodiments, what constitutes "remote" may differ based on the use case, but no minimum or maximum distance is specified here or required. There may be implementations in which the destination client device 106(2) are on the same table as the host client device 106(1), or implementations where the destination client device 106(2) is thousands of miles away from the client device 106(2).

In some embodiments, the mobile operations application 516 may generate a mobile dashboard 728 that includes include one or more visualization panels that are associated with portions of the a given environment. For example, one or more physical objects (e.g., sensors, physical machines, servers, etc.) may be registered with a data processing service and may stream data to the data processing service. The data processing service may ingest and store the data via the data intake and query system 102. While in some embodiments, the mobile dashboard 728 may be the same as the dashboard 708, in other embodiments, the mobile dashboard 728 may be different. For example, in some embodiments, the mobile dashboard 728 may have a different resolution that reflects a difference in screen resolution between the host client device 106(1) and the destination client device 106(2).

In various embodiments, other devices, such as the destination client device 106(2), may include a dashboard (e.g., the mobile dashboard 728) that corresponds to the dashboard 708 included in the host client device 106(1). In such instances, the data visualization application 614 may identify the mobile dashboard 728 as corresponding to the dashboard 708. For example, dashboard 708 could include a mapping that links a dashboard identifier (ID) of the dashboard 708 with the dashboard ID of the mobile dashboard 728. In such instances, the host client device 106(1) could determine the address of the destination client device 106(2).

Additionally or alternatively, in various embodiments, the host client device 106(1) may be a publisher of information associated with dashboard 708 and the destination client device 106(2) could be a subscriber to the dashboard 708. In such instances, the host client device 106(1) may determine that the destination client device 106(2) is a subscriber to the dashboard 708 and includes a dashboard (e.g., the mobile dashboard 728) that corresponds to the dashboard 708. The host client device 106(1) may publish dashboard update messages for the dashboard 708 by transmitting the dashboard update messages to a message bus (not shown). In such instances, subscribers to the message bus, including the destination client device 106(2) may subsequently receive the dashboard update messages.

Tunnel bridge 702 is a device that establishes communications with one or more devices included in the data processing environment 700. For example, the tunnel bridge 702 may establish one or more WebSocket connections with the host client device 106(1), the destination client device(s) 106(2), a data processing service, remote storage, and so forth. In some embodiments, the tunnel bridge 702 may be a trusted service that establishes trust with one or more devices in order to establish secure WebSocket connections with such devices. In some embodiments, the tunnel bridge 702 may perform authentication operations with other devices in order to establish trust, and may then establish secure communications channels with the other devices, where the tunnel bridge 702 and/or other devices and transmit secure communications using the secure communications channels.

In some embodiments, the tunnel bridge 702 enables E2EE communications between two separate devices by forwarding one or more encrypted data packets without fully decrypting the encrypted data packet. For example, the tunnel bridge 702 may receive an encrypted data packet that was encrypted and signed using multiple encryption keys. The trusted tunnel bridge 702 may determine whether the encrypted data packet was validly signed with one of the encryption keys without decrypting the encrypted data packet.

Figure 8:
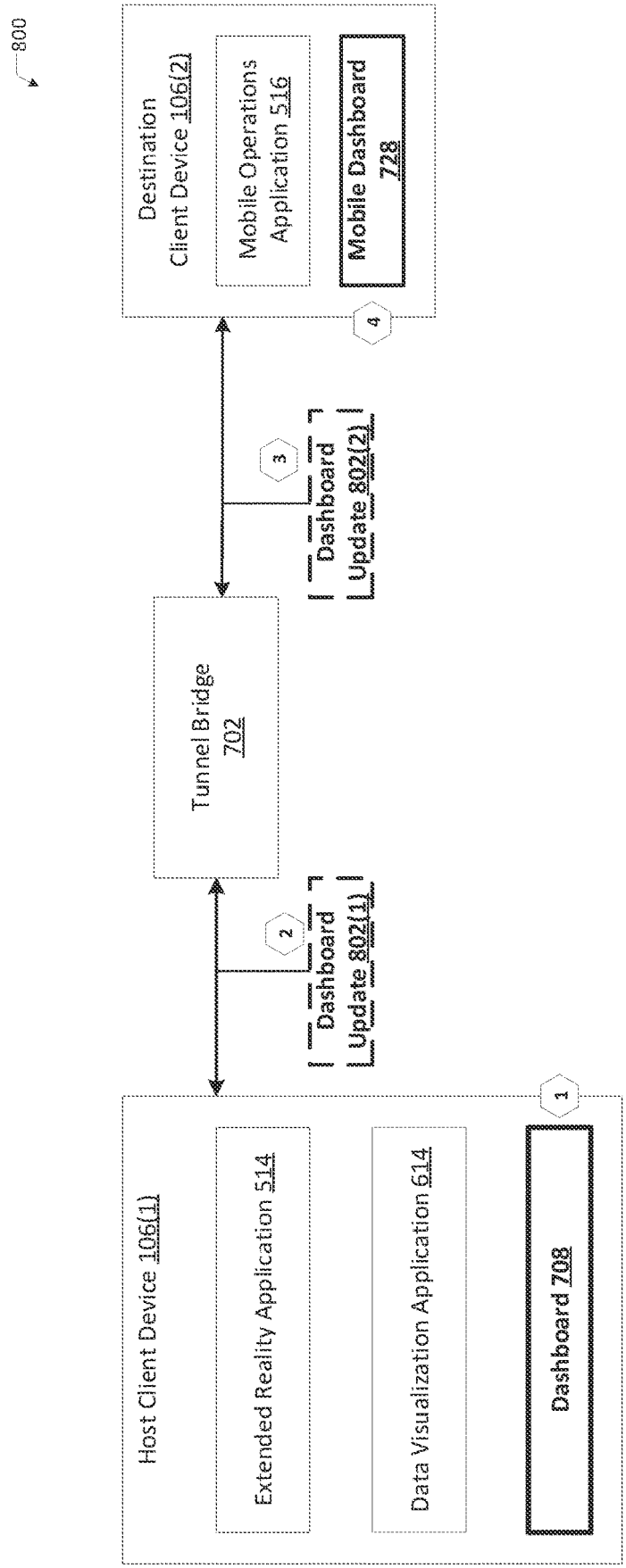
FIG. 8 is a more-detailed illustration of the secure update transmission technique performed by various devices included in the data processing environment of FIG. 7, in accordance with example implementations.

FIG. 8 is a more-detailed illustration of the secure update transmission technique performed by various devices included in the data processing environment 700 of FIG. 7, in accordance with example implementations. As shown, one or more components of the data processing environment 800 include the host client device 106(1), the destination client device 106(2), and the tunnel bridge 702. The host client device 106(1) includes the extended reality application 514, the data visualization application 614, and the dashboard 708. The destination client device 106(2) includes the mobile operations application 516 and the mobile dashboard 728. Dashboard update messages 802 (e.g., 802(1), 802(2), etc.) are transmitted between the host client device 106(1) and the destination client device 160(2) via the tunnel bridge 702.

In operation, the dashboard 708 that is included in the host client device 106(1) corresponds to the mobile dashboard 728 that is included in the destination client device 106(2). The dashboard 708 includes one or more properties that affect the characteristics of the dashboard (e.g., the format of the dashboard) and how the dashboard receives and provides content via one or more output devices 622, 624 (e.g., data refresh rate, the type visualizations displayed, data input type, etc.). Properties of a given dashboard 708 may include, for example, screen resolution, data refresh rate, types of visualizations, input field values, subscribers to the dashboard, display device type, and so forth.

When the data visualization application 614 determines that one or more modifications to the properties of dashboard 708 are to be applied, the data visualization application 614 applies the changes to the dashboard 708 and transmits one or more dashboard update messages 802 to the destination client device 106(2) via the tunnel bridge. The mobile operations application 516, based on the dashboard updates, applies one or more modifications to the mobile dashboard 728. In various embodiments, the mobile dashboard 728 may include different set of properties than the dashboard 708 (e.g., differences in resolution, input device(s), network connection, etc.). In such instances, the mobile operations application 1816 may apply the one or more modifications differently to the mobile dashboard 728 than modifications that the data visualization application 614 applied to the dashboard 708.

In various embodiments, the data visualization application modifies the one or more properties of the dashboard included in the host device. The host device provides the modifications to the one or more properties of the dashboard through the tunnel bridge to the one or more destination devices. A given destination device includes a destination dashboard that corresponds to the dashboard included in the host device. Upon receipt of the modifications, the destination device applies the modifications to the destination dashboard in order to change the properties of the destination dashboard in a manner similar to the changes applied to the host dashboard. In some embodiments, the host dashboard and destination dashboard may be associated with different device types. In such instances, the modifications applied to the host dashboard may be translated to a different set of modifications to reflect the differences in device types.

For explanatory purposes only, a series of numbered hexagons labeled 1-4 depicts an example series of operations that occur when the host device 106(1) securely transmits a modification to a property of the dashboard 708 in order to change a similar property on the mobile dashboard 728 included in the destination client device 106(2).

As depicted with the hexagon numbered 1, the host client device 106(1) modifies one or more properties of the dashboard 708. In various embodiments, the data visualization application 614 may modify one or more properties of dashboard 708. For example, the data visualization application 614 could receive an input that changes an arrangement of visualizations within the dashboard 708 (as displayed via the data visualization application 614 and/or the extended reality application 514). The data visualization application 614 could then modify the property of the dashboard 708 that changes the arrangement of visualizations.

Other example inputs could change other properties of the dashboard 708. In one example, a user may provide an input that changes the data source (e.g., data store 310) that stores the data values for a given visualization included in the dashboard 708. In another example, the input may modify filter criteria used to retrieve data values via the data intake and query system 102. Other examples that modify the properties of a dashboard 708 could include additions and/or removals of visualizations, the arrangement of display panels (e.g., visualization panels within an XR environment), addition/removal of subscribers to the dashboard, and so forth.

As depicted with the hexagon numbered 2, the host client device 106(1) provides the modification to the tunnel bridge 702. In various embodiments, upon determining that the received input changes a property of the dashboard 708, the data visualization application 614 generates one or more dashboard update messages 802 (e.g., 802(1)) that include information for updating corresponding dashboards. For example, the destination client device 106(2)) could include a dashboard (e.g., the mobile dashboard 728) that corresponds to the dashboard 708 included in the host client device 106(1). When the host client device 106(1) determines a change in the dashboard property, the host client device 106(1) provides the dashboard update message 802 to the destination client device 106(2) to apply modifications to the mobile dashboard 728.

In various embodiments, the data visualization application 614 may first identify the mobile dashboard 728 as corresponding to the dashboard 708. For example, the host client device 106(1) could include an entry in database 613 that includes a mapping that links the dashboard ID of the dashboard 708 with the dashboard ID of the mobile dashboard 728. In such instances, the host client device 106(1) could determine the address of the destination client device 106(2 by scanning the contents of database 613. In another example, the host client device 106(1) may be a publisher of information associated with dashboard 708, while the destination client device 106(2) could be a subscriber to information associated with the dashboard 708. In such instances, the host client device 106(1) could determine that the dashboard 708 includes at least one subscriber and could publish dashboard update messages for the dashboard 708. When publishing the dashboard update message 802, the host client device 106(1) could transmit the dashboard update message 802 to an internal message bus (not shown). The destination client device 106(2) as a subscriber to the internal message bus for the dashboard 708 could then receive the dashboard update messages 802 as the messages are transmitted from the internal message bus.

In some embodiments, the data visualization application 514 may automatically generate the dashboard update message 802(1) upon applying modifications to the dashboard 708. Alternatively, the data visualization application 614 may generate the dashboard update message 802(2) in response to a separate user input indicating a command to provide the dashboard modification to the destination client device 106(2). In some embodiments, the dashboard update message 802(1) includes information about the modification (e.g., the change in the arrangement of visualizations), as well as the dashboard ID for the dashboard 708 and/or a set of data values associated with the dashboard 708. Additionally or alternatively, the dashboard update message 802(1) may include the dashboard ID for the mobile dashboard 728.

As depicted with the hexagon numbered 3, the tunnel bridge 702 transmits the dashboard update message 802 (e.g., 802(2)) to the destination client device 106(2). In various embodiments, the tunnel bridge 702 may determine the address of the destination client device 106(2) that is to receive the dashboard update message 802. In such instances, the tunnel bridge 702 may transmit the dashboard update message 802(2) to the destination client device 106(2).

For example, when the data visualization application 614 determines that the destination client device 106(2) is to receive the dashboard update message 802(1), the data visualization application may include an address (e.g., IP address, a destination device identifier (DDI), etc.) of the destination client device 106(2). In such instances, the tunnel bridge 702 could identify the address included in the dashboard update message 802(1) and generate a new dashboard update message 802(2) that includes the address for the destination client device 106(2). In another example, the tunnel bridge 702 could include a set of addresses corresponding to addresses of subscribers to the message bus associated with the dashboard 708. In such instances, the tunnel bridge 702 could identify a value in the dashboard update message 802(1) that includes an identifier for the message bus (e.g., a topic identifier, subscription ID, etc.) and generate one or more messages that are addressed to each respective subscriber of the message bus.

As depicted with the hexagon numbered 4, the destination client device 106(2) applies the modifications to the remote dashboard 728. In various embodiments, the destination client device 106(2) receives the dashboard update message 802(2) from the tunnel bridge. Upon receipt of the dashboard update message 802(2), the destination client device 106(2) applies modifications to the mobile dashboard 728 based on the contents of the dashboard update message 802(2). In some embodiments, the mobile operations application 516 included in the destination client device 106(2) applies a set of modifications to the mobile dashboard 728 in order to change the properties of the mobile dashboard 728 in a manner similar to the changes applied to the dashboard 708.

In some embodiments, the dashboard 708 and the mobile dashboard 728 may be associated with different device types (e.g., a desktop and a mobile device, respectively). In such instances, the modifications that the data visualization application 514 applied to the dashboard 708 may correspond to a different set of modifications that the mobile operations application 516 applies to the mobile dashboard 728. For example, the data visualization application 614 could change the horizontal arrangement of two visualizations in a row within the dashboard 708. In this example, the mobile dashboard 728 could be limited to display only one visualization in a row. In such instances, the mobile operations application 516 could respond to the change in horizontal arrangement indicated in the dashboard update message 802(2) by modifying a vertical arrangement of the corresponding visualizations within the mobile dashboard 728. In some embodiments, the destination client device 106(2) may optionally transmit a message indicating that the modifications to the mobile dashboard 728 have been completed.

Figure 9:
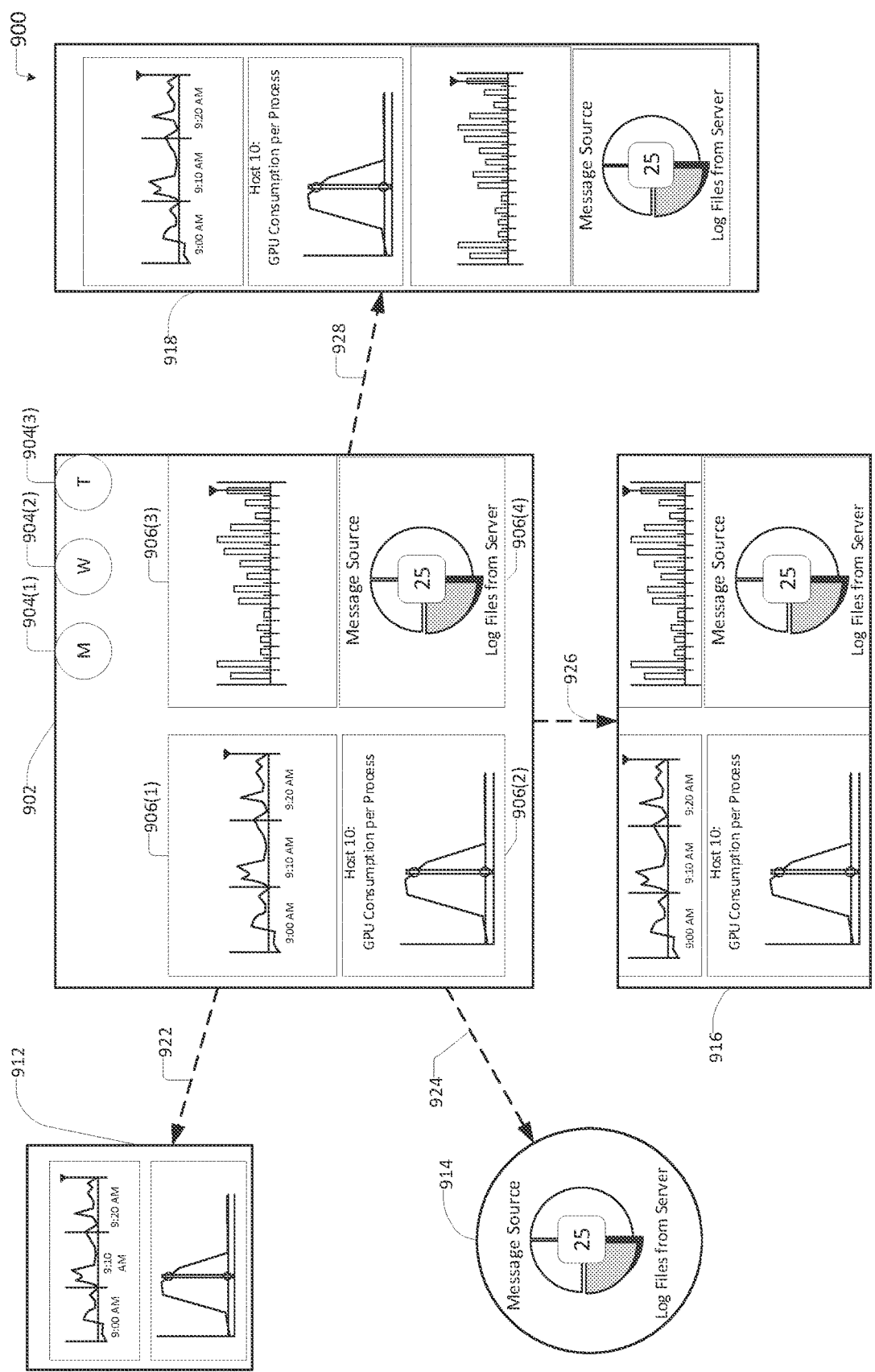
FIG. 9 illustrates example dashboards included in the data processing system of FIG. 8, in accordance with example implementations.

FIG. 9 illustrates example dashboards included in the data processing system 800 of FIG. 8, in accordance with example implementations. Presentation 900 includes a host dashboard 902, a mobile dashboard 912, a wearable dashboard 914, a television dashboard 916, and a simulated screenshot 918. The host dashboard 902 includes update buttons 904 (e.g., a mobile dashboard update 904(1), a wearable dashboard update 904(2), a television dashboard update 904(3), etc.) and visualizations 906 (e.g., 906(1), 906(2), 906(3), 906(4)). Updates at the host dashboard 902 cause dashboard updates triggered by the respective messages 922, 924, 926, and the generation of screenshot 918 triggered by the message 928.

Host dashboard 902 displays a set of visualizations 906. Host dashboard 902 includes a set of properties (e.g., screen resolution, data refresh rate, types of visualizations, input field values, subscribers, etc.) that specify how the dashboard displays information via a given device (e.g., the host client device 106(1)). Each visualization 906 may include a different set of input field values and may be updated at different rates. Host dashboard 902 may include properties that specify the type of visualizations 906 to display, as well as the arrangement of visualizations 906.

In various embodiments, other devices, such as the destination client device 106(2), may include separate dashboards 912, 914, 926 that corresponds to the host dashboard 902. In such instances, the host device 106(1) may store a mapping that links a dashboard identifier (ID) of the host dashboard 902 with dashboard IDs the corresponding dashboards 912, 914, 916. Additionally or alternatively, the destination device(s) 106(2) could subscribe to the host dashboard 902. In such instances, the destination device 106(2) receives published updates to the host dashboard 902.

The host dashboard 902 includes update buttons 904 (e.g., mobile dashboard update 904(1), wearable dashboard update 904(2), television dashboard update 904(3), etc.). In some embodiments, a user may manually select a given update button 904 in order to provide an update for the given dashboard (e.g., clicking on the mobile dashboard update 904(1) to provide an update to the mobile dashboard 912). In some embodiments, the host client device 106(1) transmits a message 922 to the destination device 106(2) to update the mobile dashboard 912 to reflect the modification made to the properties of the host dashboard 902. In some embodiments, the user may successively press the wearable dashboard update button 904(2) and television dashboard update button 904(3) in order to send dashboard update messages 924, 926 to the respective wearable dashboard 914 and the television dashboard 916. Alternatively, the client device 106(1) may continually publish changes as messages 922 without receiving an input via the mobile update button 904(1).

Depending on the differences in properties of the respective dashboards 912, 914, 916 compared to the host dashboard 902, the properties of the dashboards 912, 914, 916 may result in different modifications. For example, the mobile dashboard 912 could display the visualizations 906 as a single column and may show only a portion of the visualizations at a time. Dashboards 912, 914, 916 may also reflects specific model properties based on characteristics like the operating system of the device, the network connection, power consumption, and so forth.

In various embodiments, the host dashboard 902 may send a message 928 that causes the generation of a screenshot 918 that corresponds to a complete dashboard. For example, the dashboard screenshot 918 could be a complete version of the mobile dashboard 912. In such instances, the destination client device 106(2) could update the mobile dashboard 912 and generate the dashboard screenshot 918. In some embodiments, the destination client device 106(2) sends the dashboard screenshot 918 back to the host client device 106(1) for display.

Figure 10:
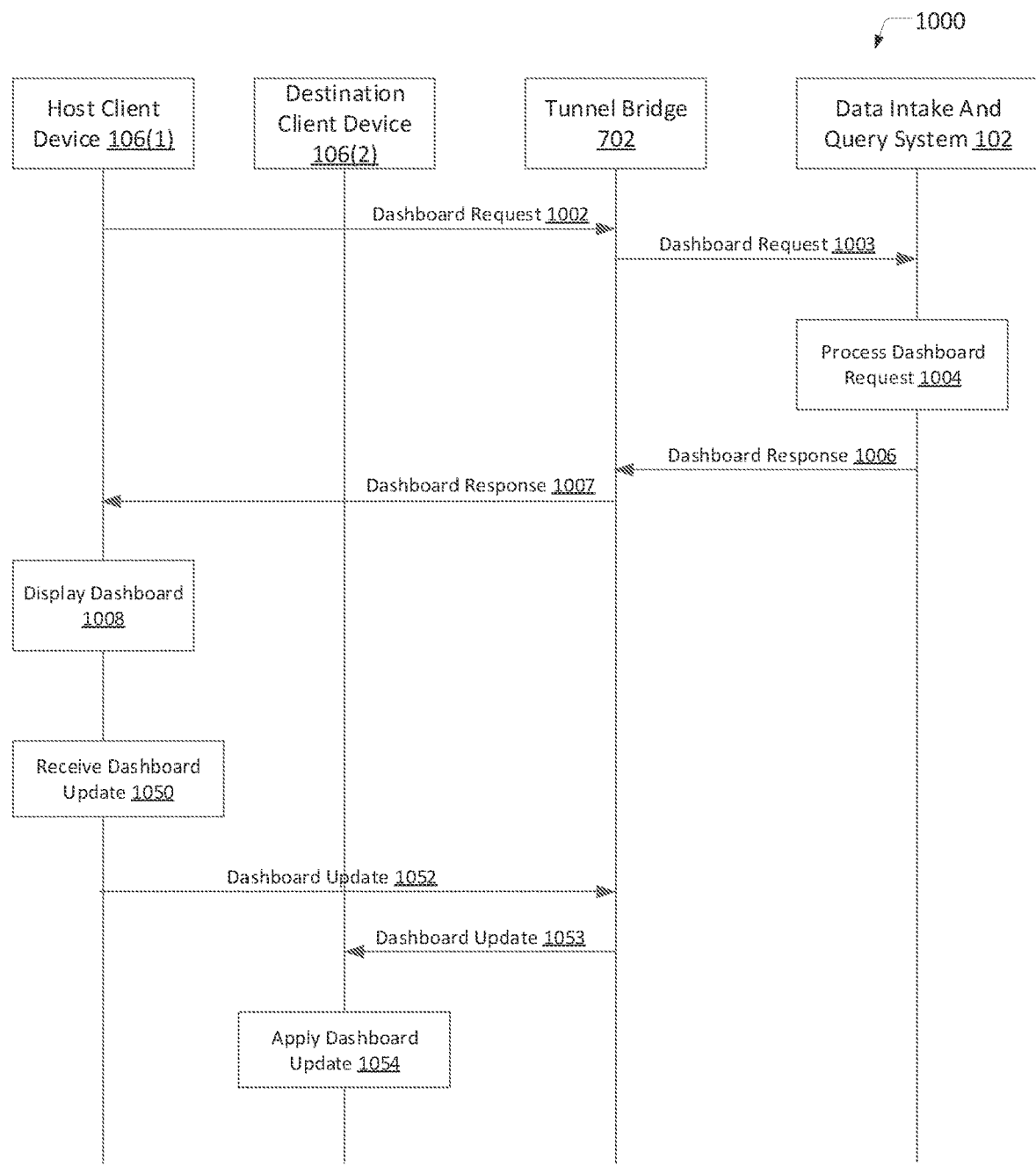
FIG. 10 illustrates a call flow diagram showing interactions between various components of the example data processing environment of FIG. 8, in accordance with example implementations.

FIG. 10 illustrates a call flow diagram showing interactions between various components of the example data processing environment 800, in accordance with example implementations. One or more components of the data processing environment 800 may perform various operations 1000, including retrieving a dashboard and securely transmitting updates of dashboard properties.

During the retrieval of a dashboard 708, the host client device 106(1) sends a dashboard request message 1002 to request a specific dashboard and/or specific data values for the specific dashboard. In various embodiments, the dashboard request 2522 includes information such as a specific dashboard identifier, parameters that specify the data values that are to be included in a response to the dashboard request 1002, a destination device identifier (DDI) of the data intake and query system 102, and so forth. The tunnel bridge 702 receives the dashboard request 1002 and transmits a corresponding dashboard request 1003 to the data intake and query system 102. The data intake and query system 102 performs actions 1004 to process the dashboard request 1003 and retrieves the dashboard 708 and/or a data set for the dashboard 708 from one or more data sources and/or one or more data stores 310 based on information included in the dashboard request 1003.

The data intake and query system 102 transmits a dashboard response message 1006. In various embodiments, the dashboard response message 1006 may include information associated with the dashboard. In some embodiments, in the information includes the dashboard 708 itself, properties of the dashboard 708, a visualization set that includes one or more visualizations to be displayed within the dashboard 708, the retrieved data set, and so forth. In some embodiments, the retrieved data set includes a set of updated values that reflect a specific period of values (e.g., a periodic update of current conditions).

The tunnel bridge 702 receives the transport response message 1006 and transmits a corresponding dashboard response message 1007 to the host client device 106(1). For example, the transport response message 1006 can include a DDI) of the host client device 106(1). The tunnel bridge 1930 could, based on the included DDI, identify the host client device 106(1) and generate a dashboard response message 1007 that includes a network address for the host client device 106(1).

Upon receiving the dashboard response message 1007, the host client device 106(1) performs actions 1008 to display one or more dashboards via a display (e.g., the display device 624). For example, at least one of the extended reality application 514 or the data visualization application 614 could retrieve the dashboard 708 and display, via display device 624, visualizations within the dashboard 708 that include the retrieved set of data values.

In certain situations, the host client device 106(1) may receive user inputs that modify the properties of the retrieved dashboard 708. The host client device 106(1) may then transmit the changes to other devices in order to cause modifications to corresponding dashboards on recipient devices. When providing a secure transmission of an update to recipient devices, the host client device 106(1) receives an update 1050 to the dashboard 708. In various embodiments, the data visualization application 614 may receive an input indicating a change to a property of the dashboard. For example, the data visualization application 614 could receive an input to add a new visualization to the dashboard 708. In such instances, the data visualization application 614 could then apply the modification to the dashboard 708 based on the received input. Additionally or alternatively, the data visualization application 614 could determine that a property of the dashboard 708 has been modified.

After receiving the update to the dashboard property, the host client device 106(1) sends a dashboard update message 1052. In various embodiments, the data visualization application 614 may generate the dashboard update message 1052 that includes information for the destination client device 106(2) to apply modifications to the mobile dashboard 728 that corresponds to the dashboard 708. In some embodiments, the data visualization application 514 may automatically generate the dashboard update message 1052 upon applying the modification to the dashboard 708. Alternatively, the data visualization application 614 may generate the dashboard update message 1052 in response to a separate user input indicating a command to provide the dashboard modification to the destination client device 106(2).

In some embodiments, the dashboard update message 1052 includes information about the modification (e.g., the addition of a new visualization), as well as the dashboard ID for the dashboard 708, the new visualization, a set of data values associated with the dashboard 708, and/or a destination device identifier for the destination client device 106(2). Additionally or alternatively, the dashboard update message 802(1) may include the dashboard ID for the mobile dashboard 728. The tunnel bridge 702 receives the dashboard update message 1052 and transmits a corresponding dashboard update message 1053 to the destination client device 106(2).

The destination client device 106(2) receives the update to the dashboard property by receiving the dashboard update message 1053. In various embodiments, the destination client device 106(2) may perform various actions to apply the update to the dashboard property by modifying the remote dashboard 728. In various embodiments, the destination client device 106(2) applies modifications to the mobile dashboard 728 based on the contents of the dashboard update message 1053. In some embodiments, the mobile operations application 516 included in the destination client device 106(2) applies a set of modifications to the mobile dashboard 728 in order to change the properties of the mobile dashboard 728 in a manner similar to the changes applied to the dashboard 708. For example, the mobile operations application 516 could add the new visualization to a portion of the mobile dashboard 728.

Figure 11:
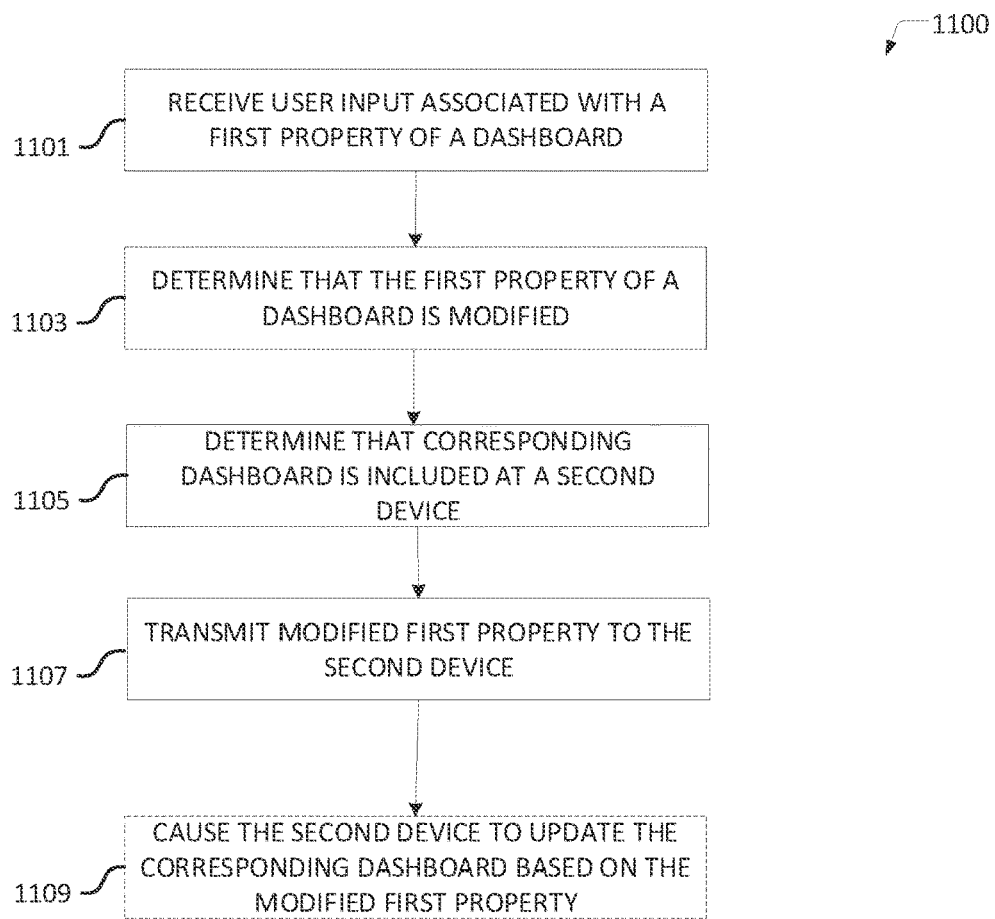
FIG. 11 sets forth a flow diagram of method steps for securely transmitting an update to a dashboard property, in accordance with example implementations.

FIG. 11 sets forth a flow diagram of method steps for securely transmitting an update to a dashboard property, in accordance with example implementations. Although the method steps are described in conjunction with FIGS. 1-10, persons of ordinary skill in the art will understand that any system configured to perform this method and/or other methods described herein, in any order, and in any combination not logically contradicted, is within the scope of the present invention.

As shown by method 1100, at step 1101, a host client device receives a user input associated with a dashboard. In various embodiments, a data visualization application 614 included in the host client device 106(1) may receive an input indicating a change to a property of the dashboard 708. For example, the data visualization application 614 could receive an input to change the rate that the dashboard 708 requests new data values from the data intake and query system 102. In such instances, the data visualization application 614 could then apply the modification to the dashboard 708 based on the received input.

At step 1103, the host client device 106(1) determines, based on the user input, that a first property of the dashboard is modified. In various embodiments, the data visualization application 614 may respond to the received user input by determining the input modified at least a first property of the dashboard 708. In some embodiments, the data visualization application 614 may determine that the input is to modify at least the first property of the dashboard 708 before the data visualization application 614 applies the modification to the dashboard 708.

At step 1105, the host client device 106(1) determines that a corresponding dashboard is included at a second device. In various embodiments, at least one other device (e.g., the destination client device 106(2)) may include a dashboard (e.g., the mobile dashboard 728) that corresponds to the dashboard 708 included in the host client device 106(1). In such instances, the data visualization application 614 may identify the mobile dashboard 728 as corresponding to the dashboard 708. For example, dashboard 708 could include a mapping that links the dashboard ID of the dashboard 708 with the dashboard ID of the mobile dashboard 728. In such instances, the host client device 106(1) could determine the address of the destination client device 106(2).

Additionally or alternatively, in various embodiments, the host client device 106(1) may be a publisher of information associated with dashboard 708 and the destination client device 106(2) could be a subscriber to the dashboard 708. In such instances, the host client device 106(1) may determine that the destination client device 106(2) is a subscriber to the dashboard 708 and includes a dashboard (e.g., the mobile dashboard 728) that corresponds to the dashboard 708.

At step 1107, the host client device 106(1) transmits the modified first property to the second device. In various embodiments, the data visualization application 614 may generate a dashboard update message 802 that includes information for the destination client device 106(2) to apply modifications to the mobile dashboard 728 that correspond to modifications applied to the first property of the dashboard 708. In some embodiments, the dashboard update message 802 includes information about the modification to the first property (e.g., the new rate at which the dashboard is to request data values from the data intake and query system 102), as well as the dashboard ID for the dashboard 708, a set of data values associated with the dashboard 708, and/or a destination device identifier for the destination client device 106(2). Additionally or alternatively, the dashboard update message 802(1) may include the dashboard ID for the mobile dashboard 728.

In some embodiments, the data visualization application 514 may automatically generate the dashboard update message 802 upon applying the modification to the dashboard 708. Alternatively, the data visualization application 614 may generate the dashboard update message 802 in response to a separate user input indicating a command to provide the dashboard modification to the destination client device 106(2). In some embodiments, the host client device 106(1) may publish the dashboard update message 802 by transmitting the dashboard update message to a message bus (not shown). In such instances, subscribers to the message bus, including the destination client device 106(2) may subsequently receive the dashboard update message. Additionally or alternatively, the tunnel bridge 702 may receive the dashboard update message 802 and may transmit a corresponding dashboard update message 802 to the destination client device 106(2).

At step 1109, the host client device 106(1) may optionally cause the second device to update the corresponding dashboard based on the modified first property. In various embodiments, the destination client device 106(2) receiving the dashboard update message 802 via the tunnel bridge may trigger the destination device 106(2) to update the mobile dashboard 728. In some embodiments, the mobile operations application 516 included in the destination client device 106(2) responds to the dashboard update message 802 by applying the modification to the first property by modifying the remote dashboard 728. For example, the mobile operations application 516 could modify the rate at which the mobile dashboard 728 requests data values from the data intake and query system 102 to match the rate specified in the dashboard update message 802.

6.2. Cloud-Based Secure Update to Dashboard Properties

Figure 12:
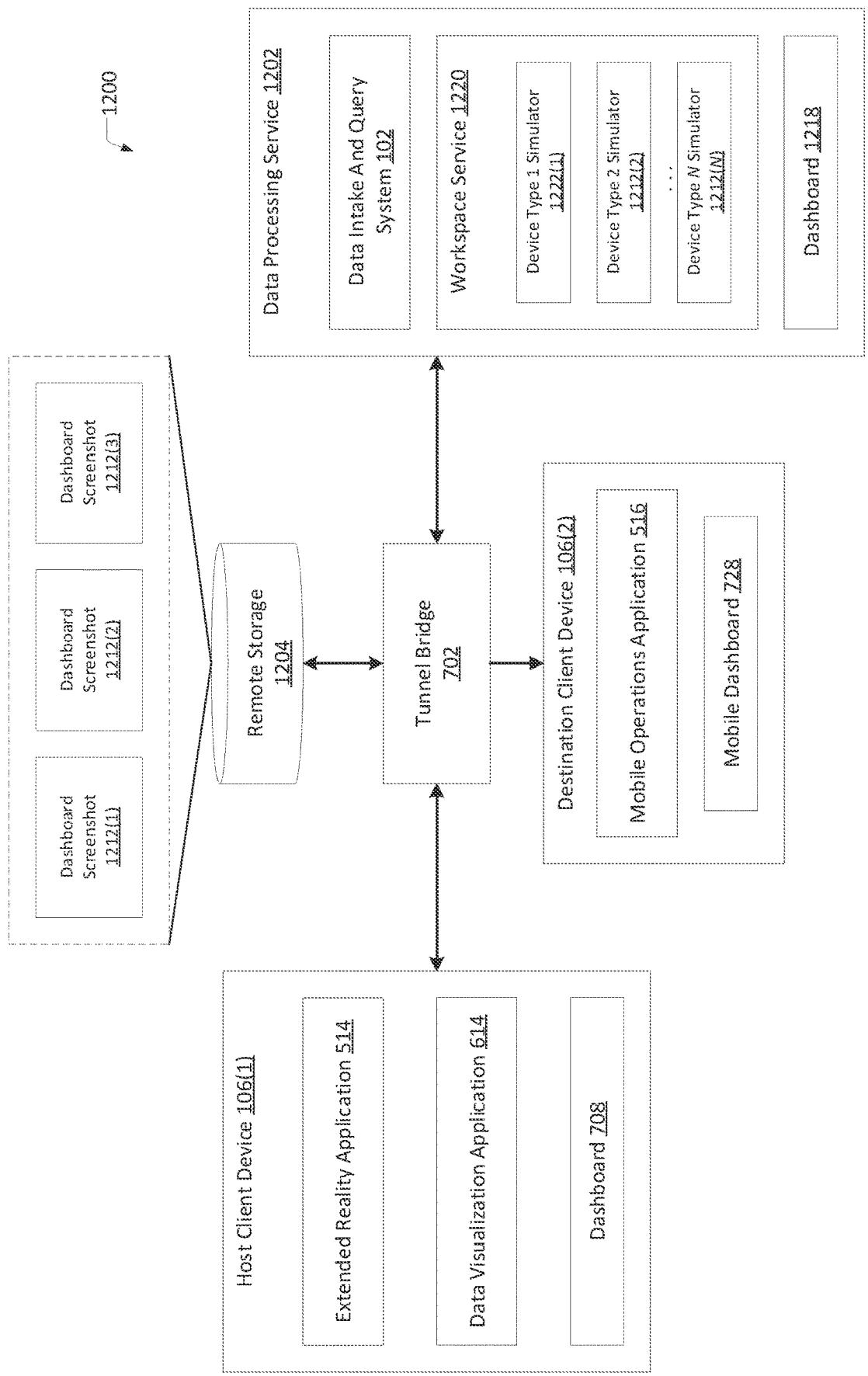
FIG. 12 is a block diagram illustration of another data processing environment, in accordance with example implementations.

FIG. 12 is a block diagram illustration of another data processing environment, in accordance with example implementations. As shown, one or more components of the data processing environment 1200 include the host client device 106(1), the destination client device 106(2), the tunnel bridge 702, the data processing service 1202, and the remote storage 1204. The host client device 106(1) includes the extended reality application 514, the data visualization application 614, and the dashboard 708. The destination client device 106(2) includes the mobile operations application 516 and the mobile dashboard 728. The data processing service 1202 includes the data intake and query system 102, a workspace service 1220, and the dashboard 1218. The workspace service 1220 includes a set of device type simulators 1222 (e 1222(1), 1222(2), . . . 1222(N), etc.). The remote storage 1204 includes a set of dashboard screenshots 1212 (e.g., 1212(1), 1212(2), 1212(3), etc.).

The data processing service 1202 processes data associated with generating dashboards for client devices 106. In various embodiments, the data processing service 1202 includes a workspace service 1220 that manages updates performed by the host client device 106(1) and/or actions performed by one or more device type simulators 1222 in relation to the generation of the dashboard 1218. In various embodiments, the data processing service 1902 responds to data requests by retrieving field values via the data intake and query system 102. In an implementation, the field values are extracted from fields that are defined post-ingestion (e.g., at search time), as has been previously described (e.g., with a late-binding schema). The field values transmitted by data intake and query system 108 may be in any technically-feasible format.

Workspace service 1220 that manages updates performed by the host client device 106(1) and/or actions performed by one or more device type simulators 1222 in relation to the generation of the dashboard 1218. In various embodiments, the workspace service 1220 may cause the certain information (e.g., dashboard screenshots 1212) to be stored in the remote storage 704.

The device type simulators 1222 (e.g., device type 1 simulator 1222(1), device type 2 simulator 1222(2), device type N simulator 1222(N), etc.) include one or more software emulators that simulate the functionalities and/or characteristics of a specific device type. For example, the device type 1 simulator 1222(1) could simulate a mobile device, the device type 2 simulator 1222(2) could simulate a wearable device, the device type N simulator 1222(N) could simulate a television device, and so forth. In various embodiments, each respective device type simulator 1222 may include various APIs and/or other software to generate dashboards (e.g., dashboard 1218) and or send queries to the data intake and query system 102 to retrieve data values for a given dashboard. In some embodiments, one or more of the device type simulators 1222 may be included in the data processing service 1202. Alternatively, the one or more of the device type simulators 1222 may be included in at least one of the host client device 106(1) or the destination client device 106(2).

Remote storage 1204 includes one or more data stores that store information associated with updated properties for a dashboard. In various embodiments, host device 1804 may transmit the dashboard update messages to remote storage 1204, where the remote storage 1204 stores the information. The remote storage 1204 may also store other data associated with the dashboard 708. For example, the remote storage 1204 could and store the one or more dashboard screenshots that are generated by the respective device type simulators 1222.

Figure 13:
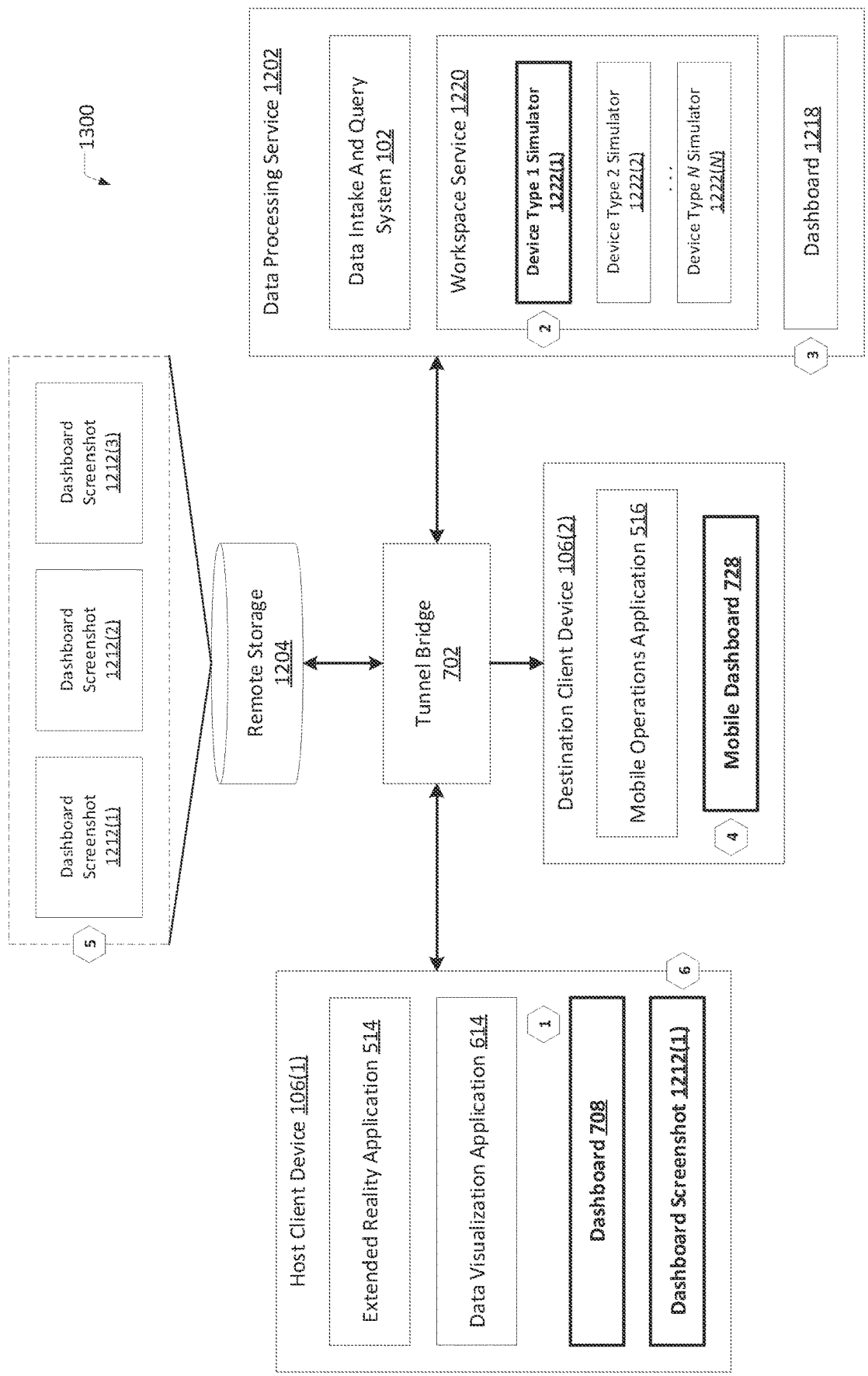
FIG. 13 is a more-detailed illustration of the secure update transmission technique performed by various devices included in the data processing environment FIG. 12, in accordance with example implementations.

FIG. 13 is a more-detailed illustration of the secure update transmission technique performed by various devices included in the data processing environment 1200 of FIG. 12, in accordance with example implementations. As shown, one or more components of the data processing environment 1200 include the host client device 106(1), the destination client device 106(2), the tunnel bridge 702, the data processing service 1202, and the remote storage 1204. The host client device 106(1) includes the extended reality application 514, the data visualization application 614, the dashboard 708, and a dashboard screenshot 1212(1). The destination client device 106(2) includes the mobile operations application 516 and the mobile dashboard 728. The data processing service 1202 includes the data intake and query system 102, a workspace service 1220, and the a dashboard 1218. The workspace service includes a set of device type simulators 1222 (e.g., 1222(1), 1222(2), . . . 1222(N), etc.). The remote storage 1204 includes a set of dashboard screenshots 1212 (e.g., 1212(1), 1212(2), 1212(3), etc.).

In operation, the dashboard 708 that is included in the host client device 106(1) corresponds to the mobile dashboard 728 that is included in the destination client device 106(2). When the data visualization application 614 determines that one or more modifications to the properties of dashboard 708 are to be applied, the data visualization application 614 applies the changes to the dashboard 708 and transmits a message to the workspace service 1220 to apply the modification to a dashboard within one or more different device types. The workspace service 1220 causes a specific device type simulator 1222 (e.g., device type 1 simulator 1222(1)) to simulate the dashboard within the specific device type. The data processing service 1202 stores the dashboard 1218 generated by the device type simulator 1222. The data processing service 1202 may also generate a dashboard screenshot 1212 (e.g., dashboard screenshot 1212(1)) and cause the dashboard screenshot to be stored in the remote storage 1204. The host client device 106(1) may then retrieve the dashboard screenshot 1212(1) from the remote storage 1204.

For explanatory purposes only, a series of numbered hexagons labeled 1-6 depicts an example series of operations that occur when the host device 106(1) causes a remote data processing service to a modify a property on the dashboard that corresponds to a different device type.

As depicted with the hexagon numbered 1, the host client device 106(1) modifies one or more properties of the dashboard 708. In various embodiments, the data visualization application 614 may modify one or more properties of dashboard 708. For example, the data visualization application 614 could receive an input that changes an arrangement of visualizations within the dashboard 708 (as displayed via the data visualization application 614 and/or the extended reality application 514). The data visualization application 614 could then modify the property of the dashboard 708 that changes the arrangement of visualizations.

As depicted with the hexagon numbered 2, the host client device 106(1) sends a command to the workspace service 1220 via the tunnel bridge 702. In various embodiments, upon determining that the received input changes a property of the dashboard 708, the data visualization application 614 generates one or more dashboard update messages that include information for the workspace service 1220 to apply modifications to a corresponding dashboard (e.g., dashboard 1218). In some embodiments, the data visualization application 514 may automatically generate the dashboard update message upon applying modifications to the dashboard 708. Alternatively, the data visualization application 614 may generate the dashboard update message in response to a separate user input indicating a command to initiate the dashboard modification to the corresponding dashboard 1218.

In various embodiments, the dashboard update message specifies a specific device type (e.g., a mobile device) that the workspace service 1220 is to modify. In such instances, the workspace service 1220 selects a specific device type simulator 1222 (e.g., the device type 1 simulator 1222(1)) that corresponds to the device type specified in the dashboard update message. Additionally or alternatively, the dashboard update may include information about the modification to the property of the dashboard 708 (e.g., the change in the arrangement of visualizations), the dashboard ID for the dashboard 708, and/or a set of data values associated with the dashboard 708. In some embodiments, the dashboard update message may include the dashboard ID for the mobile dashboard 728.

As depicted with the hexagon numbered 3, the selected device type simulator 1222 applies the modifications to the corresponding dashboard 1218. In various embodiments, the device type 1 simulator 1222(1), upon receipt of the dashboard update message, applies modifications to the dashboard 1218 based on the contents of the dashboard update message and based on the operating characteristics of the device type (e.g., screen resolution, power usage, network connection, etc.). In some embodiments, the device type 1 simulator 1222(1) applies a set of modifications to the dashboard 1218 in order to change the properties of the dashboard 1218 in a manner similar to the changes applied to the dashboard 708.

In some embodiments, the modifications that the data visualization application 614 applied to the dashboard 708 may correspond to a different set of modifications that the device type 1 simulator 1222(1) applies to the dashboard 1218. For example, the data visualization application 614 could change the horizontal arrangement of two visualizations in a row within the dashboard 708. In this example, the dashboard 1218 could be a mobile dashboard that limits the arrangement such that only one visualization is displayed in a row. In such instances, the the device type 1 simulator 1222(1) could respond to the change in horizontal arrangement indicated in the dashboard update message by modifying a vertical arrangement of the corresponding visualizations within the dashboard 1218.

As depicted with the hexagon numbered 4, the workspace service 1220 transmits the dashboard 1218 to one or more devices via the tunnel bridge 702. In some embodiments, the workspace service 1220 may transmit the updated dashboard 1218 to the destination client device 106(2). In such instances, the mobile operations application 516 included in the destination client device 106(2) may display the updated dashboard 1218 as the mobile dashboard 728. Additionally or alternatively, the workspace service 1220 may transmit the updated dashboard 1218 to the host client device 106(1). In such instances, the data visualization application 614 may display the updated dashboard as a rendering within a simulated device (e.g., a window displaying a rendering of a mobile device displaying the updated dashboard 1218).

As depicted with the hexagon numbered 5, the workspace service 1220 may also generate a dashboard screenshot 1212 and transmit the dashboard screenshot to remote storage 1204 via the tunnel bridge 702. In various embodiments, the device type simulator 1222 may generate the updated dashboard 1218. In such instances, the workspace service 1220 may generate a dashboard screenshot 1212 (e.g., dashboard screenshot 1212(1)) that corresponds to an image of the complete dashboard 1218 (including portions of the dashboard 1218 that require scrolling to display). In such instances, the workspace service 1220 may transmit the dashboard screenshot 1212(1) to the remote storage 1204 via the tunnel bridge.

As depicted with the hexagon numbered 6, the workspace host device 106(1) may retrieve the dashboard screenshot 1212(1) from the remote storage 1204 via the tunnel bridge 702. In various embodiments, the host client device 106(1) may display the dashboard screenshot 1212(1) that corresponds to the dashboard 1218 as updated by the device type simulator 1222. For example, a user could view the dashboard screenshot of a rendered mobile dashboard corresponding to the updated dashboard 1218 in lieu of viewing the updated dashboard on the destination client device 106(2). In various embodiments, the host client device 106(2) could retrieve dashboard screenshots that correspond to different device types (e.g., wearable devices, tablets, televisions, etc.) and/or device models (e.g., specific mobile device models, specific streaming video platforms, etc.). In such instances, a user may view the dashboard screenshots 1212(1), 1212(2), 1212(3) in lieu of viewing dashboard updates via multiple destination client devices.

Figure 14:
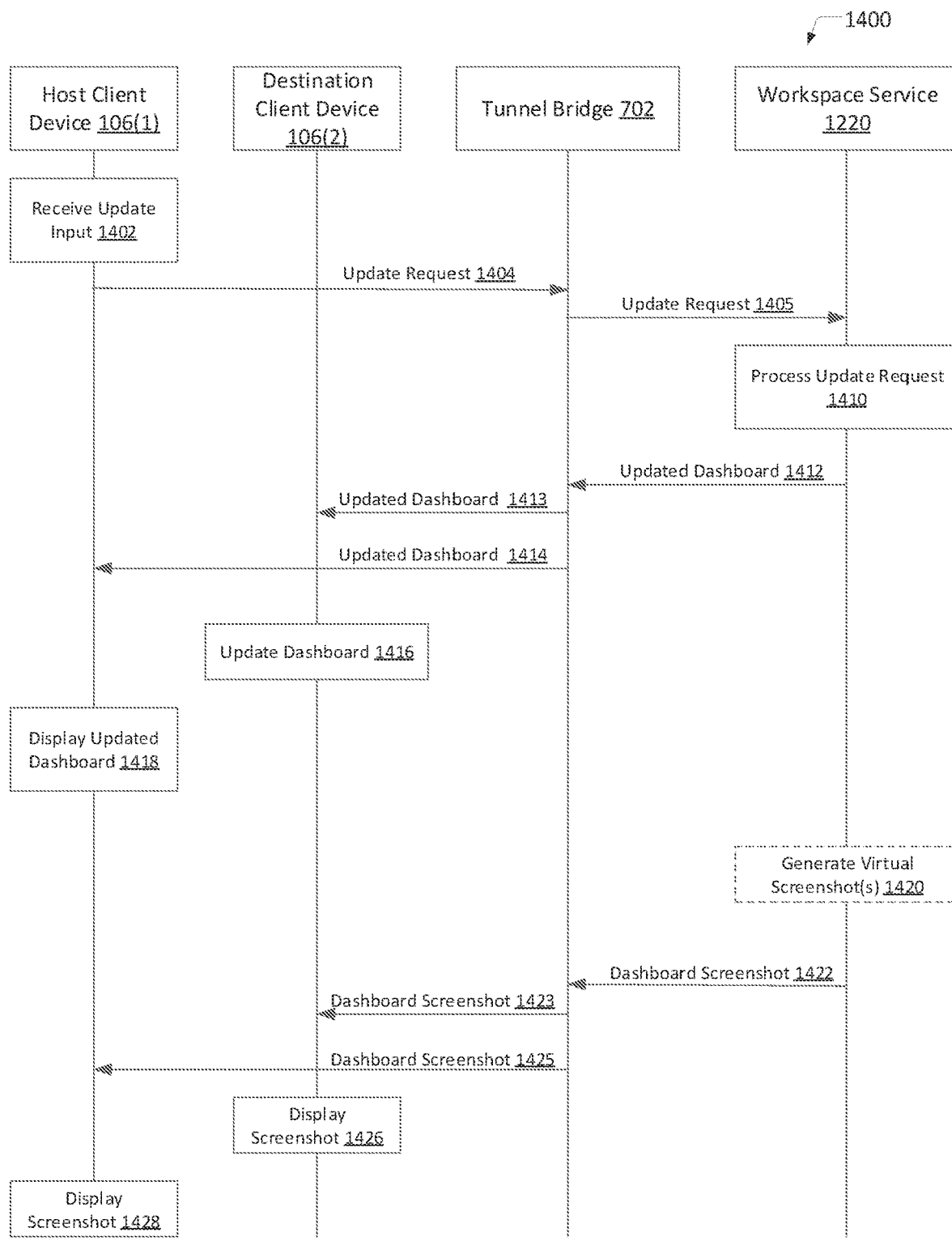
FIG. 14 illustrates a call flow diagram showing interactions between various components of the example data processing environment of FIG. 13, in accordance with example implementations.

FIG. 14 illustrates a call flow diagram showing interactions between various components of the example data processing environment 1300, in accordance with example implementations. One or more components of the data processing environment 1300 may perform various operations 1400, including securely transmitting updates of dashboard properties.

During the operation to provide a secure transmission of an update, the host client device 106(1) receives an update to the dashboard 1402. In various embodiments, the data visualization application 614 included in the client device 106(1) may receive an input indicating a change to a property of the dashboard. For example, the data visualization application 614 could receive an input to add a new visualization to the dashboard 708. In such instances, the data visualization application 614 could then apply the modification to the dashboard 708 based on the received input. Additionally or alternatively, the data visualization application 614 could determine that a property of the dashboard 708 has been modified.

After receiving the update to the dashboard property, the host client device 106(1) sends a dashboard update request message 1404. In various embodiments, the data visualization application 614 sends the dashboard update request message 1404 to the workspace service 1220 via the tunnel bridge 702 that requests the workspace service 1220 complete a job of generating a dashboard 1218 that includes the update to the dashboard property. In some embodiments, the data visualization application 514 may automatically generate the dashboard update request message 1404 upon applying modifications to the dashboard 708. Alternatively, the data visualization application 614 may generate the dashboard update request message 1404 in response to a separate user input indicating a command to initiate the dashboard modification to the corresponding dashboard 1218.

In various embodiments, the dashboard update request message 1404 specifies a specific device type (e.g., a wearable device) that the workspace service 1220 is to modify. In such instances, the workspace service 1220 selects a specific device type simulator 1222 (e.g., the device type 1 simulator 1222(1)) that corresponds to the device type specified in the dashboard update message. In some embodiments, the dashboard update request message 1404 includes information about the modification, as well as the dashboard ID for the dashboard 708 and/or a set of data values associated with the dashboard 708. Additionally or alternatively, the dashboard update request message 1404 may include the dashboard ID for the mobile dashboard 728.

Tunnel bridge 702 receives dashboard update request message 1404 and transmits a corresponding dashboard update request message 1405 to the workspace service 1220. The workspace service 1220 performs various actions 1410 to process the dashboard update request message 1405. In various embodiments, the workspace service 1220 may respond to the dashboard update request message 1405 by selecting a specific device type simulator 1222 (e.g., device type 2 simulator 1222(2)) to generate a dashboard (e.g., dashboard 1218) for the specific device type, where the generated dashboard 1218 is displayed within the specific device type.

For example, the workspace service could process the dashboard update request message 1405 specifying an update to a wearable device dashboard by selecting the device type 2 simulator 1222(2), which simulates the operation of a wearable device. The device type 2 simulator 1222(2) generates the dashboard 1218 as a wearable device dashboard that includes the specified modification (e.g., the addition of the visualization). In some embodiments, the workspace service 1220 may input data values, included in the dashboard update request message 1405, when generating the dashboard 1218. Additionally or alternatively, the workspace service 1220 may retrieve updated data values, via a request to the data intake and query system 102, to include in the dashboard 1218.

The workspace service 1220 transmits the updated dashboard message 1412 to the tunnel bridge 702. The updated dashboard message 1412 includes the dashboard 1218 that device type 2 simulator 1222(2) generated. The tunnel bridge 702 receives the updated dashboard message 1412 and transmits separate dashboard update messages 1413, 1414 to the destination client device 106(2) and the host client device 106(1), respectively. In various embodiments, the workspace service may only address the dashboard update message 1412 to a single recipient (e.g., the host client device 106(1)). In such instances, the tunnel bridge 702 may transmit only the dashboard update message 1414.

Upon receipt of the dashboard update message 1413, the destination client device 106(2) performs various actions 1416 to update the dashboard. In various embodiments, the destination client device 106(2) may be a wearable device. A wearable operations application (not shown) included in the destination client device 106(2) may update a wearable dashboard included in the destination client device 106(2) with the dashboard 1218.

Upon receipt of the dashboard update message 1414, the host client device 106(1) performs various actions 1418 to display the updated dashboard. In various embodiments, the data visualization application 614 may display the dashboard 1218 included in the dashboard update message 1414 as a rendering within a simulated device (e.g., a window displaying a rendering of a wearable device displaying the dashboard 1218).

In some embodiments, the workspace service 1220 may optionally perform various actions to generate a dashboard screenshot 1212. In various embodiments, the workspace service 1220 may generate a dashboard screenshot 1212 (e dashboard screenshot 1212(2)) that corresponds to an image of the complete dashboard 1218 (including portions of the dashboard 1218 that require scrolling to display) that the device type 2 simulator 1222(2) generated. In such instances, the workspace service 1220 may transmit the dashboard screenshot 1212(1) to the remote storage 1204 via the tunnel bridge. In some embodiments, the workspace service 1220 may generate the dashboard screenshot before transmitting the dashboard update message 1412. Alternatively, in some embodiments, the workspace service 1220 may generate the dashboard screenshot in lieu of generating the dashboard update message 1412.

The workspace service 1220 transmits the dashboard screenshot message 1422. In some embodiments, the workspace service 1220 may transmit the dashboard screenshot message 1422 directly (via the tunnel bridge 702) to host client device 106(1) and/or destination client device 106(2). Alternatively, the workspace service may transmit the dashboard screenshot message 1422 to the remote storage 1204 via the tunnel bridge 702. The tunnel bridge 702 receives the dashboard message 1422 and transmits separate dashboard screenshot messages 1423, 1425 to the destination client device 106(2) and the host client device 106(1), respectively. In various embodiments, the workspace service 1220 may only address the dashboard screenshot message 1422 to a single recipient (e.g., the host client device 106(1)). In such instances, the tunnel bridge 702 may transmit only the dashboard update message 1425.

In some embodiments, the host client device 106(1) and/or the destination client device 106(2) may retrieve the dashboard screenshot 1212(2) from the remote storage 1204. In such instances, the tunnel bridge 702 may receive a dashboard screenshot message from the remote storage 1204 and transmits a corresponding dashboard screenshot message 1425 to the host client device 106(1).

Upon receipt of the dashboard screenshot message 1423, the destination client device 106(2) performs various actions 1426 to display the dashboard screenshot. In various embodiments, the destination client device 106(2) may display at least a portion of the dashboard screenshot 1212(2) in a manner similar to the display of a dashboard. For example, when the destination client device 106(2) is a wearable device, the destination client device 106(2) could display a portion of the dashboard screenshot 1212(2) to simulate the operation of dashboard 1218.

Additionally or alternatively, the host client device 106(1) may, upon receipt of the dashboard screenshot message 1423, display the dashboard screenshot 1212(1). For example, the client device 106(1) could display dashboard screenshots 1212 that correspond to different device types and/or device models. In such instances, the host client device 106(1) could view the dashboard screenshots 1212(2) as a full image.

Figure 15:
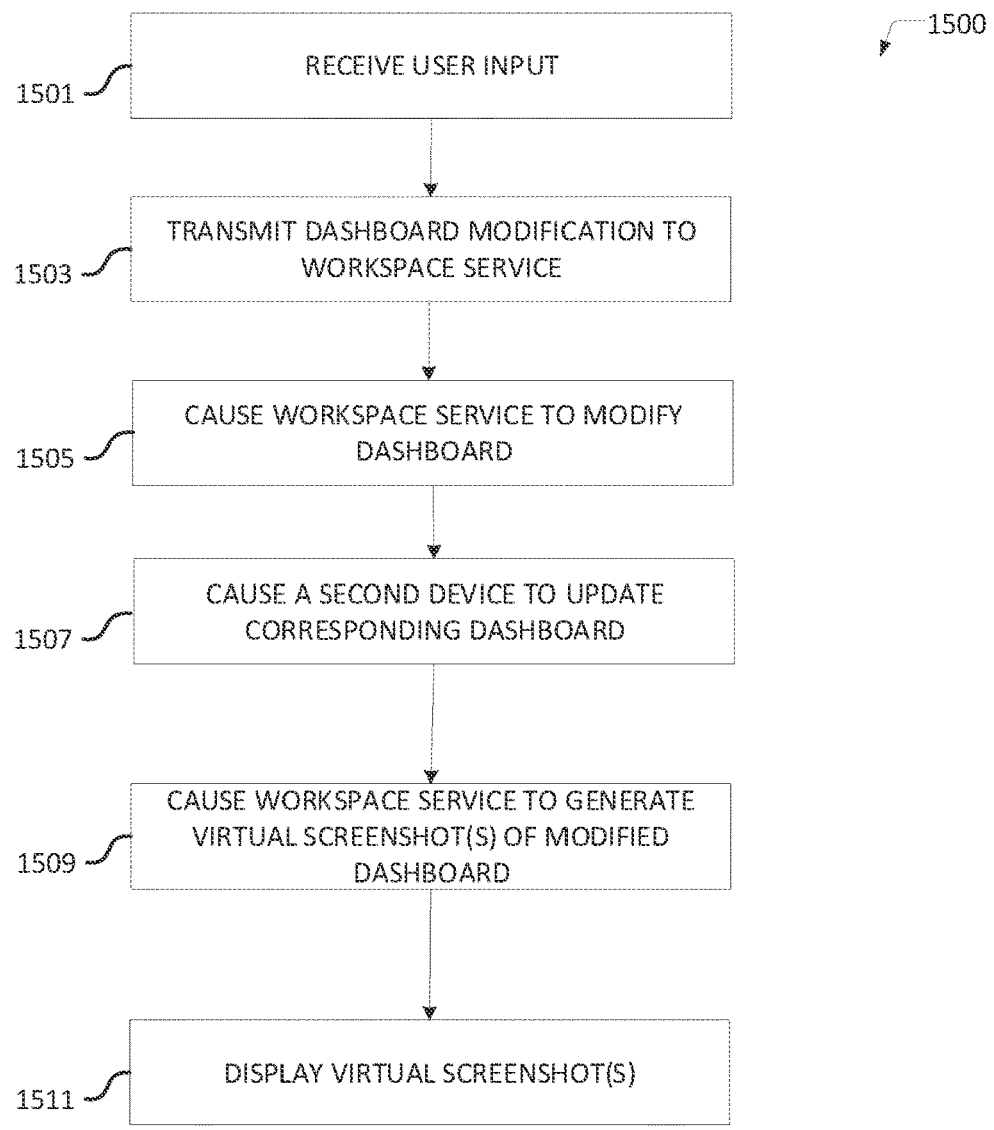
FIG. 15 sets forth a flow diagram of method steps for securely transmitting an update to a dashboard property, in accordance with example implementations.

FIG. 15 sets forth a flow diagram of method steps for securely transmitting an update to a dashboard property, in accordance with example implementations. Although the method steps are described in conjunction with FIGS. 1-14, persons of ordinary skill in the art will understand that any system configured to perform this method and/or other methods described herein, in any order, and in any combination not logically contradicted, is within the scope of the present invention.

As shown by method 1500, at step 1501, a host client device 106(1) receives a user input indicating a change to a property of the dashboard. In various embodiments, a data visualization application 614 included in the host client device 106(1) may receive a manual input to change a property associated with dashboard 708. In such instances, the data visualization application 614 may then apply the modification to the dashboard 708 based on the received input.

At step 1503, the host client device 106(1) sends a dashboard modification to the workspace service 1220. In various embodiments, the data visualization application 614 sends to the workspace service, via the tunnel bridge 702, a dashboard update request message 1404. The dashboard update request message 1404 requests that the workspace service 1220 complete a job of generating a dashboard 1218 that includes the modification to the dashboard property specified by the user input. In some embodiments, the data visualization application 514 may automatically generate the dashboard update request message 1404 upon applying modifications to the dashboard 708. Alternatively, the data visualization application 614 may generate the dashboard update request message 1404 in response to a separate user input indicating a command to initiate the dashboard modification to the corresponding dashboard 1218 included in the data processing servicer 1202.

At step 1505, the host client device 106(1) causes the workspace service 1220 to modify the applicable dashboard. In various embodiments, the dashboard update request message 1404 specifies a dashboard for a specific device type (e.g., a wearable device) that the workspace service 1220 is to modify. In such instances, the workspace service 1220 may select a specific device type simulator 1222 (e.g., the device type N simulator 1222(N)) that corresponds to the device type specified in the dashboard update message (e.g., a television). In some embodiments, the dashboard update request message 1404 includes information about the modification, as well as the dashboard ID for the dashboard 708 and/or a set of data values associated with the dashboard 708. Additionally or alternatively, the dashboard update request message 1404 may include the dashboard ID for the dashboard that the workspace service 1220 is to modify (e.g., dashboard 1218).

For example, the workspace service 1220 could process the received dashboard update request message specifying an update to a television device dashboard by selecting the device type N simulator 1222(N), which simulates the operation of a television device. The device type 3 simulator 1222(N) could generate the dashboard 1218 as a television device dashboard that includes the specified modification.

At step 1507, the host client device 106(2) could optionally cause a second device to update the corresponding dashboard. In various embodiments, the dashboard update request message may cause the workspace service 1220 to, upon modifying dashboard 1218, transmit an updated dashboard message that includes the dashboard 1218 that the device type N simulator 1222(N) generated. In such instances, the workspace service 1220 may transmit the updated dashboard message to the destination client device 106(2). Upon receipt of the dashboard update message 1413, the destination client device 106(2) may update a dashboard included in the destination client device 106(2) with the dashboard 1218. In various embodiments, the destination client device 106(2) may display the updated dashboard.

Additionally or alternatively, in some embodiments, the host client device 106(1) may receive the updated dashboard message and may respond by displaying the updated dashboard. In various embodiments, the data visualization application 614 may display the dashboard 1218 included in the dashboard update message 1414 as a rendering within a simulated device (e.g., a window displaying a rendering of a television device displaying the dashboard 1218).

At step 1509, the client device 106(1) may optionally cause the workspace service 1220 to generate a dashboard screenshot 1212 of the generated dashboard. In various embodiments, the workspace service 1220 may generate a dashboard screenshot 1212 (e.g., dashboard screenshot 1212(3)) that corresponds to an image of the complete dashboard 1218 (including portions of the dashboard 1218 that require scrolling to display) that the device type N simulator 1222(N) generated. In such instances, the workspace service 1220 may transmit the dashboard screenshot 1212(1) to the remote storage 1204 via the tunnel bridge. In some embodiments, the workspace service 1220 may generate the dashboard screenshot in lieu of generating the dashboard update message 1412.

At step 1511, the client device may optionally display the dashboard screenshot. In some embodiments, the host client device 106(1) may retrieve the dashboard screenshot 1212 (N) of the dashboard 1218 from the remote storage 1204. In such instances, the tunnel bridge 702 may receive a dashboard screenshot message from the remote storage 1204 and may transmit a corresponding dashboard screenshot message to the host client device 106(1). The host client device 106(1) may, upon receipt of the dashboard screenshot message, display the dashboard screenshot 1212(3). For example, the client device 106(1) could display dashboard screenshots 1212 that correspond to different device types and/or device models. In such instances, the host client device 106(1) could display the dashboard screenshots 1212 (3) as a full image.

In sum, a host device and one or more destination devices are connected via a tunnel bridge. The host device includes a data visualization application that provides a host dashboard to view a set of data values. A given dashboard includes a set of properties that affect which data values the dashboard displays, the types of visualizations the dashboard includes to display the visualizations, and so forth. In operation, the data visualization application determines that various inputs into the host device changes one or more properties of the host dashboard. In some embodiments, the input also includes a manual input to provide the modification to the one or more destination devices. Alternatively, the host device may cause the modification to be transmitted to the one or more destination devices without an additional manual input.

In various embodiments, the data visualization application modifies the one or more properties of the dashboard included in the host device. The host device provides the modifications to the one or more properties of the dashboard through the tunnel bridge to the one or more destination devices. A given destination device includes a destination dashboard that corresponds to the dashboard included in the host device. Upon receipt of the modifications, the destination device applies the modifications to the destination dashboard in order to change the properties of the destination dashboard in a manner similar to the changes applied to the host dashboard. In some embodiments, the host dashboard and destination dashboard may be associated with different device types. In such instances, the modifications applied to the host dashboard may be translated to a different set of modifications to reflect the differences in device types.

In other embodiments, the data visualization application may forward the received inputs to one or more device simulators, where each of the respective device simulators simulate the operation of software operating on a different device type. In some embodiments, the device simulator may be included in a remote data processing service that communicates with the host device and the one or more destination devices. In various embodiments, a given device simulator corresponds to the device type of the destination device. Based on the received input, the given device simulator modifies a property of a simulated dashboard that is operating within the given device simulator. The given device simulator then provides the modified simulated dashboard to the destination device, where the destination device displays the modified simulated dashboard. Additionally or alternatively, the given device simulator may generate a screenshot of the modified simulated dashboard, as generated. In such instances, the given device simulator may transmit the screenshot to remote storage, where any of the host device or one or more destination devices may retrieve the screenshot for display.

At least one technological advantage of the discloses techniques relative to prior techniques is that changes to properties of a dashboard can be efficiently updated for various device types without extensive manual action. In particular, by automatically updating dashboard modifications, a data processing system can effectively modify a dashboard without requiring devices to retrieve changes from a host. Further, by securely transmitting dashboard property changes via a tunnel bridge, a user may easily test and propagate changes to a dashboard without excessive requests to retrieve data values associated with the dashboard.

1. In various embodiments, a computer-implemented method comprises determining that a first property associated with a dashboard is modified at a first device, determining that the dashboard is accessible at a second device, where the first device and the second device are coupled via a trusted tunnel bridge, and in a real-time response to determining that the first property was modified, transmitting, to the second device via the trusted tunnel bridge, an update that causes the second device modify the dashboard based on the modified first property.

2. The computer-implemented method of clause 1, where the second device wherein at least one property other than the first is modified based on a device type of the second device.

3. The computer-implemented method of clause 1 or 2, further comprising transmitting, with the update, a dashboard identifier associated with the dashboard, where the second device receives, based on an update request that includes the dashboard identifier and from a data source external to both the first device and the second device, an updated set of data values, and where the updated set of data values are displayed via the dashboard at the second device.

4. The computer-implemented method of any of clauses 1-3, where the update includes the dashboard and a set of data values that are displayed via the dashboard.

5. The computer-implemented method of any of clauses 1-4, where the first device transmits the update without manual interaction by a user of the first device.

6. The computer-implemented method of any of clauses 1-5, further comprising displaying, from a set of data values, a first subset of data values based on the first property of the dashboard, and in response to determining that the first property was modified, displaying, from the set of data values, a second subset of data values.

7. The computer-implemented method of any of clauses 1-6, further comprising transmitting, to a device simulator, a command to render the dashboard based on the first property being modified, where the first device is a first device type, the second device is a second device type, the device simulator emulates the second device type, and transmitting an update to the second device comprises the device simulator transmitting a rendered version of the dashboard on the second device type.

8. The computer-implemented method of any of clauses 1-7, further comprising causing the device simulator to generate a screenshot of the rendered version of the dashboard on the second device type, receiving the screenshot from the device simulator, and displaying at least a portion of the screenshot at the first device.

9. The computer-implemented method of any of clauses 1-8, further comprising receiving, at the first device, a manual input to modify the first property of the dashboard, where the first property of the dashboard is determined to be modified at the first device in response to the manual input.

10. The computer-implemented method of any of clauses 1-9, where the first property comprises at least one of a visualization type of at least one visualization included in the a given dashboard, a data input type for the at least one visualization, or a refresh rate for receiving data values for the given dashboard.

11. The computer-implemented method of any of clauses 1-9, where the first device is physically proximate to the second device when determining that the first property was modified.

12. The computer-implemented method of any of clauses 1-11, where, when determining that the first property was modified, the first device is included in a first network and the second device is included in the second network.

13. In various embodiments, a host computing device, comprising a processor, and one or more non-transitory computer-readable media having stored thereon instructions that, when executed by the processor, cause the processor to perform operations including determining that a first property associated with a dashboard is modified at the host computing device, determining that the dashboard is accessible at a second device, wherein the host computing device and the second device are coupled via a trusted tunnel bridge, and in a real-time response to determining that the first property was modified, transmitting, to the second device via the trusted tunnel bridge, an update that causes the second device modify the dashboard based on the modified first property.

14. The host computing device of clause 13, where the host computing device transmits the update without manual interaction by a user of the host computing device.

15. The host computing device of clause 13 or 15, further comprising instructions that, when executed by the processor, cause the processor to further perform the operations including transmitting, to a device simulator, a command to render the dashboard based on the first property being modified, where the host computing device is a first device type, the second device is a second device type, the device simulator emulates the second device type, and transmitting an update to the second device comprises the device simulator transmitting a rendered version of the dashboard on the second device type.

16. The host computing device of any of clauses 13-15, further comprising instructions that, when executed by the processor, cause the processor to further perform the operations including causing the device simulator to generate a screenshot of the rendered version of the dashboard on the second device type, receiving the screenshot from the device simulator, and displaying at least a portion of the screenshot.

17. In various embodiments, one or more non-transitory computer-readable media having stored thereon instructions that, when executed by one or more processors, cause the one or more processor to perform operations including determining that a first property associated with a dashboard is modified at a first device, determining that the dashboard is accessible at a second device, wherein the first device and the second device are coupled via a trusted tunnel bridge, and in a real-time response to determining that the first property was modified, transmitting, to the second device via the trusted tunnel bridge, an update that causes the second device modify the dashboard based on the modified first property.

18. The one or more non-transitory computer-readable media of clause 17, where the first device transmits the update without manual interaction by a user of the first device.

19. The one or more non-transitory computer-readable media of clause 17 or 18, further comprising instructions that, when executed by one or more processors, cause the one or more processor to perform operations including transmitting, to a device simulator, a command to render the dashboard based on the first property being modified, where the first device is a first device type, the second device is a second device type, the device simulator emulates the second device type, and transmitting an update to the second device comprises the device simulator transmitting a rendered version of the dashboard on the second device type.

20. The one or more non-transitory computer-readable media of any of clauses 17-19, further comprising instructions that, when executed by one or more processors, cause the one or more processor to perform operations including causing the device simulator to generate a screenshot of the rendered version of the dashboard on the second device type, receiving the screenshot from the device simulator, and displaying at least a portion of the screenshot at the first device.

7.0. TERMINOLOGY

Computer programs typically comprise one or more instructions set at various times in various memory devices of a computing device, which, when read and executed by at least one processor, will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Furthermore, use of "e.g.," is to be interpreted as providing a non-limiting example and does not imply that two things are identical or necessarily equate to each other.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer-implemented method, comprising:
determining that a first property associated with a dashboard is modified at a first device, wherein the dashboard comprises one or more visualization panels generated using data received from a data intake and query system in response to one or more queries;
determining that the dashboard is accessible at a second device, wherein the first device and the second device are coupled via a trusted tunnel bridge; and
in a real-time response to determining that the first property was modified, transmitting, to the second device via the trusted tunnel bridge, an update and an identifier associated with the dashboard that causes the second device to modify the dashboard based on the modified first property, wherein the second device receives, based on an update request that includes the dashboard identifier, an updated set of values, and wherein the updated set of values are displayed via the dashboard at the second device.

2. The computer-implemented method of claim 1, wherein at the second device at least one property of the dashboard other than the first is modified based on a device type of the second device.

3. The computer-implemented method of claim 1, wherein the second device receives the updated set of data values from a data source external to both the first device and the second device.

4. The computer-implemented method of claim 1, wherein the update includes the dashboard and a set of data values that are displayed via the dashboard.

5. The computer-implemented method of claim 1, wherein the first device transmits the update without manual interaction by a user of the first device.

6. The computer-implemented method of claim 1, further comprising:
displaying, from a set of data values, a first subset of data values based on the first property of the dashboard; and
in response to determining that the first property was modified, displaying, from the set of data values, a second subset of data values.

7. The computer-implemented method of claim 1, further comprising transmitting, to a device simulator, a command to render the dashboard based on the first property being modified, wherein:
the first device is a first device type,
the second device is a second device type,
the device simulator emulates the second device type, and
transmitting an update to the second device comprises the device simulator transmitting a rendered version of the dashboard on the second device type.

8. The computer-implemented method of claim 7, further comprising:
causing the device simulator to generate a screenshot of the rendered version of the dashboard on the second device type;

receiving the screenshot from the device simulator; and displaying at least a portion of the screenshot at the first device.

9. The computer-implemented method of claim 1, further comprising:

receiving, at the first device, a manual input to modify the first property of the dashboard, wherein the first property of the dashboard is determined to be modified at the first device in response to the manual input.

10. The computer-implemented method of claim 1, wherein the first property comprises at least one of:

a visualization type of at least one visualization included in a given dashboard, a data input type for the at least one visualization, or a refresh rate for receiving data values for the given dashboard.

11. The computer-implemented method of claim 1, wherein the first device is physically proximate to the second device when determining that the first property was modified.

12. The computer-implemented method of claim 1, wherein, when determining that the first property was modified, the first device is included in a first network and the second device is included in the second network.

13. A host computing device, comprising:

a processor; and one or more non-transitory computer-readable media having stored thereon instructions that, when executed by the processor, cause the processor to perform operations including:

determining that a first property associated with a dashboard is modified at a first device, wherein the dashboard comprises one or more visualization panels generated using data received from a data intake and query system in response to one or more queries;

determining that the dashboard is accessible at a second device, wherein the first device and the second device are coupled via a trusted tunnel bridge; and in a real-time response to determining that the first property was modified, transmitting, to the second device via the trusted tunnel bridge, an update and an identifier associated with the dashboard that causes the second device to modify the dashboard based on the modified first property, wherein the second device receives, based on an update request that includes the dashboard identifier, an updated set of values, and wherein the updated set of values are displayed via the dashboard at the second device.

14. The host computing device of claim 13, wherein the host computing device transmits the update without manual interaction by a user of the host computing device.

15. The host computing device of claim 13, further comprising instructions that, when executed by the processor, cause the processor to further perform the operations including transmitting, to a device simulator, a command to render the dashboard based on the first property being modified, wherein:

the host computing device is a first device type, the second device is a second device type, the device simulator emulates the second device type, and transmitting an update to the second device comprises the device simulator transmitting a rendered version of the dashboard on the second device type.

16. The host computing device of claim 15, further comprising instructions that, when executed by the processor, cause the processor to further perform the operations including:

causing the device simulator to generate a screenshot of the rendered version of the dashboard on the second device type;

receiving the screenshot from the device simulator; and displaying at least a portion of the screenshot.

17. One or more non-transitory computer-readable media having stored thereon instructions that, when executed by one or more processors, cause the one or more processor to perform operations including:

determining that a first property associated with a dashboard is modified at a first device, wherein the dashboard comprises one or more visualization panels generated using data received from a data intake and query system in response to one or more queries;

determining that the dashboard is accessible at a second device, wherein the first device and the second device are coupled via a trusted tunnel bridge; and in a real-time response to determining that the first property was modified, transmitting, to the second device via the trusted tunnel bridge, an update and an identifier associated with the dashboard that causes the second device to modify the dashboard based on the modified first property, wherein the second device receives, based on an update request that includes the dashboard identifier, an updated set of values, and wherein the updated set of values are displayed via the dashboard at the second device.

18. The one or more non-transitory computer-readable media of claim 17, wherein the first device transmits the update without manual interaction by a user of the first device.

19. The one or more non-transitory computer-readable media of claim 17, further comprising instructions that, when executed by one or more processors, cause the one or more processor to perform operations including transmitting, to a device simulator, a command to render the dashboard based on the first property being modified, wherein:

the first device is a first device type, the second device is a second device type, the device simulator emulates the second device type, and transmitting an update to the second device comprises the device simulator transmitting a rendered version of the dashboard on the second device type.

20. The one or more non-transitory computer-readable media of claim 19, further comprising instructions that, when executed by one or more processors, cause the one or more processor to perform operations including:

causing the device simulator to generate a screenshot of the rendered version of the dashboard on the second device type;

receiving the screenshot from the device simulator; and displaying at least a portion of the screenshot at the first device.

* * * * *